US011794651B2

(12) United States Patent
Baur et al.

(10) Patent No.: US 11,794,651 B2
(45) Date of Patent: *Oct. 24, 2023

(54) VEHICULAR VISION SYSTEM

(71) Applicant: MAGNA ELECTRONICS INC., Auburn Hills, MI (US)

(72) Inventors: Michael J. Baur, Kentwood, MI (US); Rodney K. Blank, Zeeland, MI (US); Mark L. Larson, Grand Haven, MI (US); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/655,384

(22) Filed: Mar. 18, 2022

(65) Prior Publication Data
US 2022/0203897 A1 Jun. 30, 2022

Related U.S. Application Data

(63) Continuation of application No. 17/247,697, filed on Dec. 21, 2020, now Pat. No. 11,285,877, which is a (Continued)

(51) Int. Cl.
*H04N 7/18* (2006.01)
*B60R 1/08* (2006.01)
(Continued)

(52) U.S. Cl.
CPC ............... *B60R 1/08* (2013.01); *B60R 1/00* (2013.01); *B60R 1/04* (2013.01); *G08G 1/09623* (2013.01);
(Continued)

(58) Field of Classification Search
CPC ............... B60R 2300/105; B60R 11/04; B60R 2300/802; G02B 2027/0118; G02B 27/0101; G02B 27/01
See application file for complete search history.

(56) References Cited

U.S. PATENT DOCUMENTS 4,200,361 A 4/1980 Malvano et al.
4,214,266 A 7/1980 Myers
(Continued)

FOREIGN PATENT DOCUMENTS

DE 10036875 A1 2/2002
DE 102007044535 A1 3/2009
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Tsion B Owens
(74) *Attorney, Agent, or Firm* — HONIGMAN LLP

(57) ABSTRACT

A vehicular vision system includes a video display screen and a video processor operable to process captured video image data captured by a rearward-viewing color video camera at the vehicle. The video display screen includes a left display region at a left portion, a right display region at a right portion, and a middle display region that spans between the left and right display regions. The video display screen (i) displays at the left display region video images derived from captured image data to display a scene occurring in a left side lane, (ii) displays at the right display region video images derived from captured image data to display a scene occurring in a right side lane and (iii) displays at the middle display region video images derived from captured
(Continued)

image data to display a scene occurring rearward of the vehicle in the lane the equipped vehicle is travelling in.

45 Claims, 28 Drawing Sheets

Related U.S. Application Data continuation of application No. 16/413,694, filed on May 16, 2019, now Pat. No. 10,875,455, which is a continuation of application No. 16/105,162, filed on Aug. 20, 2018, now Pat. No. 10,300,856, which is a continuation of application No. 15/784,228, filed on Oct. 16, 2017, now Pat. No. 10,053,012, which is a continuation of application No. 14/719,446, filed on May 22, 2015, now Pat. No. 9,789,821, which is a continuation of application No. 13/393,384, filed as application No. PCT/US2010/047256 on Aug. 31, 2010, now Pat. No. 9,041,806.

(60) Provisional application No. 61/351,513, filed on Jun. 4, 2010, provisional application No. 61/238,862, filed on Sep. 1, 2009.

(51) Int. Cl.
*B60R 1/04* (2006.01)
*G08G 1/0962* (2006.01)
*G08G 1/16* (2006.01)
*B60R 1/00* (2022.01)
*B60R 1/12* (2006.01)

(52) U.S. Cl.
CPC ......... *G08G 1/09626* (2013.01); *G08G 1/167* (2013.01); *B60R 2001/1215* (2013.01); *B60R 2001/1253* (2013.01); *B60R 2300/70* (2013.01); *B60R 2300/802* (2013.01); *B60R 2300/806* (2013.01); *B60R 2300/8066* (2013.01); *H04N 7/181* (2013.01)

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,254,931 A | 3/1981 | Aikens et al. |
| 4,266,856 A | 5/1981 | Wainwright |
| 4,277,804 A | 7/1981 | Robison |
| 4,281,898 A | 8/1981 | Ochiai et al. |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer et al. |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer et al. |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,600,913 A | 7/1986 | Caine |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,645,975 A | 2/1987 | Meitzler et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith et al. |
| 4,731,669 A | 3/1988 | Hayashi et al. |
| 4,741,603 A | 5/1988 | Miyagi et al. |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,838,650 A | 6/1989 | Stewart et al. |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |

(56) References Cited

U.S. PATENT DOCUMENTS

| | | |
|---|---|---|
| 5,130,709 A | 7/1992 | Toyama et al. |
| 5,148,014 A | 9/1992 | Lynam et al. |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,712,640 A | 1/1998 | Andou et al. |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,825,527 A | 10/1998 | Forgette et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,605 A | 3/1999 | Knapp |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,926,117 A | 7/1999 | Gunji et al. |
| 5,929,786 A | 7/1999 | Schofield et al. |
| 5,940,120 A | 8/1999 | Frankhouse et al. |
| 5,949,331 A * | 9/1999 | Schofield ............... H04N 7/18 348/E7.086 |
| 5,956,181 A | 9/1999 | Lin |
| 5,959,367 A | 9/1999 | O'Farrell et al. |
| 5,959,555 A | 9/1999 | Furuta |
| 5,962,833 A | 10/1999 | Hayashi |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,002,983 A | 12/1999 | Alland et al. |
| 6,009,336 A | 12/1999 | Harris et al. |
| 6,020,704 A | 2/2000 | Buschur |
| 6,049,171 A | 4/2000 | Stam et al. |
| 6,052,645 A | 4/2000 | Harada |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |

(56) References Cited

U.S. PATENT DOCUMENTS

| | | |
|---|---|---|
| 6,097,024 A | 8/2000 | Stam et al. |
| 6,114,951 A | 9/2000 | Kinoshita et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,170,956 B1 | 1/2001 | Rumsey et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,246,955 B1 | 6/2001 | Nishikawa et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,315,419 B1 | 11/2001 | Platzer, Jr. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,346,698 B1 | 2/2002 | Turnbull |
| 6,353,392 B1 | 3/2002 | Schofield et al. |
| 6,360,170 B1 | 3/2002 | Ishikawa et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,407,468 B1 | 6/2002 | LeVesque et al. |
| 6,411,204 B1 | 6/2002 | Bloomfield et al. |
| 6,411,328 B1 | 6/2002 | Franke et al. |
| 6,420,800 B1 | 7/2002 | LeVesque et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,817 B1 | 8/2002 | Guerra |
| 6,442,465 B2 | 8/2002 | Breed et al. |
| 6,447,128 B1 | 9/2002 | Lang et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,552,326 B2 | 4/2003 | Turnbull |
| 6,553,130 B1 | 4/2003 | Lemelson et al. |
| 6,559,435 B2 | 5/2003 | Schofield et al. |
| 6,572,233 B1 | 6/2003 | Northman et al. |
| 6,574,033 B1 | 6/2003 | Chui et al. |
| 6,578,017 B1 | 6/2003 | Ebersole et al. |
| 6,583,730 B2 | 6/2003 | Lang et al. |
| 6,587,573 B1 | 7/2003 | Stam et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,642,840 B2 | 11/2003 | Lang et al. |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,434 B1 | 3/2004 | Sakoh et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,737,630 B2 | 5/2004 | Turnbull |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,870,655 B1 | 3/2005 | Northman et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,046,448 B2 | 5/2006 | Burgner |
| 7,050,908 B1 | 5/2006 | Schwartz et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,095,567 B2 | 8/2006 | Troxell et al. |
| 7,111,968 B2 | 9/2006 | Bauer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,167,796 B2 | 1/2007 | Taylor et al. |
| 7,168,830 B2 | 1/2007 | Pastrick et al. |
| 7,175,291 B1 | 2/2007 | Li |
| 7,184,190 B2 | 2/2007 | McCabe et al. |
| 7,190,281 B2 | 3/2007 | Nagasawa et al. |
| 7,195,381 B2 | 3/2007 | Lynam et al. |
| 7,202,776 B2 | 4/2007 | Breed |
| 7,206,697 B2 | 4/2007 | Olney et al. |
| 7,224,324 B2 | 5/2007 | Quist et al. |
| 7,227,459 B2 | 6/2007 | Bos et al. |
| 7,227,472 B1 | 6/2007 | Roe |
| 7,227,611 B2 | 6/2007 | Hull et al. |
| 7,245,231 B2 | 7/2007 | Kiefer et al. |
| 7,248,718 B2 | 7/2007 | Comaniciu et al. |
| 7,249,860 B2 | 7/2007 | Kulas et al. |
| 7,253,723 B2 | 8/2007 | Lindahl et al. |
| 7,255,451 B2 | 8/2007 | McCabe et al. |

(56) References Cited

U.S. PATENT DOCUMENTS

| | | |
|---|---|---|
| 7,265,656 B2 | 9/2007 | McMahon et al. |
| 7,274,501 B2 | 9/2007 | McCabe et al. |
| 7,289,037 B2 | 10/2007 | Uken et al. |
| 7,302,344 B2 | 11/2007 | Olney et al. |
| 7,311,406 B2 * | 12/2007 | Schofield ............. B60Q 1/1423 359/604 |
| 7,317,386 B2 | 1/2008 | Lengning et al. |
| 7,324,043 B2 | 1/2008 | Purden et al. |
| 7,325,934 B2 | 2/2008 | Schofield et al. |
| 7,325,935 B2 | 2/2008 | Schofield et al. |
| 7,327,226 B2 | 2/2008 | Turnbull et al. |
| 7,331,415 B2 | 2/2008 | Hawes et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,349,582 B2 | 3/2008 | Takeda et al. |
| 7,355,524 B2 | 4/2008 | Schofield |
| 7,360,932 B2 | 4/2008 | Uken et al. |
| 7,368,714 B2 | 5/2008 | Remillard et al. |
| 7,370,983 B2 | 5/2008 | DeWind et al. |
| 7,375,803 B1 | 5/2008 | Bamji |
| 7,379,817 B1 | 5/2008 | Tyson et al. |
| 7,380,633 B2 | 6/2008 | Shen et al. |
| 7,380,948 B2 | 6/2008 | Schofield et al. |
| 7,388,182 B2 | 6/2008 | Schofield et al. |
| 7,391,563 B2 | 6/2008 | McCabe et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,459,664 B2 | 12/2008 | Schofield et al. |
| 7,488,099 B2 | 2/2009 | Fogg et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,655,894 B2 | 2/2010 | Schofield et al. |
| 7,676,087 B2 | 3/2010 | Dhua et al. |
| 7,720,580 B2 | 5/2010 | Higgins-Luthman |
| 7,792,329 B2 | 9/2010 | Schofield et al. |
| 7,843,451 B2 | 11/2010 | Lafon |
| 7,855,755 B2 | 12/2010 | Weller et al. |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri et al. |
| 7,914,187 B2 | 3/2011 | Higgins-Luthman et al. |
| 7,930,160 B1 | 4/2011 | Hosagrahara et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,095,310 B2 | 1/2012 | Taylor et al. |
| 8,098,142 B2 | 1/2012 | Schofield et al. |
| 8,203,440 B2 | 6/2012 | Schofield et al. |
| 8,213,646 B2 * | 7/2012 | Matsumoto ............... H04S 7/30 381/310 |
| 8,222,588 B2 | 7/2012 | Schofield et al. |
| 8,224,031 B2 | 7/2012 | Saito |
| 8,314,689 B2 | 11/2012 | Schofield et al. |
| 8,324,552 B2 | 12/2012 | Schofield et al. |
| 8,386,114 B2 | 2/2013 | Higgins-Luthman |
| 8,581,745 B2 | 11/2013 | Faber |
| 8,872,919 B2 | 10/2014 | Watanabe et al. |
| 8,953,011 B2 | 2/2015 | Lang et al. |
| 9,013,579 B2 | 4/2015 | Ikeda et al. |
| 9,041,806 B2 | 5/2015 | Baur et al. |
| 9,129,495 B1 | 9/2015 | Stewart et al. |
| 9,789,821 B2 | 10/2017 | Baur et al. |
| 10,053,012 B2 | 8/2018 | Baur et al. |
| 10,300,856 B2 | 5/2019 | Baur et al. |
| 10,875,455 B2 | 12/2020 | Baur et al. |
| 11,285,877 B2 | 3/2022 | Baur et al. |
| 2002/0005778 A1 | 1/2002 | Breed et al. |
| 2002/0075387 A1 | 6/2002 | Janssen |
| 2002/0113873 A1 | 8/2002 | Williams |
| 2002/0167589 A1 | 11/2002 | Schofield et al. |
| 2003/0137586 A1 | 7/2003 | Lewellen |
| 2003/0222982 A1 | 12/2003 | Hamdan et al. |
| 2004/0164228 A1 | 8/2004 | Fogg et al. |
| 2005/0174429 A1 | 8/2005 | Yanai |
| 2005/0195383 A1 | 9/2005 | Breed et al. |
| 2005/0219852 A1 | 10/2005 | Stam et al. |
| 2005/0222753 A1 | 10/2005 | Ishikawa |
| 2005/0237385 A1 | 10/2005 | Kosaka et al. |
| 2005/0278088 A1 | 12/2005 | Thorner |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0188347 A1 * | 8/2007 | Schofield ............. G01S 13/931 340/903 |
| 2007/0242339 A1 | 10/2007 | Bradley |
| 2008/0068520 A1 * | 3/2008 | Minikey ................ G02B 27/01 349/114 |
| 2008/0147321 A1 | 6/2008 | Howard et al. |
| 2008/0192132 A1 | 8/2008 | Bechtel et al. |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2010/0097469 A1 | 4/2010 | Blank et al. |
| 2010/0225762 A1 | 9/2010 | Augst |
| 2012/0045112 A1 | 2/2012 | Lundblad et al. |
| 2012/0062743 A1 | 3/2012 | Lynam et al. |

FOREIGN PATENT DOCUMENTS

| | | |
|---|---|---|
| EP | 0353200 A2 | 1/1990 |
| EP | 0426503 A1 | 5/1991 |
| EP | 0492591 A1 | 7/1992 |
| EP | 0640903 A1 | 3/1995 |
| EP | 0788947 A1 | 8/1997 |
| EP | 1074430 A1 | 2/2001 |
| EP | 1211132 A2 | 6/2002 |
| JP | 59114139 | 7/1984 |
| JP | 6080953 | 5/1985 |
| JP | 6079889 | 10/1986 |
| JP | 6272245 | 5/1987 |
| JP | S62131837 A | 6/1987 |
| JP | 6414700 | 1/1989 |
| JP | 03099952 | 4/1991 |
| JP | 4114587 B2 | 4/1992 |
| JP | 104127280 A | 4/1992 |
| JP | 0577657 | 3/1993 |
| JP | 05050883 | 3/1993 |
| JP | 5213113 | 8/1993 |
| JP | H06227318 A | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 2630604 | 7/1997 |
| JP | 2000118298 A | 4/2000 |
| JP | 200274339 A | 3/2002 |
| JP | 200383742 A | 3/2003 |
| JP | 2003081014 A | 3/2003 |
| JP | 20041658 A | 1/2004 |
| JP | 2007288586 A | 11/2007 |
| WO | 1994019212 A2 | 9/1994 |
| WO | 1996038319 A2 | 12/1996 |

(56) References Cited

FOREIGN PATENT DOCUMENTS

OTHER PUBLICATIONS

Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Borenstein et al., "Where am I? Sensors and Method for Mobile Robot Positioning", University of Michigan, Apr. 1996, pp. 2, 125-128.
Kastrinaki et al., "A survey of video processing techniques for traffic applications".
Mei Chen et al., Aurora: A Vision-Based Roadway Departure Warning System, The Robotics Institute, Carnegie Mellon University, published Aug. 9, 1995.
Parker (ed.), McGraw-Hill Dictionary of Scientific and Technical Terms Fifth Edition (1993).
Philomin et al., "Pedestrain Tracking from a Moving Vehicle".
Pratt, "Digital Image Processing, Passage—ED.3", John Wiley & Sons, US, Jan. 1, 2001, pp. 657-659, XP002529771.
Sun et al., "On-road vehicle detection using optical sensors: a review".
Tokimaru et al., "CMOS Rear-View TV System with CCD Camera", National Technical Report vol. 34, No. 3, pp. 329-336, Jun. 1988 (Japan).
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Requirements for Motion Estimation in Image Sequences for Traffic Applications", IEEE, US, vol. 1, May 24, 1999, pp. 145-150, XP010340272.
Van Leeuwen et al., "Real-Time Vehicle Tracking in Image Sequences", IEEE, US, vol. 3, May 21, 2001, pp. 2049-2054, XP010547308.
Vellacott, Oliver, "CMOS in Camera," IEE Review, pp. 111-114 (May 1994).
Vlacic et al. (Eds), "Intelligent Vehicle Tecnologies, Theory and Applications", Society of Automotive Engineers Inc., edited by SAE International, 2001.
Wang et al., CMOS Video Cameras, article, 1991, 4 pages, University of Edinburgh, UK.
Zheng et al., "An Adaptive System for Traffic Sign Recognition," IEEE Proceedings of the Intelligent Vehicles '94 Symposium, pp. 165-170 (Oct. 1994).
European Search Report dated Jan. 21, 2013 from corresponding European Patent Application No. EP10814347.
International Search Report and Written Opinion dated Oct. 28, 2010 from corresponding PCT Patent Application No. PCT/US2010/047256.

* cited by examiner

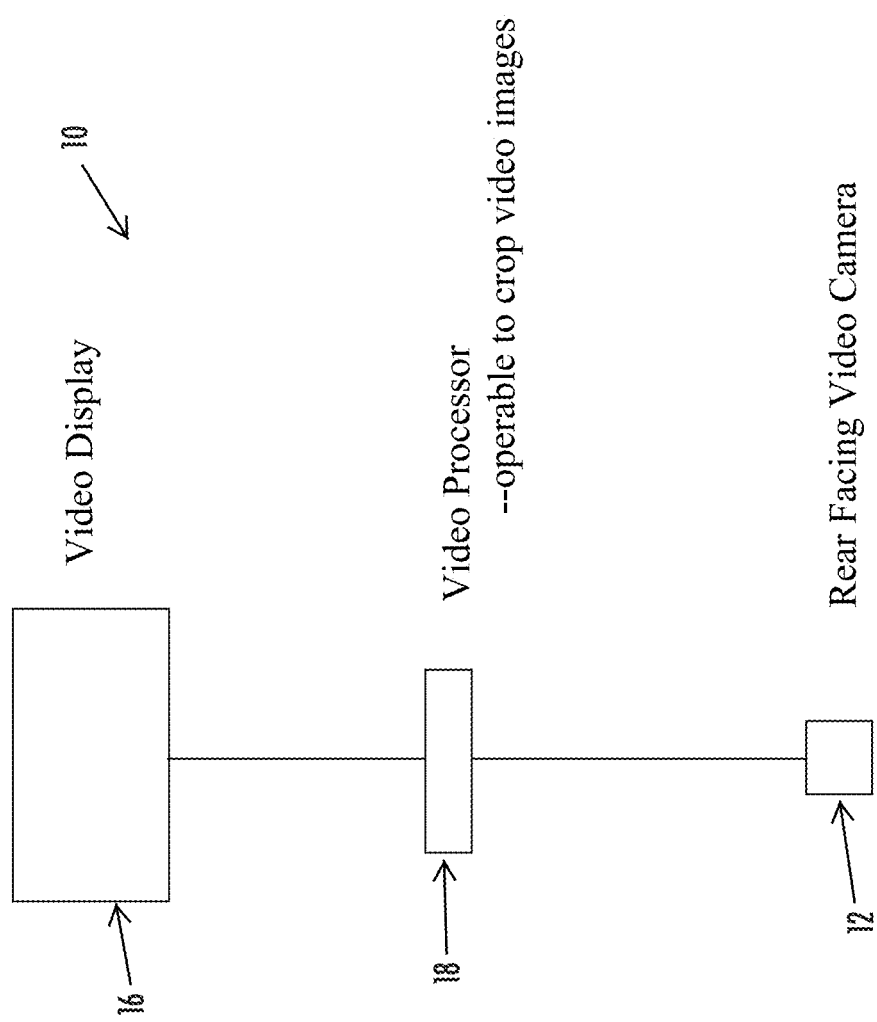

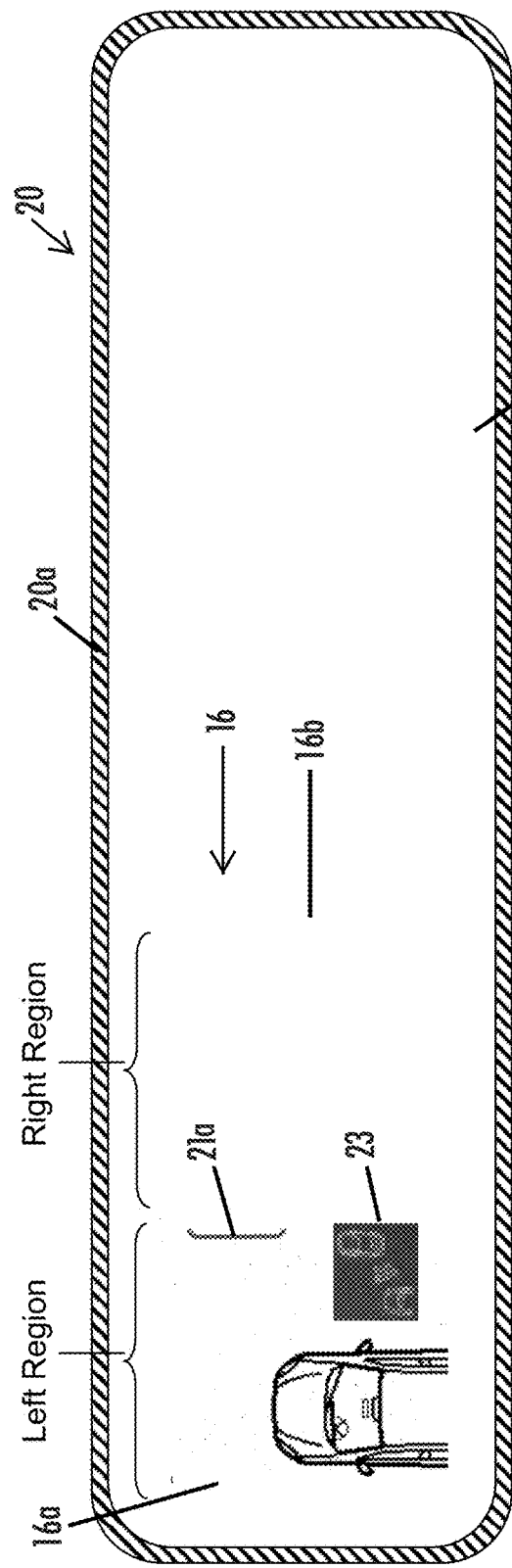
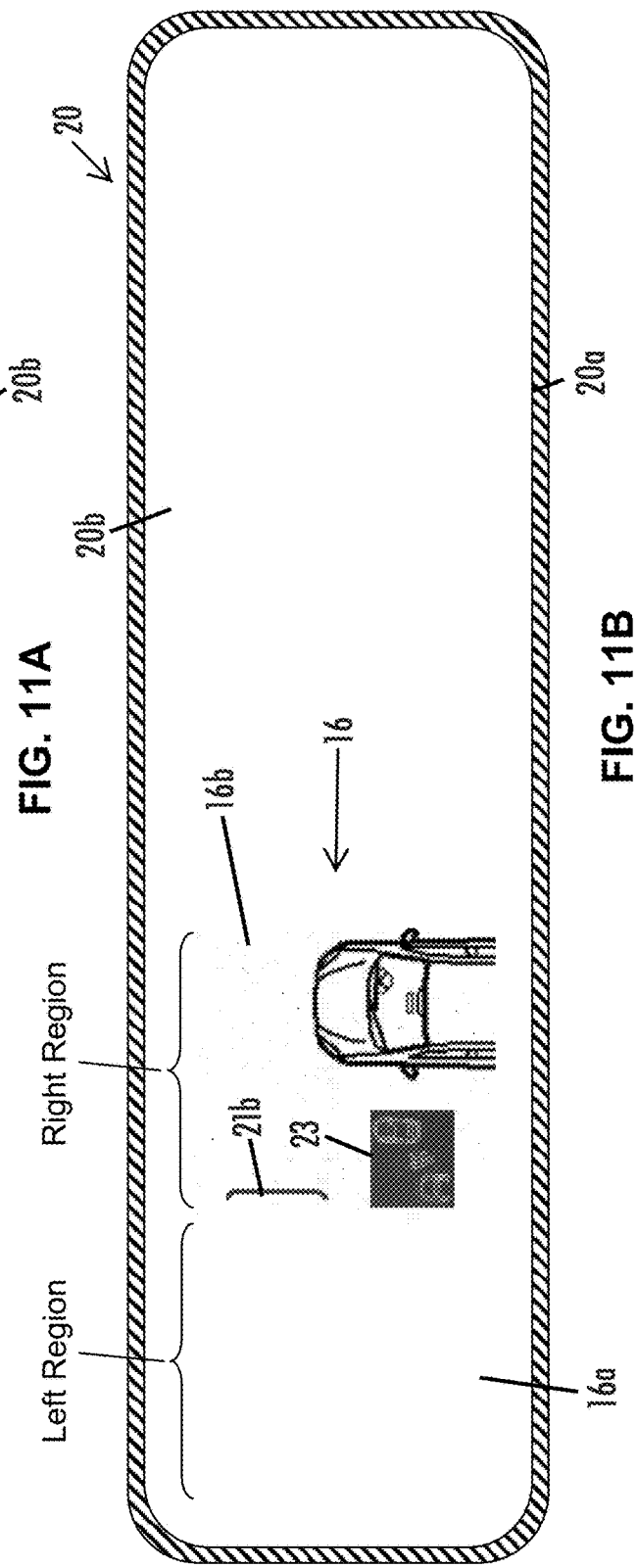
FIG. 11A
FIG. 11B

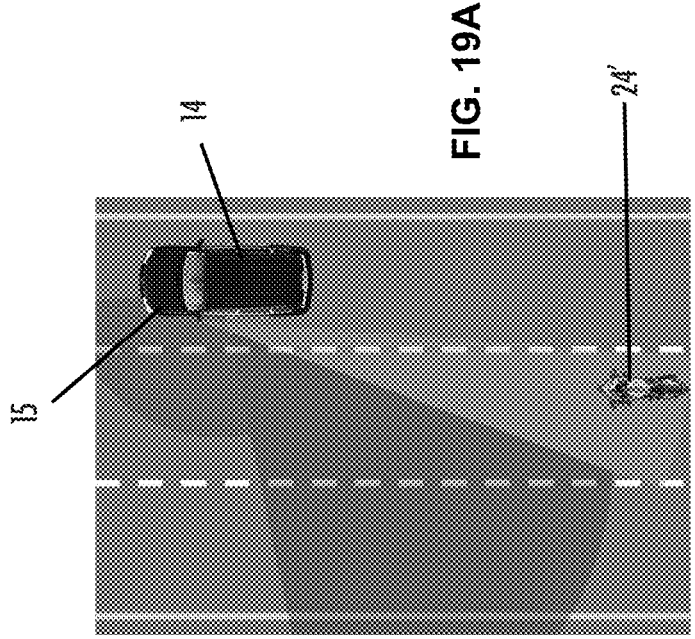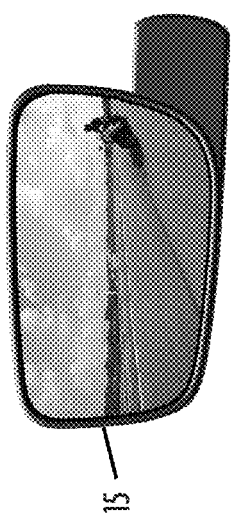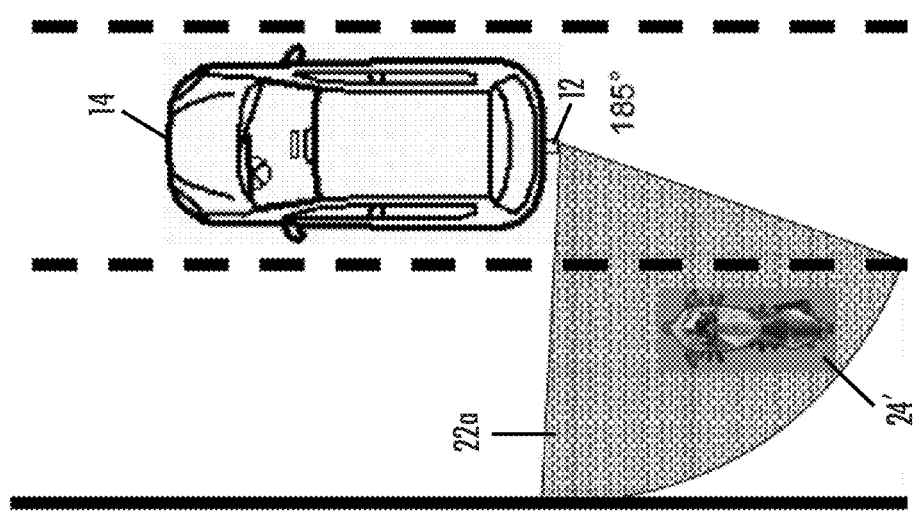

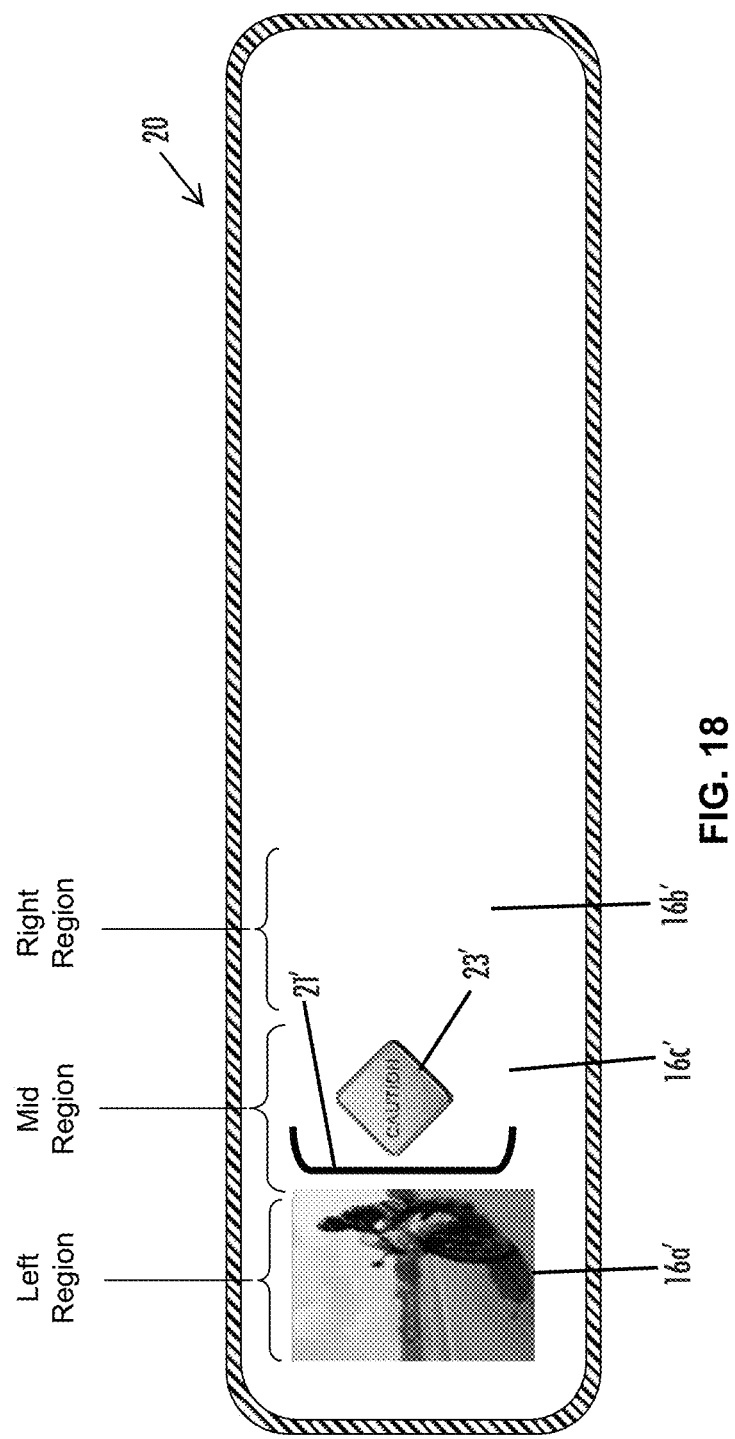

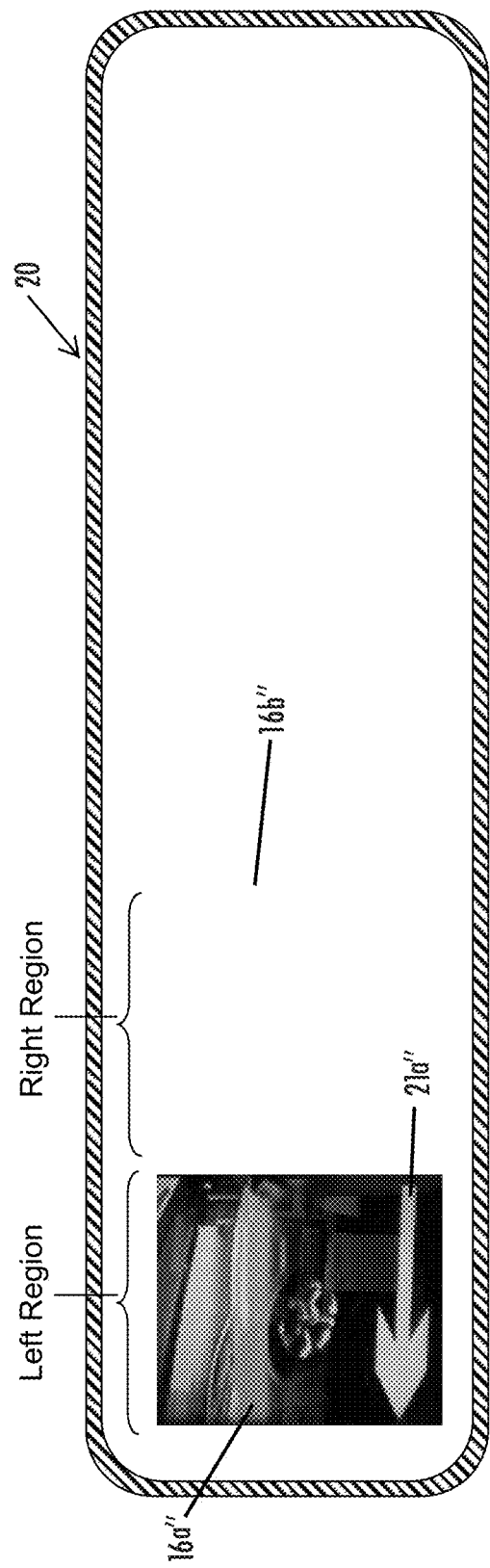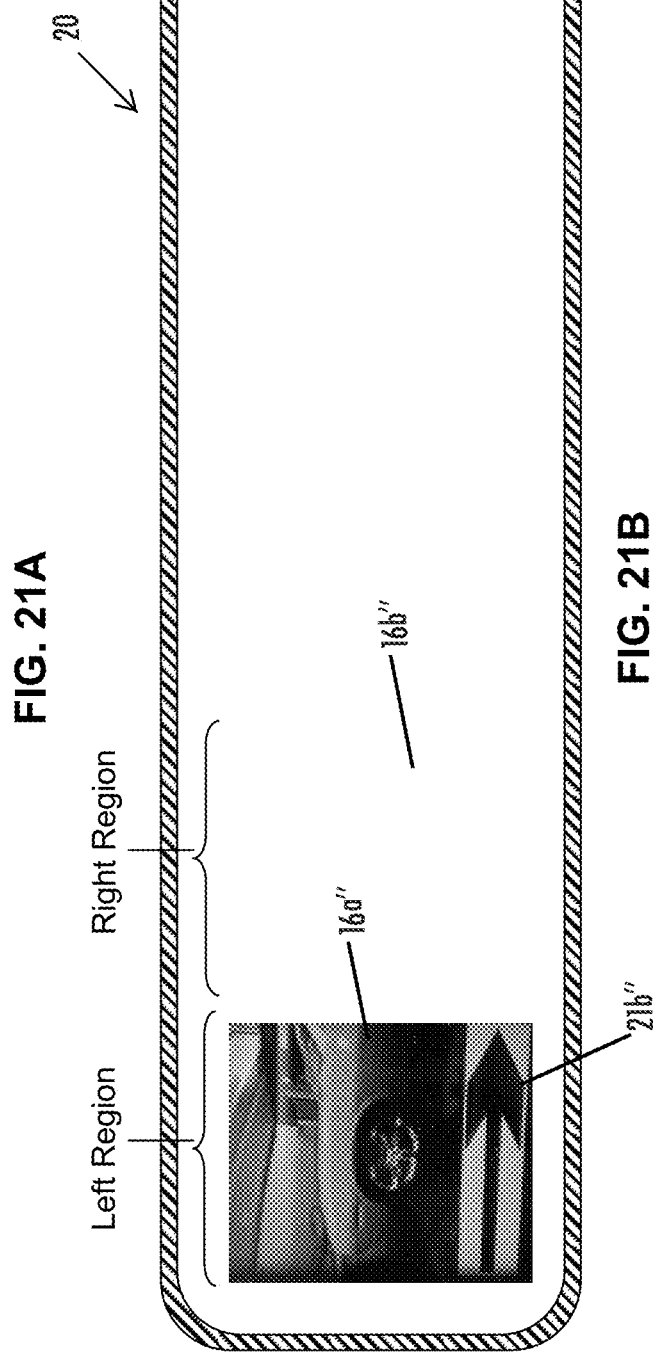
FIG. 21A
FIG. 21B

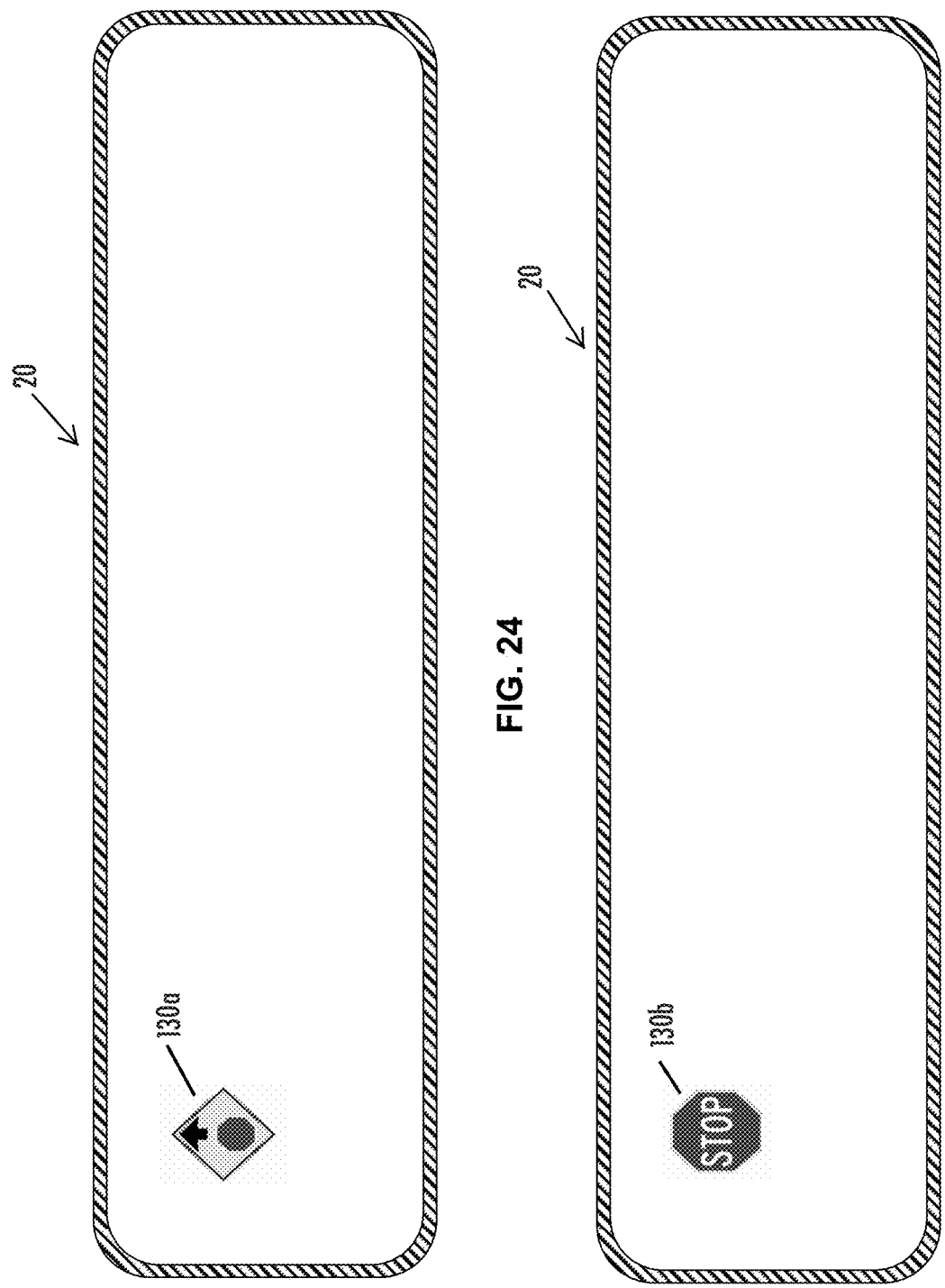

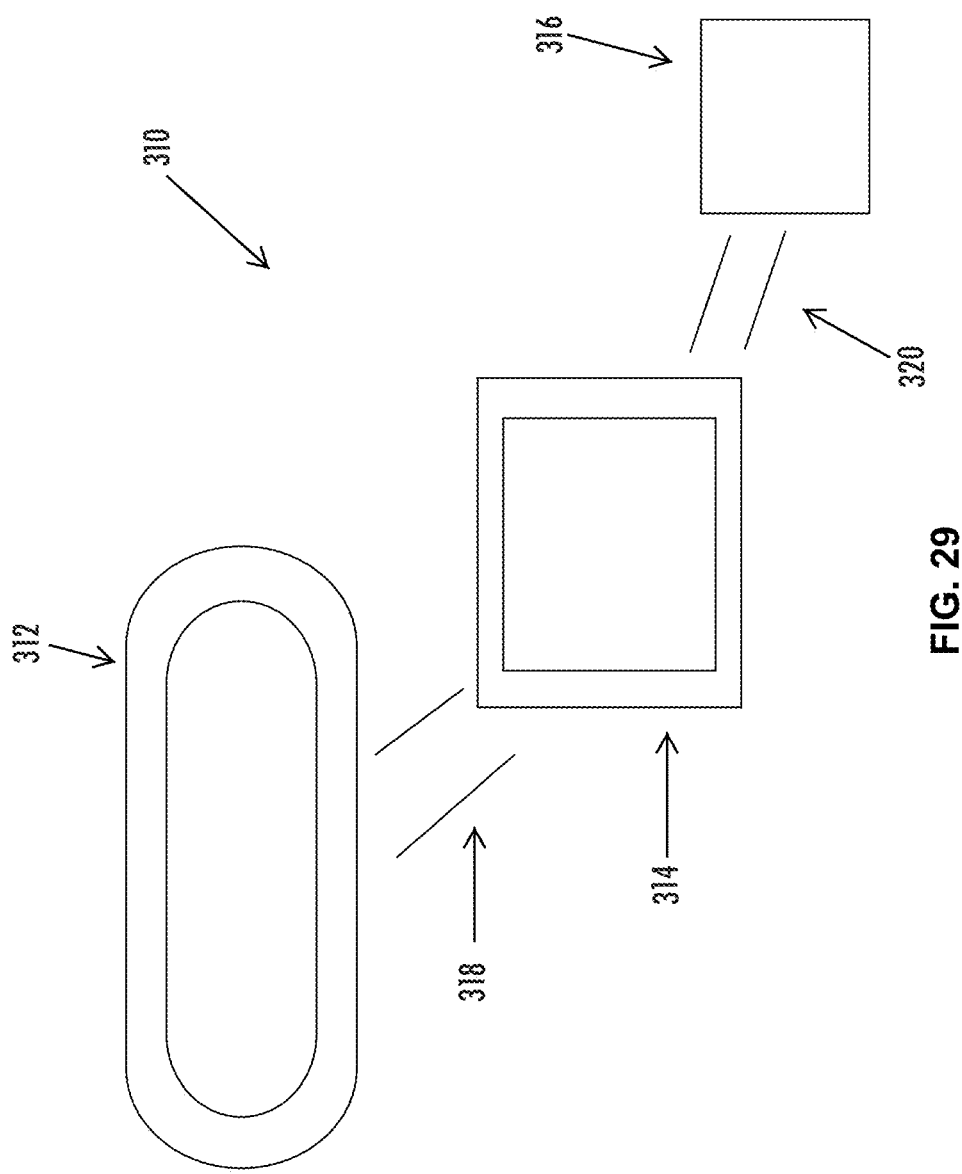

VEHICULAR VISION SYSTEM

CROSS REFERENCE TO RELATED APPLICATIONS

The present application is a continuation of U.S. patent application Ser. No. 17/247,697, filed Dec. 21, 2020, now U.S. Pat. No. 11,285,877, which is a continuation of U.S. patent application Ser. No. 16/413,694, filed May 16, 2019, now U.S. Pat. No. 10,875,455, which is a continuation of U.S. patent application Ser. No. 16/105,162, filed Aug. 20, 2018, now U.S. Pat. No. 10,300,856, which is a continuation of U.S. patent application Ser. No. 15/784,228, filed Oct. 16, 2017, now U.S. Pat. No. 10,053,012, which is a continuation of U.S. patent application Ser. No. 14/719,446, filed May 22, 2015, now U.S. Pat. No. 9,789,821, which is a continuation of U.S. patent application Ser. No. 13/393,384, filed Feb. 29, 2012, now U.S. Pat. No. 9,041,806, which is a 371 U.S. national phase filing of PCT Application No. PCT/US10/47256, filed Aug. 31, 2010, which claims the benefit of U.S. provisional applications, Ser. No. 61/351,513, filed Jun. 4, 2010, and Ser. No. 61/238,862, filed Sep. 1, 2009, which are hereby incorporated herein by reference in their entireties.

FIELD OF THE INVENTION

The present invention relates generally to the field of vision systems and display systems for vehicles.

BACKGROUND OF THE INVENTION

Road safety issues associated with side lane blind spots are known. Drivers often attempt or execute a side lane change maneuver unaware of the presence of another vehicle overtaking the vehicle in the immediate adjacent side lane. The driver of the vehicle usually is not able to view the overtaking vehicle in the driver's side view mirror due to the restricted field of view provided by that side view mirror. The overtaking vehicle, not being visible to the driver using his or her side view mirror and not yet visible in the driver's peripheral vision, is essentially in a side lane blind spot. Numerous mirror-based solutions to such blind spot concerns have been suggested, such as described in U.S. Pat. No. 6,315,419, which is hereby incorporated herein by reference in its entirety. It has also been suggested to place multiple cameras around and about the vehicle to provide an improved blind spot detection and alert system, such as described in U.S. Pat. Nos. 5,289,321; 5,670,935 and/or 7,111,968, which are hereby incorporated herein by reference in their entireties. Such prior systems involve mirrors and/or multiple cameras and multiple displays, and thus require complexity and cost.

SUMMARY OF THE INVENTION

The present invention provides an imaging or vision system, with a video display screen (such as a video display screen disposed at or in or near the interior rearview mirror assembly of the vehicle) that displays video images captured by a camera or image sensor of the vehicle, such as a rearward facing camera of a reverse backup-aid rear vision system present on the vehicle for capturing images of the rear blind zone area immediately rearward and to the sides of the vehicle for assisting the driver of the equipped vehicle in making a reversing maneuver. In accordance with the present invention, the video display screen viewable to the driver of the vehicle (preferably a video mirror display) displays video images captured by the rearward-facing video camera during a reversing maneuver to provide real-time video of a rearward blind zone for monitoring potential hazards present to the rear (such as children or obstacles or the like) as part of a backup-assist functionality when the driver is executing a reverse back-up maneuver, and the same video display screen selectively displays during forward driving situations a portion or portions of the video images captured by the same or common rearward-facing video camera while the vehicle is being driven forward, in order to provide a real-time video display principally of a side lane adjacent to the vehicle so as to provide a side lane blind spot monitoring/lane change aid functionality, and such functionality may be responsive to the driver of the equipped vehicle actuating a turn signal indicator or responsive to machine vision detection of another vehicle in or at or approaching a side blind spot of the equipped vehicle or responsive to a lane departure warning system or the like.

The rear backup video camera captures video image data for processing by a video image processor, and the video image data comprises at least two image data sets that encompass a respective zone or region of the field of view of the rear backup camera. For example, the video image data set may comprise a left zone image data set and a right zone image data set, with the left zone image data set encompassing video images of another vehicle approaching from the rear of and/or overtaking the equipped vehicle in the left side lane, and with the right zone image data set encompassing video images of another vehicle approaching from the rear and/or overtaking the equipped vehicle in the right side lane. The video images captured in or derived from the image data sets are selectively displayed on the video display screen, and may be displayed on one or more portions or regions of the video display screen.

For example, the video display screen may be operable or addressable in at least two (and optionally and preferably at least three) addressable or operable or actuatable zones or regions (such as a left region, a center region and a right region) to display respective portions of the rearward images captured by the rear backup camera at the rear of the equipped vehicle. The two or three (or more) zones or regions of the video display screen may have similar or different cross dimensions depending on the particular application and desired display options of the vision and display system. Optionally, the video display screen (either at a zone or region that is currently displaying video images or at one of the zones or regions that is not currently displaying video images) may display an iconistic representation of the equipped vehicle (either as an addition/enhancement to or a replacement for the real time video display of video images captured by the rear camera) and/or an alert or warning indication/signal to further enhance the driver's cognitive recognition and awareness of the displayed scene at the mirror assembly or at another display location in the vehicle.

According to an aspect of the present invention, a vehicular vision system includes a rearward facing camera at a rear portion of a vehicle and a video display screen operable to display video images captured by the rearward facing camera (such as in response to the driver of the vehicle shifting a gear actuator to a reverse gear position to initiate a reversing maneuver), preferably utilizing the full field of view of the rearward facing camera to display rearward images during a reversing maneuver of the vehicle. The system includes a video processor or control that processes video image data captured by the rearward facing camera to provide an enhancement or selective display or selective cropping or zooming or adaptation of a display of a blind spot for viewing by the driver of the vehicle. The system, when the vehicle is driving in a forward direction of travel, may be operable to detect the presence of another vehicle at the side of and/or rearward of the equipped vehicle, such as via machine vision utilizing an video processor and/or image processor capable of object detection, and is operable to display a video image of the area or region rearward and sideward of the equipped vehicle at which the other vehicle is detected, to automatically alert the driver of the equipped vehicle of the presence of the other vehicle.

Optionally, the video display screen may display video images of the local region or area rearward and sideward of the equipped vehicle at a portion of the video display screen and may display an iconistic display or alert or graphic overlay at that portion of the video display screen and/or at another portion of the same or common video display screen to alert the driver of the equipped vehicle and to enhance the driver's cognitive awareness of the purpose of the video images being displayed by the video display screen and to enhance the driver's situational awareness of vehicles approaching or in a side lane blind spot when the driver is contemplating and/or is executing a lane change maneuver into that adjacent side lane. For example, if the system detects another vehicle at or approaching to the rear and left side of the equipped vehicle (or if the driver actuates a turn signal indicating a lane change into that side lane), the video display screen may display a left side region of the captured rearward image at a left side or portion of the video display screen and may display an iconistic representation of a vehicle to the left and rear of a subject vehicle at the right side of the video display screen, to enhance the driver's cognitive awareness and understanding of the displayed image.

Optionally, and preferably, the video display screen may be disposed at or in an interior rearview mirror assembly of the vehicle and behind a mirror reflective element. Optionally, the video display screen, when operated to display images or information, may be viewable through a transflective mirror reflector of a reflective element of the mirror assembly. The portion of the video display screen that displays the video images (such as via backlighting of a liquid crystal video display or the like) may be viewable through the transflective mirror reflector while the portion of the video display that does not display video images may be dark (i.e., may be non-emitting) or otherwise non-displaying or not actuated, or may display non-video information, such as an iconistic representation of what may be happening about the vehicle or a graphic overlay or the like. The driver viewing the mirror at the non-video displaying portion of the video display screen views a reflected image as reflected by the transflective mirror reflector of the mirror reflective element other than where non-video information may be being displayed, thus maximizing the rear vision capability of the interior mirror while the driver is driving down the road or highway. In this regard, having a high contrast ratio for the video display device used is beneficial and is preferred. The vision and display system of the present invention thus provides a blind spot side lane display or alert at the interior rearview mirror assembly without substantially interfering with the driver's rearward field of view at the mirror reflective element of the interior rearview mirror assembly.

In applications where the video display is part of a transflective interior video mirror assembly, the presence of the video screen is at least substantially covert when not displaying video or other information, and so when the vehicle is driven in a forward direction, the video mirror display of side blind spot video images is on-demand and displays when needed/appropriate to the driver's driving task; and when the video display is not displaying information or images, the full mirror reflectance functionality is available from the full surface area of the transflective mirror reflector that the video display is disposed behind and that emits through when activated to display information.

Optionally, the video processor of the system may include a decoder that decodes a NTSC signal from the rearward facing camera or image sensor of the vehicle. The decoder may have a microprocessor that is operable to control the video display screen, such that the images are processed and displayed with a common microprocessor, thereby obviating the need for a separate microprocessor for the video display screen. The decoder may be operable to at least provide on screen display capability, provide video decoding, at least partially control dimming of the transflective electrochromic mirror reflective element, and at least partially control the intensity of the video display screen.

Therefore, the vision system or display system of the present invention provides a combined rear vision system or blind zone display or backup assist system and a side lane blind spot vision system or lane change assist system that utilizes a single or common rearward facing camera at the rear of the vehicle, and preferably provides display at a single or common video display of the vehicle in a manner that is cognitively recognizable, appreciable and usable by the driver of the equipped vehicle. The image data captured by the rearward facing camera may be processed to display rearward images of the scene behind the vehicle when the vehicle is shifted into reverse and during a reversing maneuver, and the video image data captured by the rearward facing camera may be processed and cropped or manipulated to display rearward and sideward video images of the scene rearward and sideward of the equipped vehicle to alert the driver of the presence of another vehicle at or in or approaching the equipped vehicle at that side of the vehicle, such as responsive to the driver of the equipped vehicle actuating a turn signal indicator to change lanes while driving along a road or responsive to detection of another vehicle at the side or rear or at or near or approaching a side blind spot area of the equipped vehicle. Graphics, icons and/or other overlays or computer generated indicia may be generated and co-displayed with the captured video image or portion of the captured video image in a manner that is accretive to and that enhances the driver's situational awareness to the rear and to the side of the equipped vehicle.

The rearward facing camera thus serves a dual function (backup assist and blind spot or lane change assist) in that, when the driver is executing a reversing maneuver, the rearward facing camera and its associated driver-viewable video display provides a rear backup reverse aid functionality, presenting to the driver a wide angle rearward and sideward view (such as preferably at least about 130 degrees, more preferably at least about 170 degrees and more preferably at least about 180 degrees) of a blind zone to the rear and to the sides of the vehicle while reversing. When the equipped vehicle is not reversing and is normally driven forward, the same or common rear camera and the same or common associated driver-viewable video display selectively presents video images (preferably accompanied by appropriate graphic overlays or icons that enhance the driver's cognitive situational awareness) that show to the driver what may be present or not present in or at a side blind spot area of the vehicle or rearwardly approaching the side region of the vehicle when the driver is contemplating and/or executing a side lane maneuver. Such selective display may be triggered by the likes of the driver's selection of a turn signal or by machine vision detection of another vehicle at or in or approaching the side blind spot area (such as detected by a lane departure warning system of the vehicle or such as detected by a blind spot detection system of the vehicle or such as by processing video images captured by the rearward facing camera or other sensor) so as to object detect in a manner known in the image processing arts.

These and other objects, advantages, purposes and features of the present invention will become apparent upon review of the following specification in conjunction with the drawings.

BRIEF DESCRIPTION OF THE DRAWINGS

FIG. 1A is a block diagram of the components of the rear vision and display system of FIG. 1;

FIG. 11A is a plan view of a display of the equipped vehicle, showing the rearward left side region of the captured image and showing an iconistic representation of another vehicle at the left side and rearward of the equipped vehicle;

FIG. 11B is a plan view of a display of the equipped vehicle, showing the rearward right side region of the captured image and showing an iconistic representation of another vehicle at the right side and rearward of the equipped vehicle;

FIG. 17 is a schematic of the equipped vehicle showing the rearward and sideward field of view of the rearward facing camera as another vehicle approaches and passes the equipped vehicle at the left side of the equipped vehicle;

FIG. 18 is a plan view of the mirror and display of FIG. 16, showing the rearward left side region of the captured image at the left display zone or region of the display and showing an iconistic representation of the subject vehicle and an alert at the middle display zone or region of the display;

FIG. 19A is a schematic representation of the equipped vehicle showing the rearward field of view provided by a driver side exterior rearview mirror;

FIG. 19B is a plan view of the driver side exterior rearview mirror of the equipped vehicle, showing the rearward field of view of the driver of the vehicle that encompasses a rearward approaching vehicle;

FIG. 21A is a plan view of the mirror and display of the present invention, showing the left side region of the captured image at a left display zone or region of the display and showing an arrow at the left display zone or region to indicate to the driver that the displayed image is of a vehicle in the left side lane;

FIG. 21B is a plan view of the mirror and display of the present invention, showing the right side region of the captured image at a left display zone or region of the display and showing an arrow at the left display zone or region to indicate to the driver that the displayed image is of a vehicle in the right side lane;

FIGS. 24 and 25 are plan views of a mirror assembly displaying signs in accordance with the present invention;

FIG. 29 is a schematic of a vehicular mirror and accessory system in accordance with the present invention.

DESCRIPTION OF THE PREFERRED EMBODIMENTS

Figure 1:
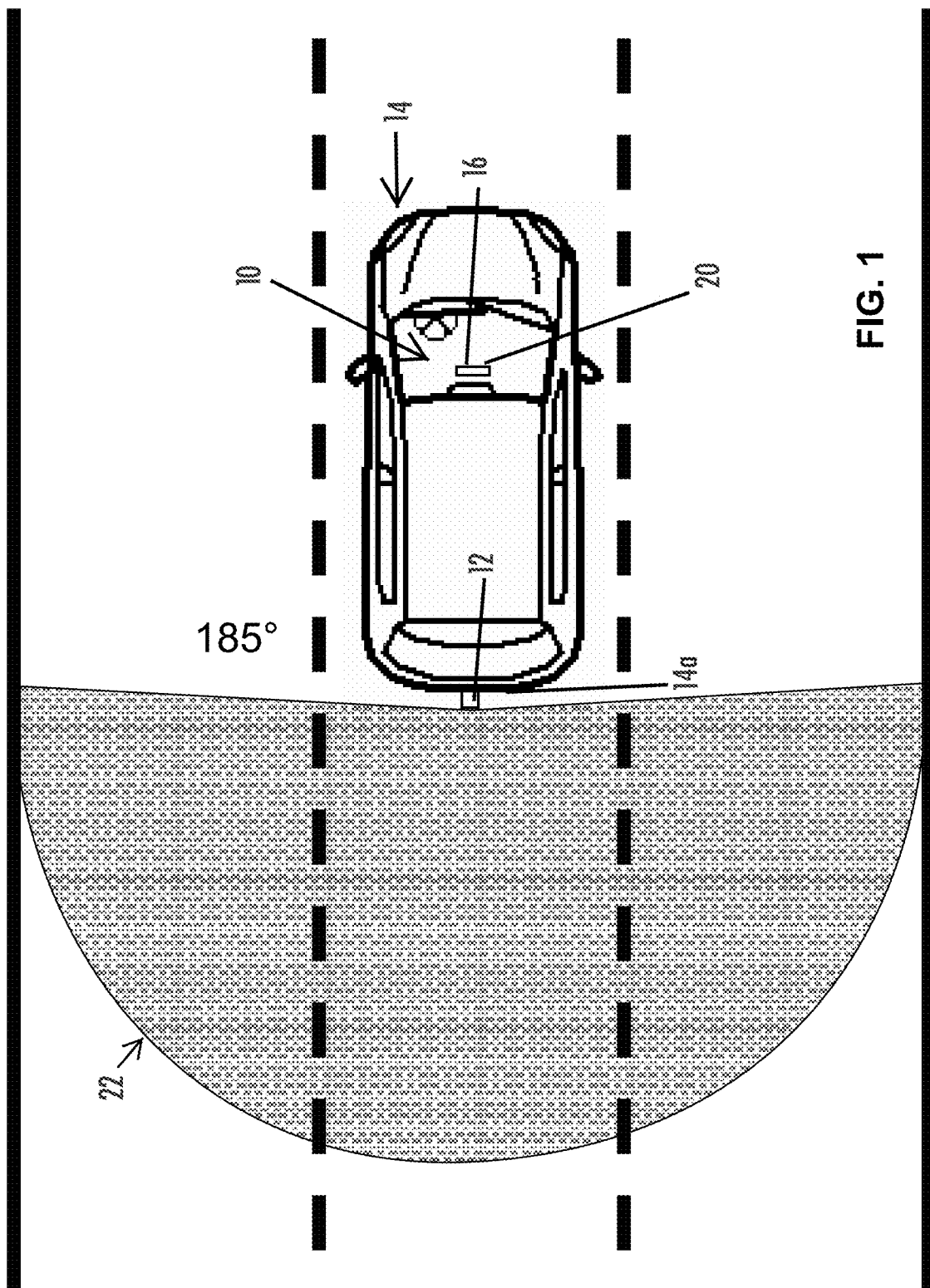
FIG. 1 is a schematic of a vehicle equipped with the rear vision and display system in accordance with the present invention, showing the field of view of the rearward facing camera of the vehicle.
Figure 2:
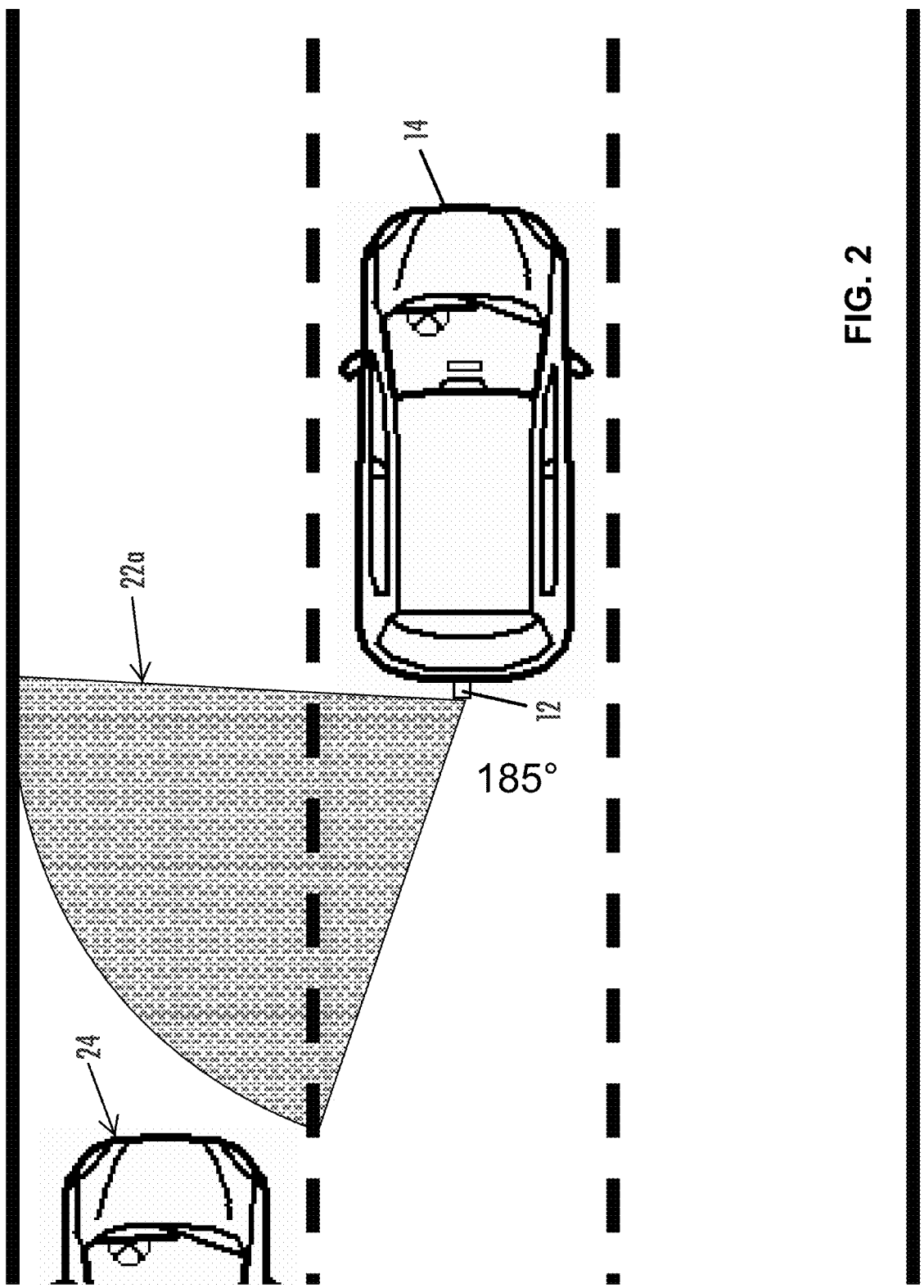
FIGS. 2-5 are schematics of the equipped vehicle showing the rearward and sideward field of view of the rearward facing camera as another vehicle approaches and passes the equipped vehicle at the left side of the equipped vehicle.
Figure 3:
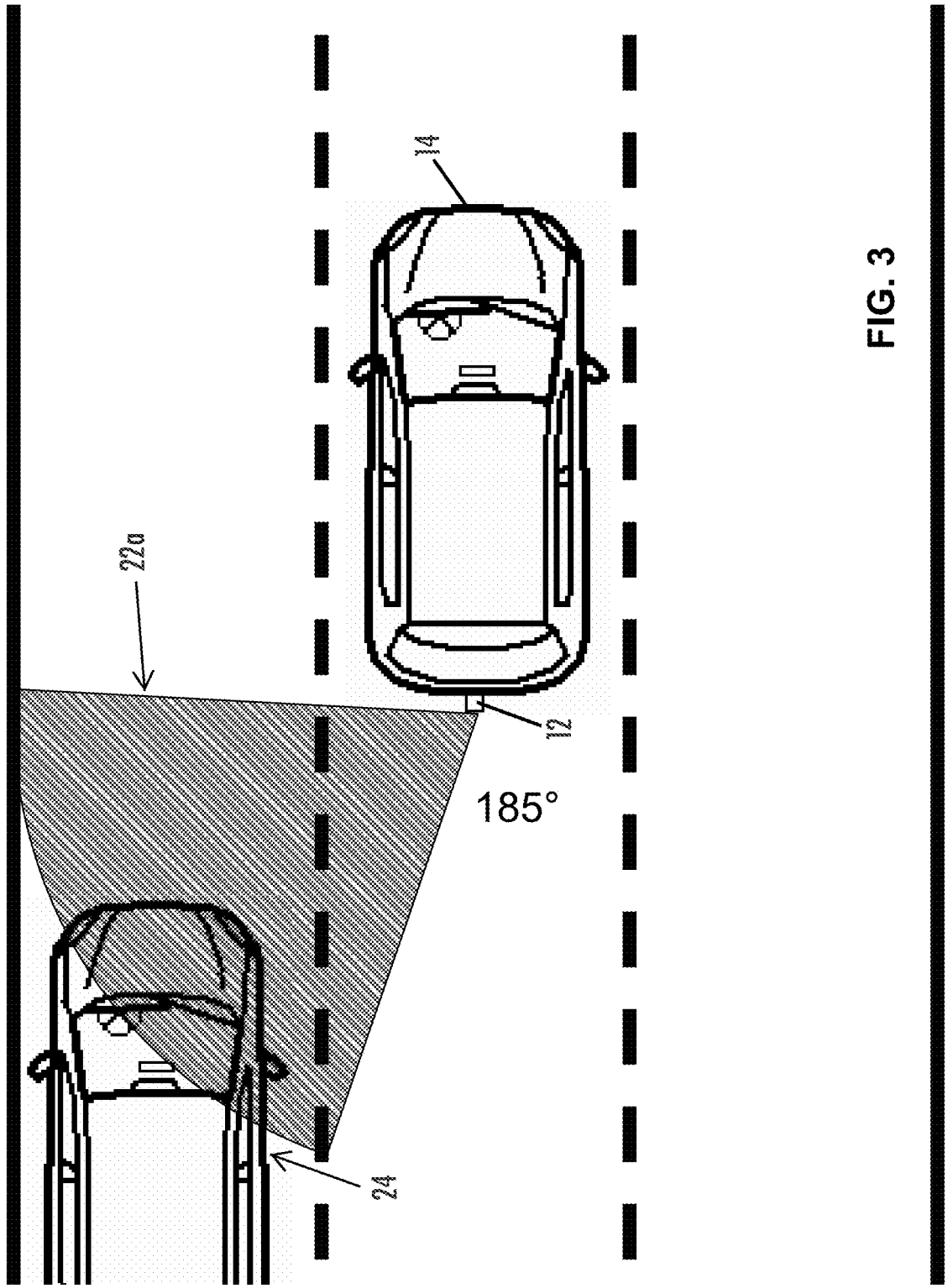

Referring now to the drawings and the illustrative embodiments depicted therein, a vehicular vision system 10 includes a rearward facing video camera or imaging sensor 12 disposed at a rear portion 14a of a vehicle 14, a video display screen 16 disposed at an interior cabin of the vehicle and at or near the windshield 14b of the vehicle, and a video processor 18 for processing image data captured by the rearward facing camera 12 (FIGS. 1 and 1A). The video display screen 16 is responsive to the video processor 18 (which may be operable to crop the video images, may be operable for machine vision objection detection, may be operable for electronic image distortion reduction and/or may be operable for graphic overlay generation) and is operable to display video images captured by the rearward facing camera 12 for viewing by the driver of the vehicle when the driver is normally operating the vehicle. The video display screen 16 may, responsive to the driver of the vehicle shifting the gear actuator of the vehicle to a reverse gear position to initiate a reversing maneuver, display video images captured by the rearward facing camera 12 of the scene occurring behind the vehicle to assist the driver in making a reversing maneuver, as discussed below. Such reversing or rear backup cameras are typically provided with a wide-angle rearward field of view (preferably at least about 130 degrees, more preferably at least about 170 degrees and more preferably at least about 180 degrees, such as about 185 degrees such as shown in FIG. 1) so as to image objects and/or persons and/or animals immediately to the rear of and a distance behind the equipped vehicle and also in the side lane areas sideward of and rearward of the equipped vehicle. Thus, the wide angle field of view of the rearward facing camera encompasses the side lane regions and the rearward facing camera captures images of objects or other vehicles that are at or approaching the equipped vehicle in the side lanes adjacent to the equipped vehicle. The video display screen 16 may, during forward driving of the equipped vehicle, and such as responsive to the driver actuating a turn signal indicator of the vehicle and/or responsive to detection of another vehicle at or near or approaching a blind spot at one or both sides of the equipped vehicle, display video images for viewing by the driver of the vehicle with the field of display of the images restricted to a sideward and rearward region of the captured images so as to selectively only display the pertinent side lane blind spot area/region (and the approaching vehicle or overtaking vehicle or passing vehicle therein) to alert the driver of the presence of the other vehicle and/or to assist the driver in making a lane change, as also discussed below.

Figure 6:
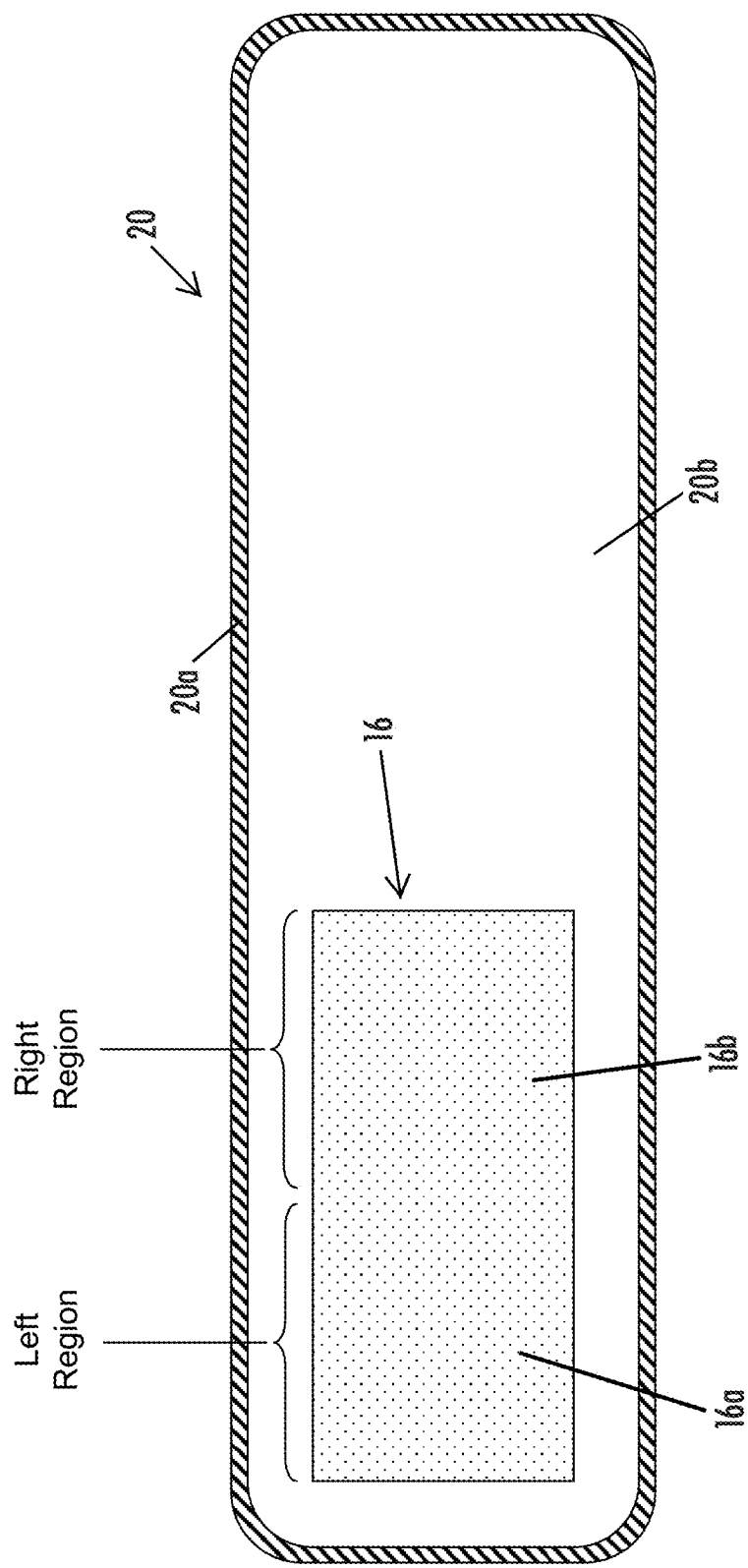
FIG. 6 is a plan view of a mirror assembly incorporating a video display screen having left and right display zones or regions in accordance with the present invention.
Figure 7:
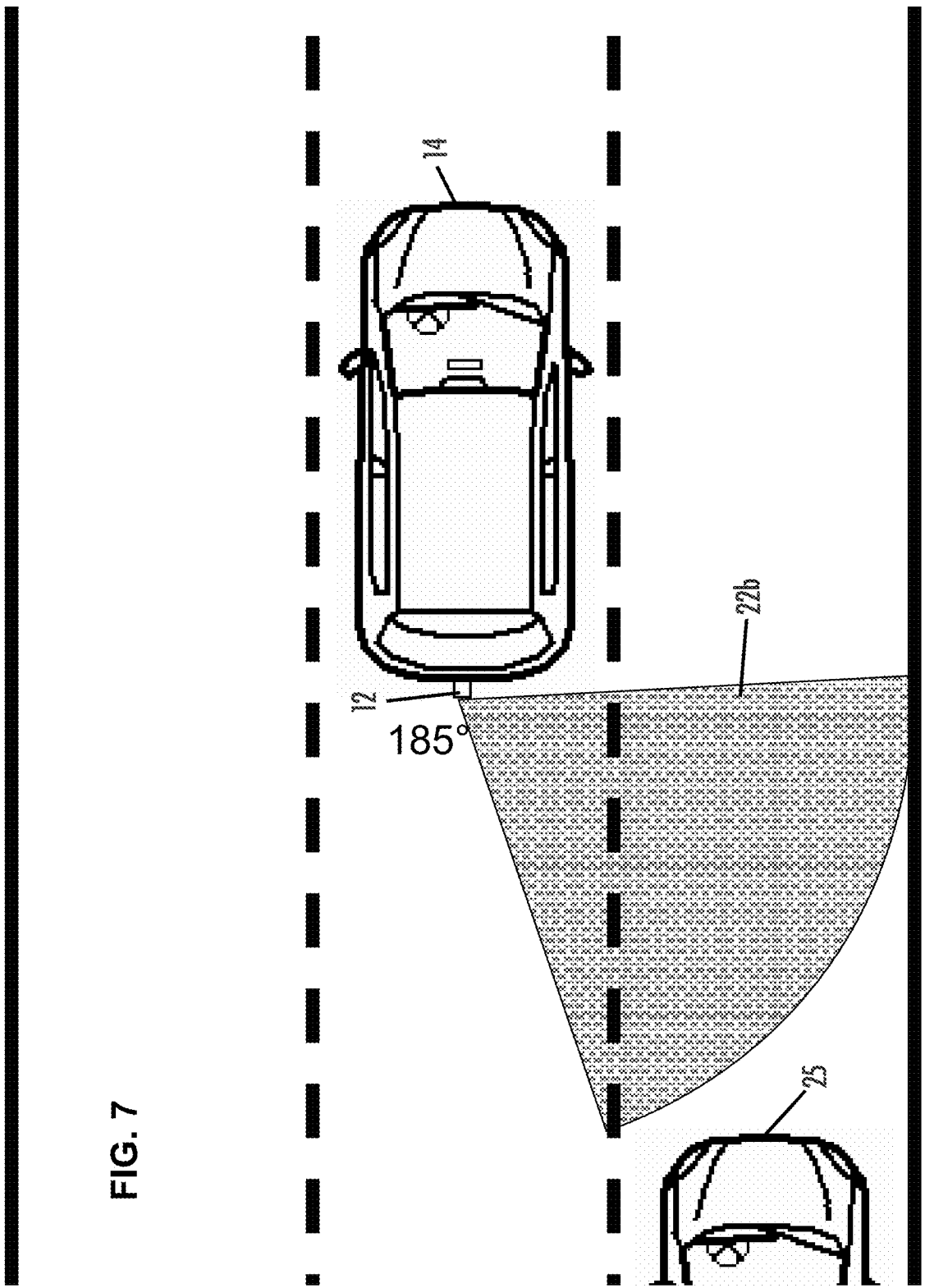
FIGS. 7-10 are schematics of the equipped vehicle showing the rearward and sideward field of view of the rearward facing camera as another vehicle approaches and passes the equipped vehicle at the right side of the equipped vehicle.
Figure 8:
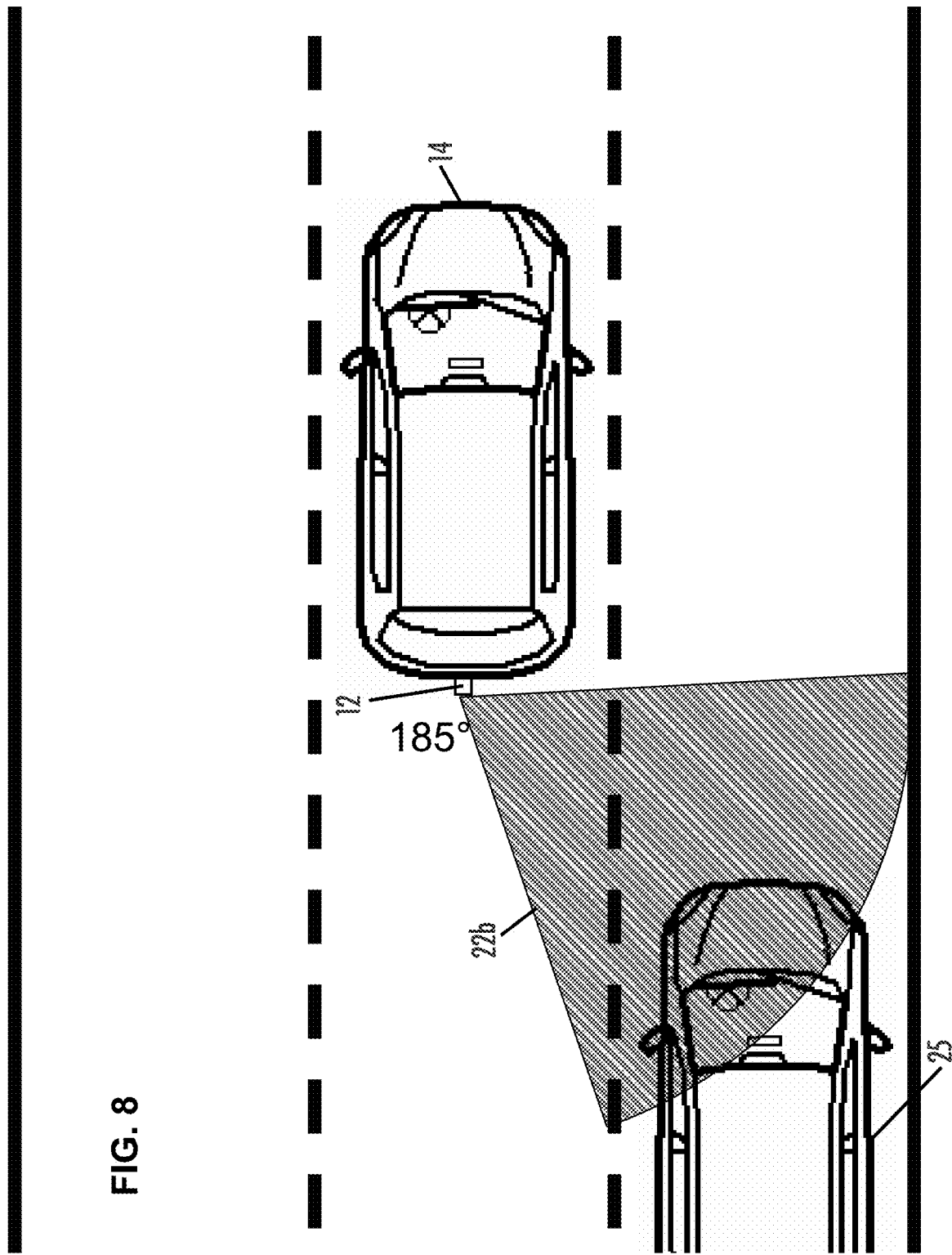
Figure 9:
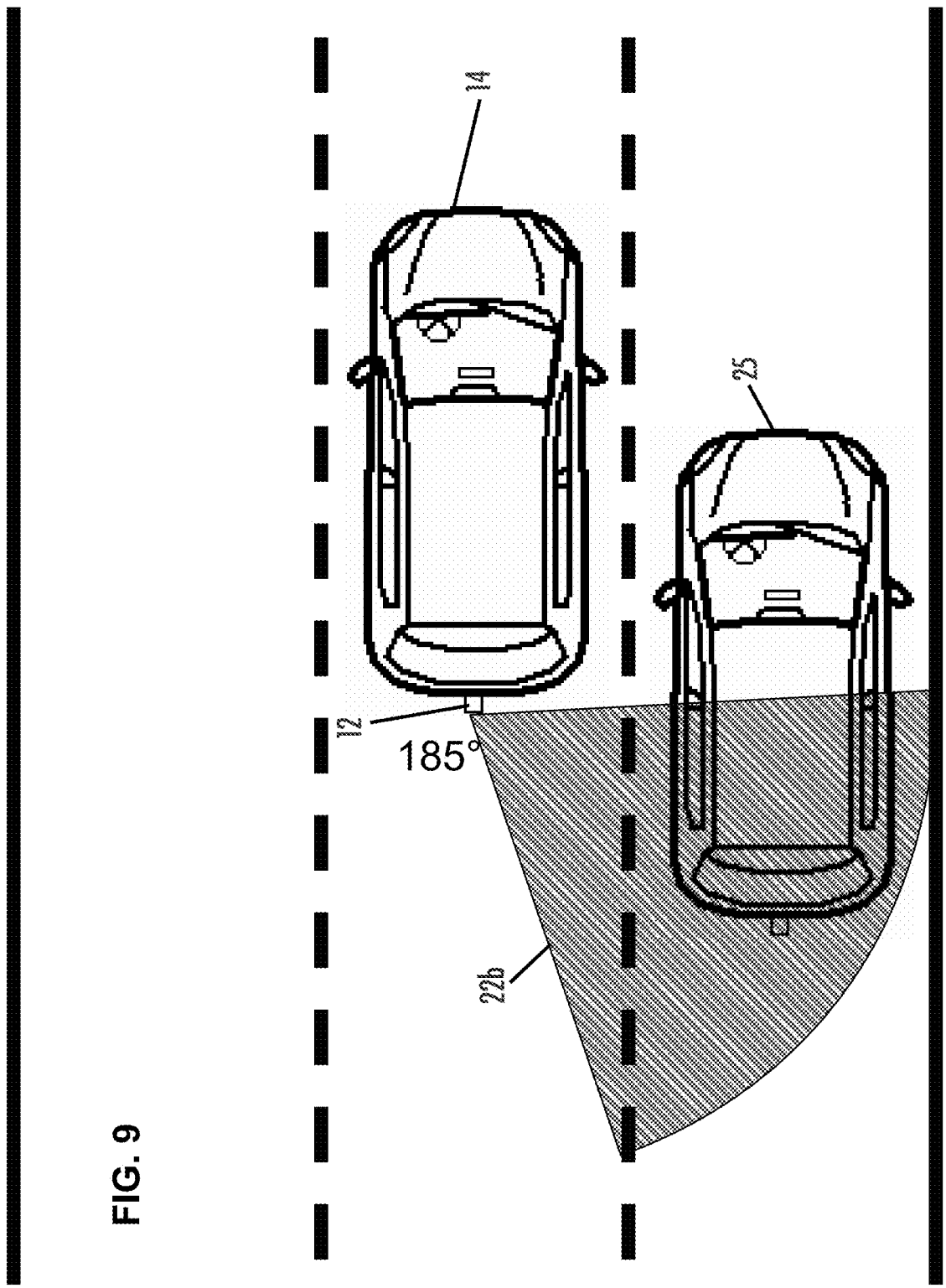
Figure 10:
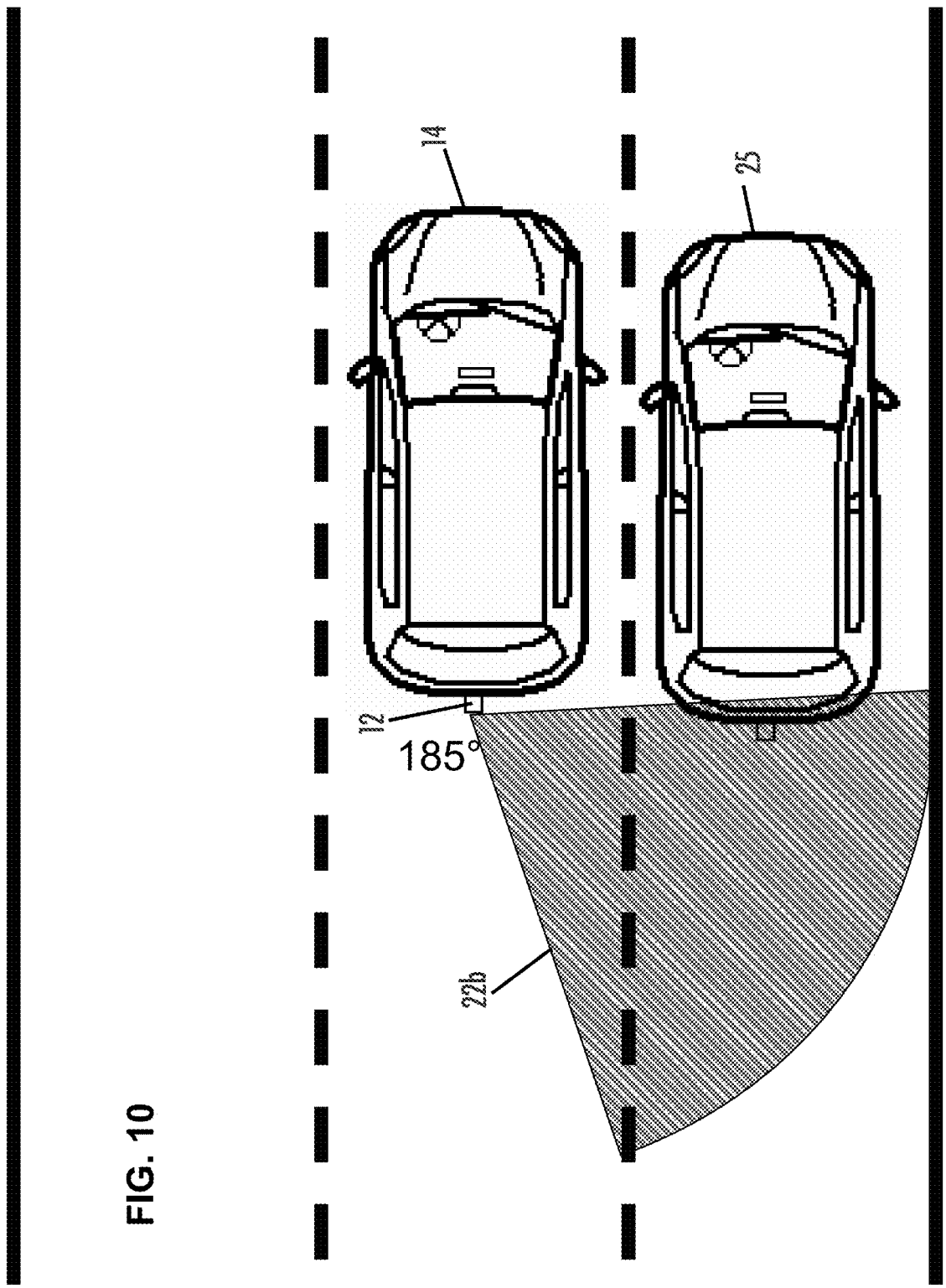

In the illustrated embodiment, the video display screen 16 is disposed at an interior rearview mirror assembly 20 of the vehicle (such as in a mirror casing 20a and behind a reflective element 20b of the mirror assembly 20 such that displayed information is viewable through the reflective element of the mirror assembly, such as shown in FIGS. 6, 11A and 11B and as discussed below). The interior mirror assembly may comprise an electro-optic reflective element, such as an electrochromic reflective element, having a transflective mirror reflector (such as one or more thin metallic films or coatings disposed on a surface of a substrate of the reflective element, such as disposed on the front surface of the rear substrate, commonly referred to as the third surface of the mirror reflective element) that is partially transmissive of visible light therethrough and partially reflectant of visible light incident thereon, such as a mirror reflective element of the types described in U.S. Pat. Nos. 7,274,501; 7,255,451; 7,195,381; 7,184,190; 5,668,663; 5,724,187 and/or 6,690,268, which are all hereby incorporated herein by reference in their entireties). Thus, the video display screen, when operating to display video images or the like, is viewable through the transflective mirror reflector and the mirror reflective element by the driver of the vehicle and, when the video display screen is not operating to display video images or the like, the video display screen is not readily viewable or observable or discernible to the driver of the vehicle, such that the presence of the video display screen is rendered covert by the transflective mirror reflector and the driver of the vehicle normally views the mirror reflector and reflective element to view the reflected rearward image at the mirror reflective element. Optionally, the video display screen may be disposed elsewhere in the vehicle, such as at or in an accessory module or windshield electronics module or overhead console or center stack region of the instrument panel or elsewhere at the instrument panel or other areas of the vehicle, while remaining within the spirit and scope of the present invention. The vision system and display system of the present invention may utilize aspects of the display systems described in U.S. Pat. Nos. 5,786,772; 5,929,786 and/or 6,198,409, which are hereby incorporated herein by reference in their entireties. Optionally, the vision system and display system may utilize aspects of the blind spot detection systems of the types described in U.S. Pat. Nos. 7,720,580; 7,038,577; 6,882, 287; 5,929,786 and/or 5,786,772, and/or U.S. patent application Ser. No. 11/239,980, filed Sep. 30, 2005, now U.S. Pat. No. 7,881,496, which are all hereby incorporated herein by reference in their entireties.

Figure 20:
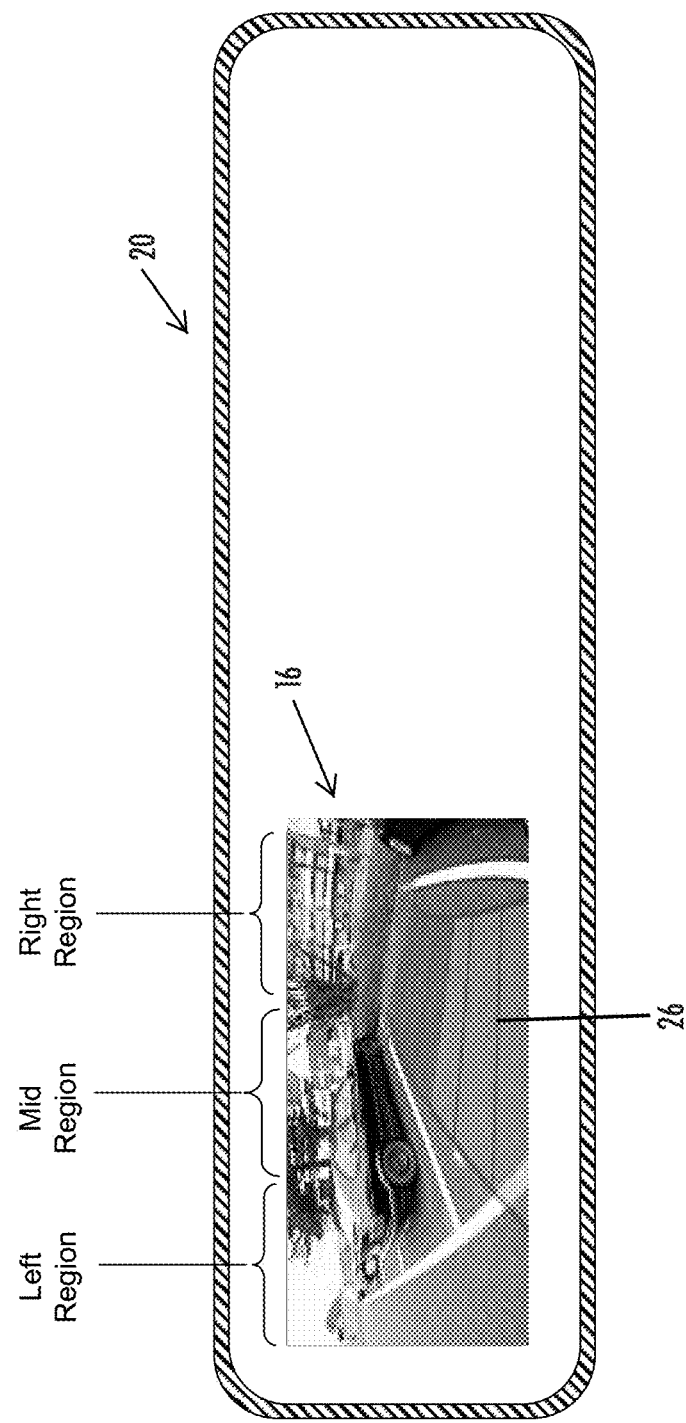
FIG. 20 is a plan view of the mirror and display of FIG. 16, showing the rearward captured image and showing a graphic overlay to assist the driver during a reversing maneuver of the equipped vehicle.
Figure 22:
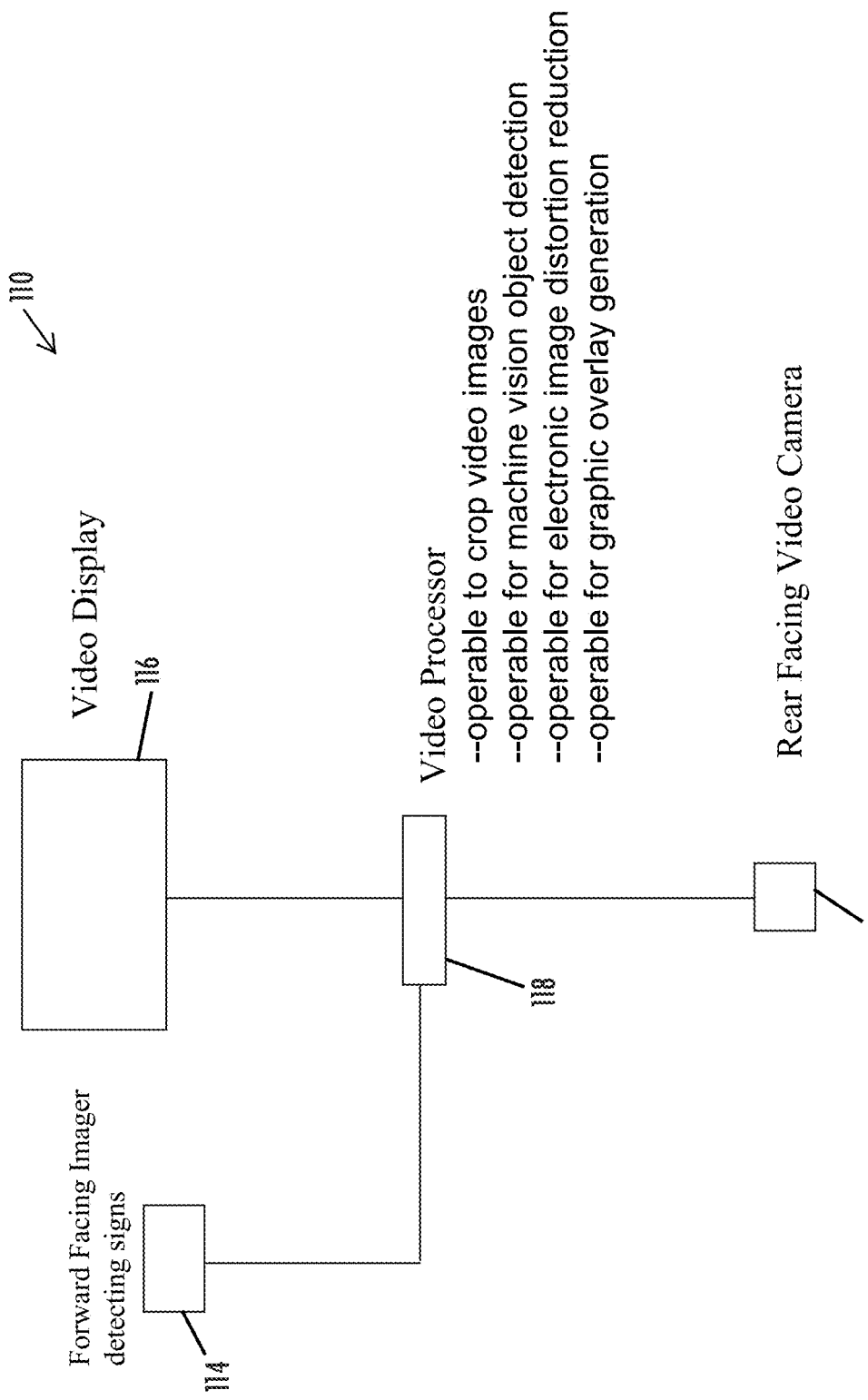
FIG. 22 is a block diagram of the components of another rear vision and display system in accordance with the present invention.

In the illustrated embodiment, and as shown in FIG. 1, the rearward facing camera 12 has a wide angle rearward field of view 22 that encompasses about 185 degrees (fields of view larger and smaller than this and that encompass the side lane regions may be contemplated while remaining within the spirit and scope of the present invention). Thus, during a reversing maneuver, the rearward facing camera 12 and video processor 18 and video display screen 16 can operate to display entire images (or substantially entire images) captured by the rearward facing camera (such as, for example, images encompassed by the about 185 degree field of view of the camera in FIG. 1), in order to provide video images to the driver of the vehicle of a wide area or region or blind zone immediately rearward of the vehicle to assist the driver of the vehicle in making the reversing maneuver (such as shown in FIG. 20 and discussed below). The rearward facing camera and/or video processor and/or video display screen and/or backup assist system may utilize aspects of the systems described in U.S. Pat. Nos. 5,550,677; 5,760,962; 5,670,935; 6,201,642; 6,396,397; 6,498,620; 6,717,610; 6,757,109; 7,005,974 and/or 7,265,656, which are hereby incorporated herein by reference in their entireties.

Typically, such a rearward facing camera for a rear vision system or backup assist system is activated responsive to the driver of the equipped vehicle shifting the gear actuator into a reverse gear position, whereby video images captured by the camera are displayed at the video display screen. When the reversing maneuver is completed, such as when the driver of the vehicle finally shifts the gear actuator out of the reverse gear position (and into either a park or neutral position or a forward gear position), display of the images captured by the camera ceases and the camera is often deactivated.

The present invention utilizes the rearward facing camera during such reversing events or reversing maneuvers and also utilizes the rearward facing camera during non-reversing events or maneuvers (such as when the vehicle is being driven in a forward direction along a road), so as to provide rearward and/or sideward images to the driver of the vehicle when the driver is driving the equipped vehicle in a forward direction of travel. Thus, the rearward facing camera and/or the video display screen may remain activated or energized during forward travel maneuvers of the vehicle and/or may be episodically activated during forward travel maneuvers (such as in response to the driver of the vehicle actuating a turn signal indicator or such as in response to a detection (such as via the likes of machine vision or via radar or ultrasonic or time of flight infrared sensing) of another vehicle at or in or approaching a side blind spot of the equipped vehicle).

During such forward travel driving situations, the rearward facing camera may turn on/off or remain activated and, when activated, may capture images at the rear or rearward of the vehicle and the video processor or control or video decoder and video display screen of the vision system may operate to display a selected or appropriate portion or portions of the captured video images at the video display screen to display the side lane blind spot area to the driver of the equipped vehicle or to alert the driver of the presence of a detected vehicle at or near or approaching the side lane blind spot area of the equipped vehicle. For example, the video display screen 16 of vision system 10 may display a portion (FIGS. 6 and 11A-B) of the images captured by the rearward facing camera 12 and may display a selected or appropriate portion of the captured images relevant to a particular driving condition in a manner that is cognitively readily recognizable to, and usable by, the driver of the equipped vehicle. For example, and as shown in FIG. 6, the video display screen 16 may have at least two (or more) separately addressable or operable zones or regions, such as a left zone or region 16a and a right zone or region 16b, for separately displaying respective portions of the video images captured by the rear camera 12. The cropped or partial or side lane-viewing field of view at the selected side lane is selected (such as appropriate for the particular vehicle equipped with the system) so as to principally display what is being imaged in the respective side lane adjacent the road lane being traveled by the equipped vehicle. For example, the side lane viewing restricted field of display may have a field of view rearward of greater than about 10 degrees and less than about 75 degrees or thereabouts.

The rear camera video image data thus is fed to the video processor, and the video processor may determine (such as via machine vision processing of captured image data) an approach of another vehicle close to the rear/side blind spot of the side mirror of the equipped vehicle, whereby the system automatically turns on or displays video of the "cropped" blind spot viewing field of view (the portion of the captured rearward image that encompasses the rearward and sideward region adjacent to and rearward of the equipped vehicle). Such video processing and/or cropping may be achieved via any suitable video processing means, and may include, for example, a Techwell decoder available from Techwell Inc. of San Jose, CA, or an EYEQ™ image processor from MobilEye of Jerusalem, Israel (for example, such as the EYEQ2™ video image processor), such as at or in the video mirror assembly or the like. Optionally, the video processor and/or associated image processor may be disposed at or in the interior mirror assembly or elsewhere at the vehicle and/or may be disposed at the rear-mounted camera device and/or may be part of incorporated at or in the camera or the like, while remaining within the spirit and scope of the present invention.

For example, and with reference to FIGS. 2-5 and 11A, if the driver of the equipped vehicle actuates a left turn signal or if another vehicle 24 is detected (such as via any suitable detection means, such as image processing of the images captured by the rearward facing camera 12 or via a radar sensing device or system or via a lane departure warning system of the vehicle or a blind spot detection system of the vehicle or the like) rearward of the equipped vehicle 14 and at or approaching a blind spot area at the rear and left side of equipped vehicle, the video display screen 16 may display a left side region 22a of the field of view 22 encompassed by the rearward facing camera 12. In the illustrated embodiment of FIG. 11A, the video display may utilize a left portion 16a of the video display screen 16 (such as a left half or left zone or region or such as a left third (or any other fraction) of the screen) for displaying the real time video images of the left side region 22a captured by the rear camera (as captured at a left portion of the field of view of the video camera that encompasses a left side lane adjacent to the equipped vehicle) or for displaying iconistic representations of a detected approaching and overtaking vehicle at the left side lane adjacent to the equipped vehicle (with the displayed images being viewable through the transflective mirror reflector and the mirror reflective element). Optionally, the video display may also display in the left zone 16a an iconistic display or representation 21a of the left side of the equipped or subject vehicle and optionally may display an iconistic display 23 of a vehicle at or near or approaching the equipped vehicle (also viewable through the transflective mirror reflector and mirror reflective element), so as to enhance the driver's cognitive understanding of the partial video display at the video display screen. Optionally, the display system may, when displaying video images at the left display zone 16a, utilize a right zone or region or portion 16b (and/or a middle portion or zone or region) of the video display screen 16 for displaying an iconistic display or representation of the left side of the equipped or subject vehicle and/or an iconistic display of a vehicle at or near or approaching the equipped vehicle (viewable through the transflective mirror reflector and mirror reflective element), so as to enhance the driver's cognitive understanding of the partial video display at the video display screen. As shown in FIGS. 2-5, the displayed blind spot region may display the other vehicle 24 approaching the left side blind spot region (FIG. 2), entering the left side blind spot region (FIG. 3), where the front side portion of the vehicle may be displayed, overtaking and passing the left side blind spot region (FIG. 4), where the rear side portion of the vehicle may be displayed, passing or exiting the left side blind spot region (FIG. 5), where only a small rear portion of the vehicle may be displayed but the vehicle at that time would be viewable in the peripheral vision of the driver of the equipped vehicle 14 at the left side of the vehicle.

Figure 4:
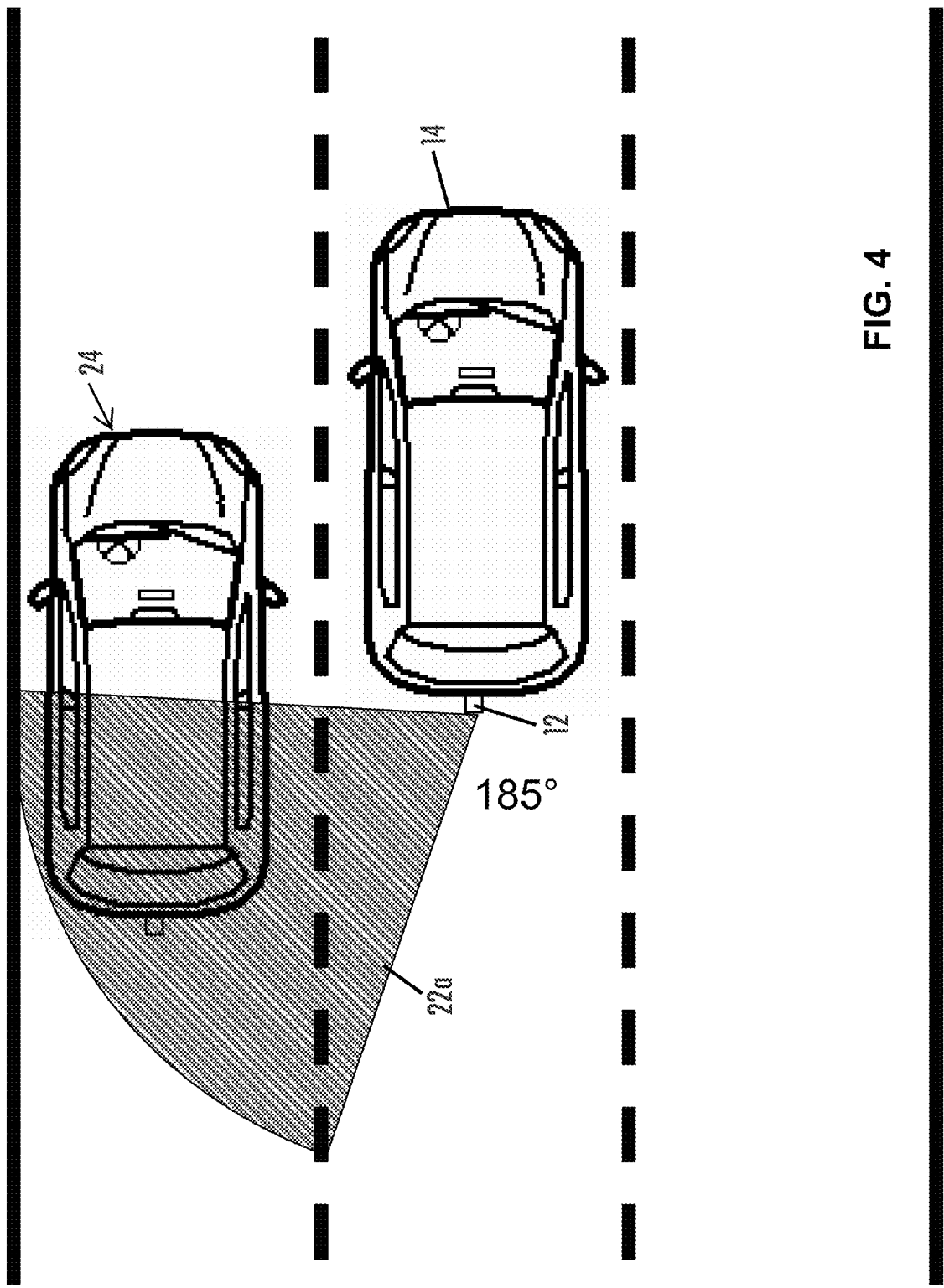
Figure 5:
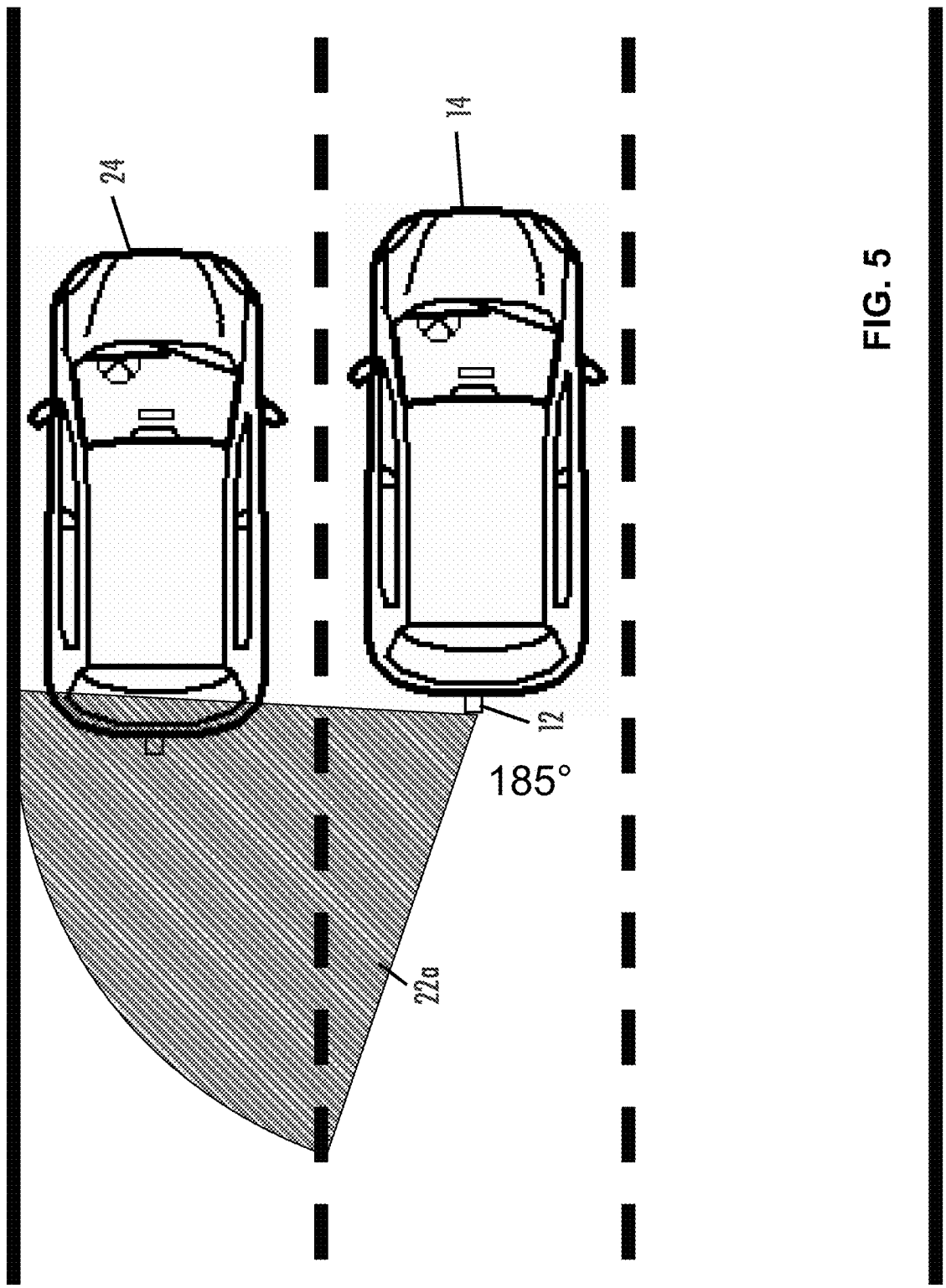

As shown in FIGS. 4 and 5, the bulk or portion of the other vehicle 24 may still be in the side blind spot area of the equipped vehicle 14, while only a small rear portion of the vehicle 24 is being imaged. Such a small portion may not be readily viewable or discernible to the driver of the equipped vehicle when the system displays the small portion at the partial display area of the video display screen. Thus, it is envisioned that, if the system detects and images the other vehicle approaching and passing the equipped vehicle, the system may optionally reconstruct the detected vehicle for displaying at the video display screen. For example, the video processor or control may reconstruct or graphically generate or represent the non-imaged portion of the other vehicle in video display to supplement or add to the small rearward portion that is being imaged. For example, when the rear end of the other vehicle is imaged and the other vehicle is partially in the side lane blind spot of the equipped vehicle, the system can, rather than losing the full displayed image of the other vehicle as it progresses beyond the field of view of the rearward facing camera, continue to show or represent the whole vehicle (or substantial portion thereof) even though the other vehicle has physically left or partially left the field of view of the rearward facing camera. The system thus may provide a graphic overlay and/or computer generated images to represent the forward portion or non-imaged portion of the other vehicle and may display them at the video display screen (so as to be viewable through the transflective mirror reflector and mirror reflective element) to enhance the driver's cognitive awareness of the other vehicle and to enhance the driver's situational awareness as to the location of the other vehicle relative to the side lane blind spot of the equipped vehicle.

Because the overtaking and/or passing vehicle is imaged as it approaches the equipped vehicle from the rear, the system may be operable to reconstruct or generate a graphic representation of that particular vehicle or vehicle type to graphically or electronically construct an image of the passing vehicle at the video display screen. For example, the video display screen may display the imaged rear portion of the overtaking vehicle, and may display a graphic representation of at least part of the non-imaged portion of the overtaking vehicle to enhance the driver's awareness of the presence and location of the overtaking and passing vehicle relative to the equipped vehicle. The graphic representation may include a graphic representation of a side portion of the equipped vehicle to further enhance the driver's awareness of the location of the overtaking and passing vehicle relative to the equipped vehicle. Thus, the system of the present invention may generate a representation of the non-imaged portion of the detected vehicle to make sure that the driver of the equipped vehicle is aware of the presence of the other vehicle as it is passing the equipped vehicle and is not being fully or substantially imaged by the rearward facing camera but may still be at least partially in the side lane blind spot area of the equipped vehicle.

Similarly, and with reference to FIGS. 7-10 and 11B, the video display screen 16 of vision system 10 may display a right portion (FIG. 11B) of the images captured by the rearward facing camera 12 and may display a selected or appropriate portion of the captured images relevant to a particular driving condition. For example, if the driver of the equipped vehicle actuates a right turn signal or if another vehicle 25 is detected (such as via any suitable detection means, such as image processing of the images captured by the rearward facing camera 12 or via a radar sensing device or system or via a lane departure warning system of the vehicle or a blind spot/side object detection system of the vehicle or the like) rearward of the equipped vehicle 14 and at or approaching a blind spot area at the rear and right side of equipped vehicle, the video display screen 16 may display a right side region 22b of the field of view 22 encompassed by the rearward facing camera 12. In the illustrated embodiment of FIG. 11B, and in a similar manner as described above for a vehicle passing on the left side of the subject or equipped vehicle, the video display screen may, when a vehicle is approaching and overtaking and passing on the right side of the subject or equipped vehicle, utilize the right zone or region or portion 16b of the video display screen 16 (such as a right half or portion or zone or region or such as a right third (or any other fraction) of the display screen) for displaying the real time video images of the right side region 22b (as captured at a right portion of the field of view of the video camera that encompasses a right side lane adjacent to the equipped vehicle) or for displaying iconistic representations of a detected approaching and overtaking vehicle at the right side lane adjacent to the equipped vehicle (with the displayed video images and/or icons being viewable through the transflective mirror reflector and mirror reflective element). Optionally, the video display may display in the right zone 16b an iconistic display or representation 21b of the right side of the equipped or subject vehicle and optionally may display an iconistic display 23 of a vehicle at or near or approaching the equipped vehicle (also viewable through the transflective mirror reflector and mirror reflective element), so as to enhance the driver's cognitive understanding of the partial video display at the video display screen. Optionally, the display system may, when displaying video images at the right display zone 16a, utilize the left zone or region or portion 16a (and/or a middle portion or zone or region) of the video display screen 16 for displaying an iconistic display or representation of the right side of the equipped or subject vehicle and/or an iconistic display of a vehicle at or near or approaching the equipped vehicle (viewable through the transflective mirror reflector and mirror reflective element), so as to enhance the driver's cognitive understanding of the partial video display at the video display screen. As shown in FIGS. 7-10, the displayed blind spot region may display the other vehicle 25 approaching the right side blind spot region (FIG. 7), entering the right side blind spot region (FIG. 8), where the front side portion of the vehicle may be displayed, overtaking and passing the right side blind spot region (FIG. 9), where the rear side portion of the vehicle may be displayed, passing or exiting the right side blind spot region (FIG. 10), where only a small rear portion of the vehicle may be displayed but the vehicle at that time would be viewable in the peripheral vision of the driver of the equipped vehicle 14 at the right side of the vehicle (and the system may be operable to graphically represent the non-imaged portion of the overtaking and passing vehicle to enhance the driver's cognitive awareness of the presence and location of the passing vehicle relative to the equipped vehicle, as discussed above).

Figure 12:
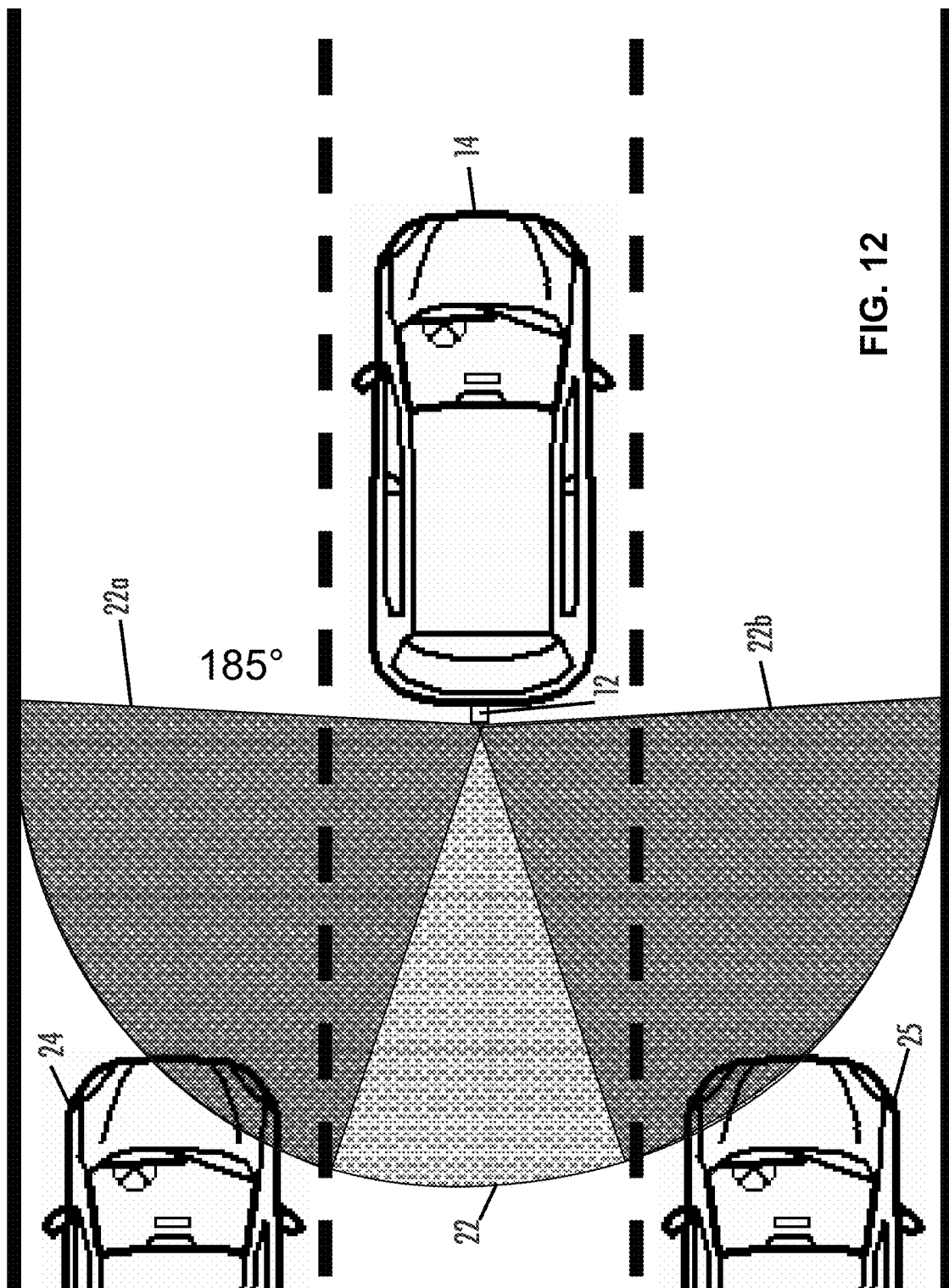
FIG. 12 is a schematic of the equipped vehicle showing the rearward and sideward fields of view of the rearward facing camera as other vehicles approach and pass the equipped vehicle at each side of the equipped vehicle.

Optionally, and with reference to FIG. 12, the system may detect a vehicle 24, 25 at each side of or approaching a side lane blind spot area of the equipped vehicle 14. In such a situation, the system may display captured images of both side regions 22a, 22b at respective sides or portions of the display screen to alert the driver of the presence of vehicles at or approaching both sides of the vehicle. Optionally, the system may overlay the iconistic representation at the respective display portion to enhance the driver's cognitive awareness and understanding of the displayed images.

Figure 13:
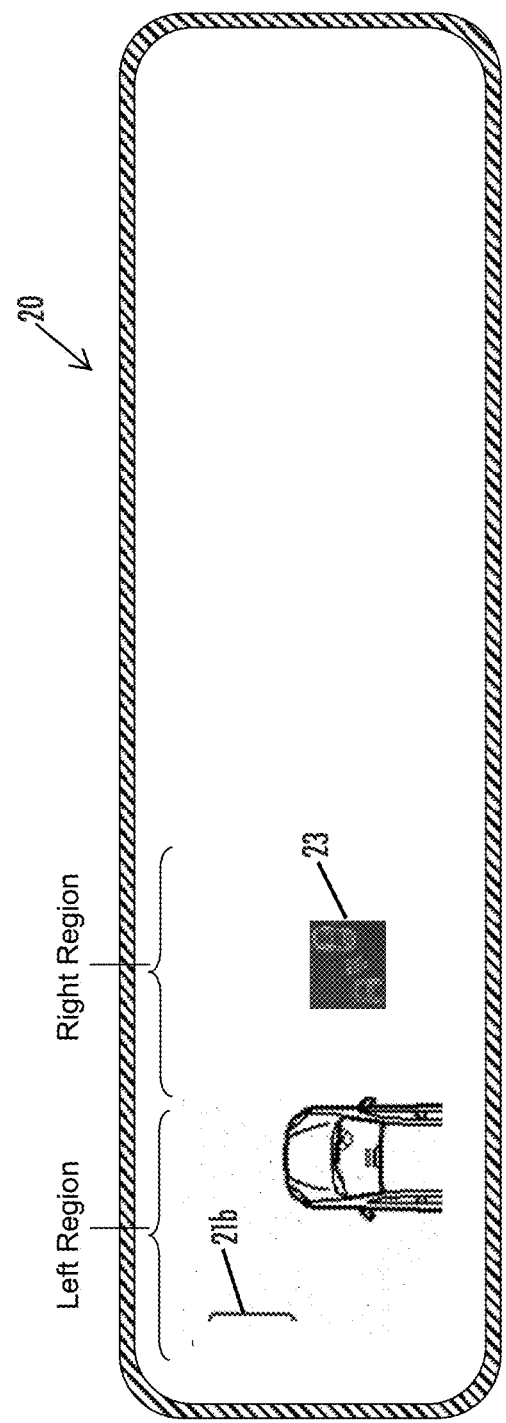
FIG. 13 is a plan view of a display of the equipped vehicle, showing a larger iconistic representation of a vehicle at the rearward left side region and showing a blind spot icon to the right of the iconistic representation.
Figure 14:
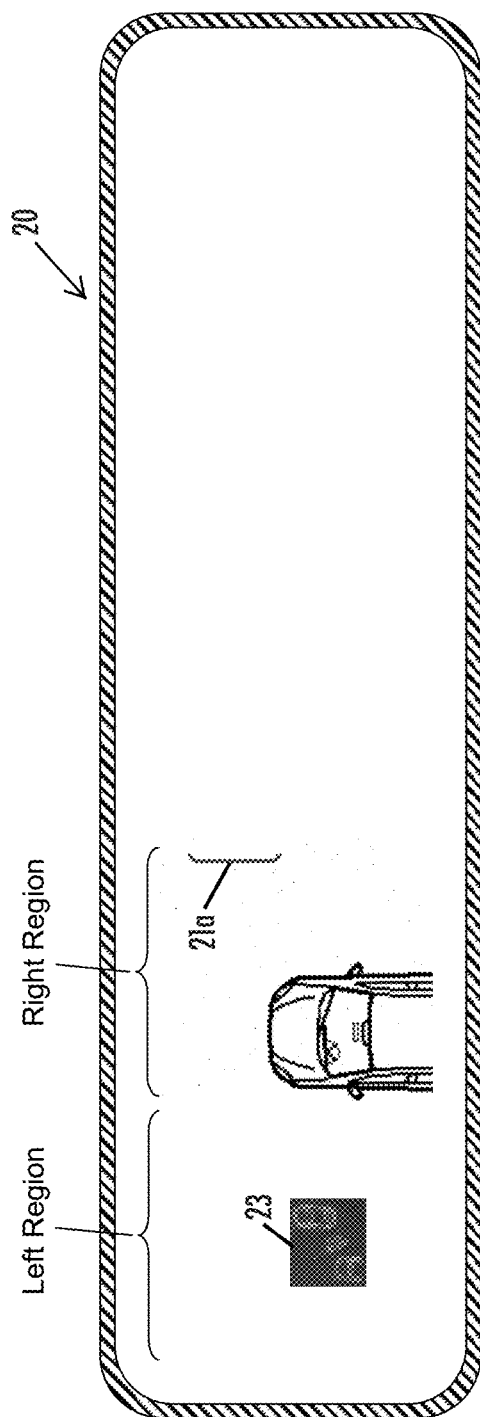
FIG. 14 is a plan view of a display of the equipped vehicle, showing a larger iconistic representation of a vehicle at the rearward right side region and showing a blind spot icon to the left of the iconistic representation.
Figure 15:
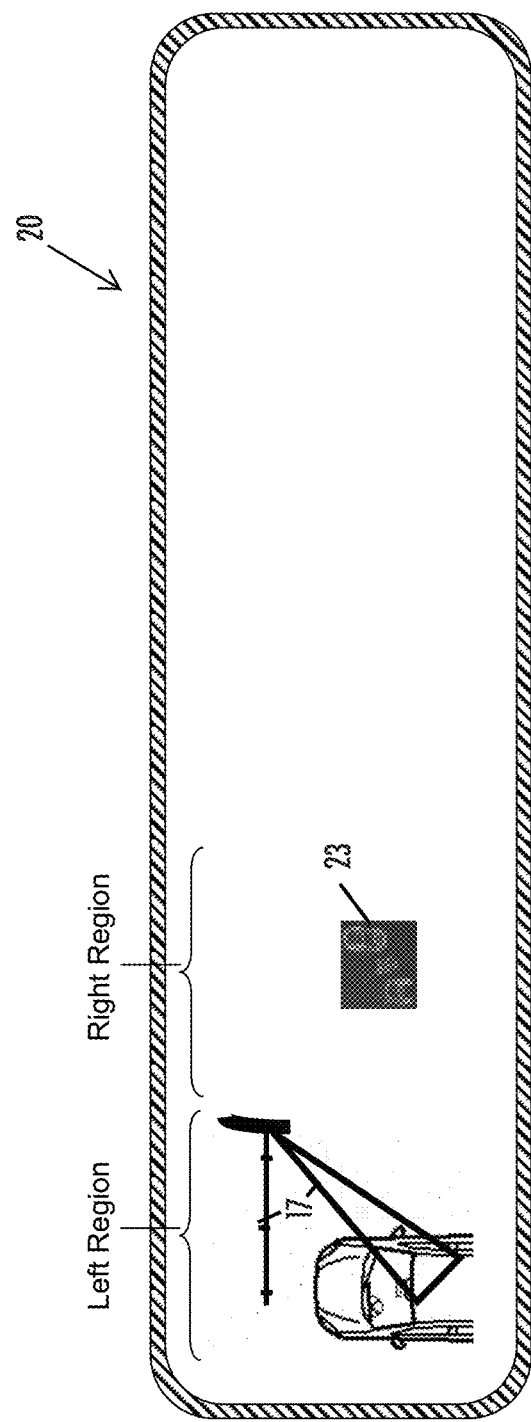
FIG. 15 a plan view of the display of FIG. 6 or 13, showing a graphic overlay at the displayed image to enhance the driver's cognitive awareness of the location of and distance to the other vehicle at the side and rearward of the equipped vehicle.

Optionally, the system may be operable to provide a larger iconistic or cartoon-like representation of the captured images at a portion of the video display (and optionally with the typical blind spot icon at the video display as well), such as by utilizing aspects of the display system described in U.S. Pat. Nos. 7,005,974 and/or 7,265,656, which are hereby incorporated herein by reference in their entireties. For example, and as shown in FIGS. 13 and 14, the video display screen may, instead of displaying video images of the side blind spot area (as captured by the rearward facing camera), display an iconistic or cartoon-like or graphic representation of a vehicle detected at or in or approaching the side blind spot area (responsive to detection of an approaching and overtaking vehicle). Optionally, the video display screen may also display an iconistic representation of the side portion 21a, 21b of the vehicle at which the approaching and overtaking vehicle is detected, and/or the video display screen may display the typical iconistic blind spot detection representation 23 at or near or adjacent to the cartoon-like representation, such as in a similar manner as discussed above (and viewable through the transflective mirror reflector and mirror reflective element). Optionally, the video display screen may display the video images and a cartoon-like iconistic rendering of the displayed video images of the side-approaching and overtaking vehicle, which thus may provide machine vision combined with real time or human vision. Optionally, and as shown in FIG. 15, the system may provide graphic overlays 17 at the video image display or cartoon-like display to enhance the driver's cognitive awareness and understanding of the displayed images, and optionally to provide distance markers to enhance the driver's understanding of the location of the detected and/or displayed vehicle relative to the equipped vehicle (with the graphic overlays also being viewable through the transflective mirror reflector and mirror reflective element). The graphic overlay thus may allow distance/perspective gauging by the driver of the equipped vehicle relative to the side blind spot area at the side of the equipped vehicle, and can be used to give a sense of distance or perception depth for the driver to gauge how far away the overtaking or approaching vehicle may be from the equipped vehicle and also where the overtaking or approaching vehicle is relative to a side blind spot of the equipped vehicle.

Figure 16:
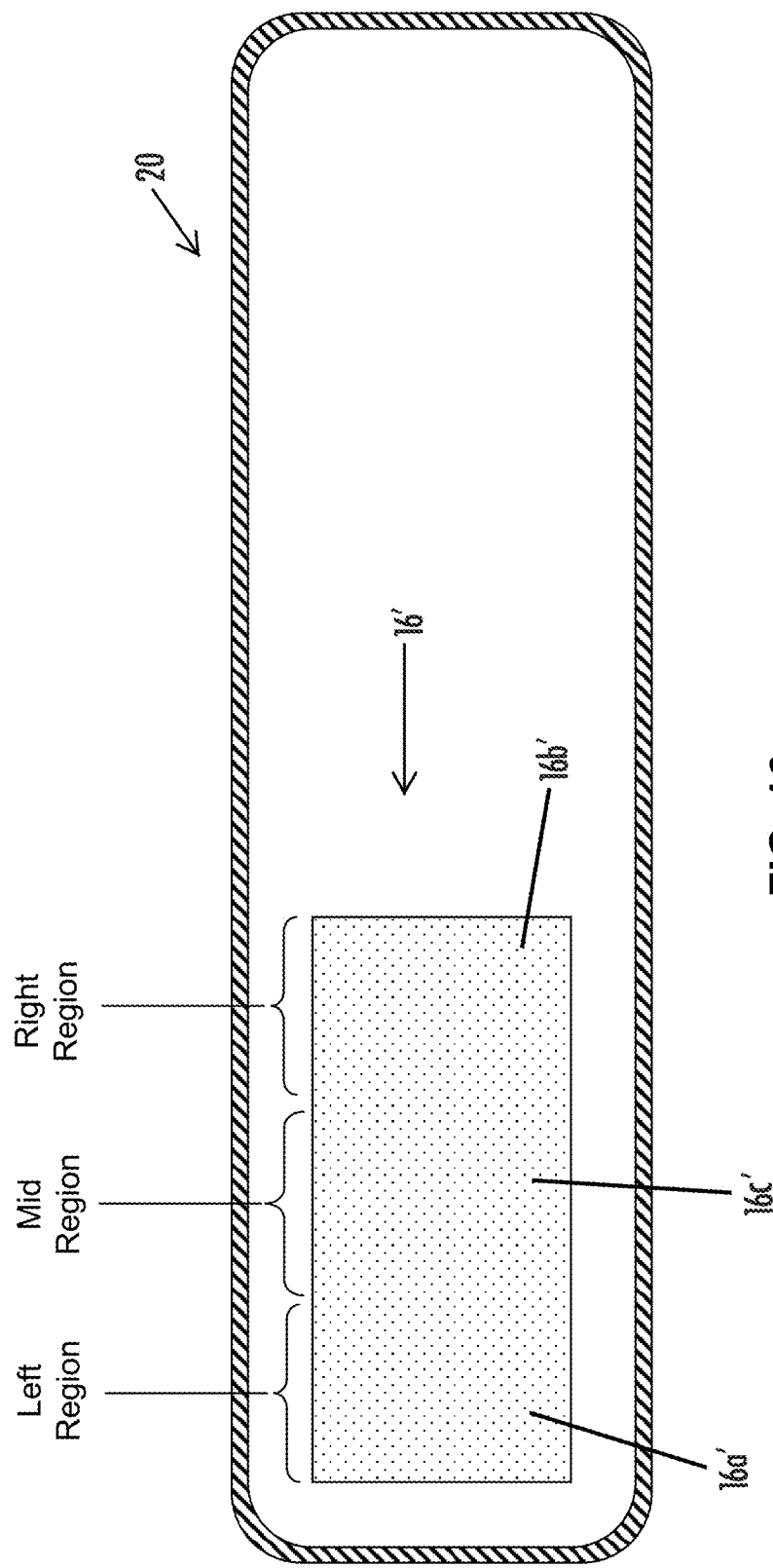
FIG. 16 is a plan view of a mirror assembly incorporating a video display screen having left, middle and right display zones or regions in accordance with the present invention.

Optionally, and with reference to FIG. 16, the video display screen 16' (which may be disposed in an interior rearview mirror assembly 20 and behind the reflective element of the mirror assembly) may comprise a left zone or region 16a' (such as a left third or zone or region for selectively displaying an image captured at the left side and rearward of the vehicle), a right zone or region 16b' (such as a right third or zone or region for selectively displaying an image captured at the right side and rearward of the vehicle), and a center or middle zone or region 16c' (such as a center third or zone or region for selectively displaying an image captured at the center and rearward of the vehicle). Thus, for example, and with reference to FIGS. 17 and 18, when a vehicle is approaching the subject vehicle 14' from the left and rear of the subject vehicle, the approaching vehicle 25' (such as the motorcycle shown in FIG. 17) may be detected and images of the approaching vehicle may be captured at the left region or zone of the rear backup camera 12, and the captured images of the approaching vehicle may be displayed at the left zone or region 16a' of the video display screen 16' (such as shown in FIG. 18). In the illustrated embodiment of FIG. 18, the video display screen 16' utilizes the left portion 16a' of the video display screen 16' for displaying the real time video images of the vehicle at the left side region 22a (as captured by the rear camera in the left portion of the field of view of the rear camera), and may darken or otherwise not utilize the other zones or regions 16b', 16c' of the video display screen 16'. Optionally, and as shown in FIG. 18, the video display screen 16' may utilize the middle zone or region or portion 16c' of the video display screen 16' for displaying an iconistic display or representation 21' of the side of the equipped or subject vehicle and optionally may display an iconistic alert signal or warning sign 23' (while the right zone or region 16b' of the video display screen 16' may be entirely darkened or otherwise non-active or deactivated or the like) so as to enhance the driver's cognitive understanding of the partial video display at the video display screen. Although shown in FIGS. 17 and 18 as displaying video images at the left zone of the display screen to display real time video images of the scene occurring at the left side lane adjacent to the left side of the equipped vehicle, clearly the vision and display system of the present invention functions in a similar manner to display video images at the right zone of the display screen to display real time video images of the scene occurring at the right side lane adjacent to the right side of the equipped vehicle.

As can be seen with reference to FIGS. 19A and 19B, as the approaching vehicle approaches the rear of the equipped vehicle and is not yet in the blind spot or blind zone of the exterior rearview mirror assembly 15 of the vehicle 14, the approaching vehicle may be viewed by the driver at the mirror reflective element of the exterior rearview mirror assembly of the equipped vehicle, such as in a known manner. As the approaching vehicle gets closer to the equipped vehicle, the approaching/passing vehicle may not be viewable by the driver of the equipped vehicle at the exterior rearview mirror assembly, but will be displayed at and viewable at the video display screen at the interior rearview mirror assembly when the approaching vehicle is at the left side region of the field of view of the wide angle rear backup camera of the equipped vehicle.

Optionally, and with reference to FIGS. 21A and 21B, the video display may utilize a portion of the video display (such as the left portion 16a" of video display screen 16") to display video images of the scene occurring at either side region of the vehicle as captured by the rear backup camera (while the other portion 16b" of the video display screen 16" may not display any information or images and thus may not be observable or discernible through the transflective mirror reflector of the mirror reflective element of the mirror assembly 20). In the illustrated embodiment, the display includes an arrow or other indicator to indicate to the driver of the vehicle which side of the vehicle the displayed image is pertaining to. For example, the display may include a leftward directed arrow 21a" (FIG. 21A) to indicate to the driver that the displayed video images are from the left region or portion of the field of view of the rear camera and show the scene that is occurring at the left side lane adjacent to the left side of the vehicle, and may include a rightward directed arrow 21b" (FIG. 21B) to indicate to the driver that the displayed video images are from the right region or portion of the field of view of the rear camera and show the scene that is occurring at the right side lane adjacent to the right side of the vehicle. Such displays and arrows/indicators may be automatically displayed at one or more portions or zones or regions of the video display screen responsive to at least one of (a) actuation of a left or right turn signal indicator of the vehicle, (b) detection of a vehicle in or approaching the left or right side lane adjacent to the equipped vehicle and (c) a lane departure warning system of the vehicle, such as in a similar manner as described above.

The displayed images thus show the right hand side or left hand side of the blind spot area at either side of the vehicle with an arrow at or below the displayed video images indicating which side of the vehicle is being viewed. In the illustrated embodiment, the display is only utilizing half of the video display screen but could utilize the full video display screen (or other portion of the video display screen) as desired. In the illustrated embodiment, the display is only using the left region or zone of the video display screen for selectively showing the left side lane images and the right side lane images (such as by only activating a left bank or array of backlighting LEDs or by darkening pixels on the right and middle regions or zones of the display screen or via any other suitable means for using only a portion or zone of the video display screen while having the other portion be non-viewable or non-discernible through the transflective mirror reflector of the mirror reflective element behind which the display screen is disposed). Optionally, the display could use only the right region or zone to display the video images or could use both or all of the regions or zones of the video display screen to display the video images. Optionally, the screen usage area for displaying the video images may be dynamic, and may be increased as the vehicle approaches or responsive to a detected unsafe lane change condition or the like (and may be optimized for each customer or mirror application). Optionally, the screen area under the image shows an arrow or other indicator as to the side of the vehicle at which the imaged scene is occurring and, optionally, the arrow or indicator may be shown as a flashing arrow or indicator or may be otherwise highlighted as the detected vehicle enters the blind spot. Optionally, the size of the displayed image or indicator and/or intensity of the displayed image or indicator and/or a flashing or flash rate of the displayed image or indicator may be responsive to detection of an unsafe lane change condition or the like, such as responsive to the user actuating a turn signal indicator toward the side of the vehicle at which an approaching/overtaking vehicle is located, in order to warn the driver of an unsafe lane change condition. Other means for indicating the presence and/or location of a detected vehicle at the blind spot area adjacent the equipped vehicle may also or otherwise be implemented while remaining within the spirit and scope of the present invention.

As shown in FIGS. 11A, 11B, 18, 21A and 21B, the portion or zone or region of the video display screen that is operated to display the video images is viewable through the transflective mirror reflector while the portion or portions or zones or regions of the video display 16 that is/are not operated to display video images may be dark or otherwise may not display video information or other information (but optionally may display one or more iconistic representations or the like), whereby the driver viewing the mirror reflective element at the non-video displaying portion of the video display views a reflected rearward image as reflected by the transflective mirror reflector of the mirror reflective element. Thus, the non-displaying zone (or zones) of the video display screen remains covert or non-observable by the driver of the equipped vehicle, whereas the displaying zone (or zones) of the video display is visible as a display on demand video display. During normal driving, the driver readily becomes accustomed to the cognitive association of the left display zone location to the right display zone location and thus readily cognitively associates the appearance of images at the left zone to be associated with an overtaking vehicle in the left side lane and readily cognitively associates the appearance of images at the right zone to be associated with an overtaking vehicle in the right side lane. This cognitive association of a left displaying covert display and an adjacent right displaying covert display (all occurring at the driver side of the mirror assembly) readily assists and assures the driver's cognitive recognition and use of the displayed information. The vision and display system of the present invention thus provides a blind spot side lane display or alert at the interior rearview mirror assembly that does not substantially interfere with the driver's rearward field of view at the mirror reflective element of the interior rearview mirror assembly.

The selection of the particular zone that is used to display the video images at the side lane area of the vehicle during forward travel of the vehicle may depend on the particular application and desired appearance and performance of the display system. For example, the left display region may display the left side lane images while the right display region may display the right side lane images (and both display regions may operate at the same time to display the left and right side lane images responsive to a vehicle being detected in both side lanes adjacent to the equipped vehicle), or the left display region may be used for displaying either of the side lane images so that the displayed images are at the same portion of the mirror reflective element (such as at or near the perimeter side region of the reflective element) for viewing by the driver of the vehicle (and optionally with an iconistic display to indicate which side of the equipped vehicle the displayed image is derived from). Other display configurations or schemes that selectively utilize one or more regions of the display screen based on image data sets that encompass two or more areas or zones exterior and rearward and/or sideward of the vehicle may be utilized while remaining within the spirit and scope of the present invention.

In the illustrated embodiments, the video display screen is disposed in the interior mirror assembly and behind the mirror reflective element and at a left or driver side of the mirror assembly when the mirror assembly is normally mounted in the equipped vehicle. Such a configuration and display location is preferred for vehicles with the driver side at the left side of the vehicle. For vehicles (such as vehicles for driving in Europe) with the driver side at the right hand side of the vehicle, the video display screen may be disposed in the interior mirror assembly and behind the mirror reflective element and at a right or driver side of the mirror assembly when the mirror assembly is normally mounted in such an equipped vehicle, without affecting the scope of the present invention.

Optionally, and preferably, the video display screen comprises a reconfigurable thin film transistor liquid crystal display screen that is backlit by a plurality of white light-emitting light emitting diodes, such as described in U.S. patent application Ser. No. 12/091,525, filed Apr. 25, 2008, now U.S. Pat. No. 7,855,755, which is hereby incorporated herein by reference in its entirety. The reconfigurable video display screen comprises multiple individually addressable pixels, with each pixel operable under electronic control to be light transmitting (i.e., "bright", such that visible light emitted by the rear backlighting is substantially transmitted therethrough) or any given pixel or pixels, under electronic control, can be rendered substantially non-light transmitting (i.e., "dark", such that visible light emitted by the rear backlighting is substantially attenuated or blocked by the dark pixels). The backlighting array of multiple individual white light-emitting light emitting diodes (in conjunction with the likes of diffusers, reflectors, brightness enhancement films and/or the like, such as described in U.S. patent application Ser. No. 12/091,525, filed Apr. 25, 2008, now U.S. Pat. No. 7,855,755, which is hereby incorporated herein by reference in its entirety) generates a generally uniform backlighting intensity of at least about 30,000 candelas/m$^2$, more preferably at least about 60,000 candelas per square meter (cd/m$^2$), and more preferably at least about 90,000 cd/m$^2$. Such uniform and intense backlighting is enabled to pass through individually addressable RGB liquid crystal pixels to be, in turn, incident at the rear substrate of the mirror reflective element involved, so as to, in turn, pass through the transflective mirror reflector of the mirror reflective element and thereafter ultimately pass out of the front surface of the mirror reflective element involved so as to be viewed by the driver of the equipped vehicle when the subject interior video mirror assembly is installed and normally operated in the equipped vehicle.

Preferably, and as discussed below, the video display screen provides a high contrast ratio (preferably greater than about 350:1, more preferably greater than about 650:1 and more preferably greater than about 900:1) so that the darkened or non-video-displaying portion or portions of the video display screen are substantially dark relative to the video displaying portion or portions to enhance viewability of the displaying portions and non-discernibility of the non-video-displaying portions of the video display screen through the transflective mirror reflector of the mirror reflective element when the reflective element and mirror assembly are normally mounted in the vehicle. By having the pixels of a non-displaying portion of the video display screen be non-emitting (i.e., "dark") and when the video display screen is disposed behind a transflective mirror reflector in a video mirror assembly, the driver's use of the mirror reflector for rear vision is maximized. Also, by having the preferred high contrast ratio, light bleed-through is limited or minimized.

Typically, such a backlit video display screen may include an array of light emitting diodes (LEDs), such as white light-emitting LEDs, and such as an array of at least about 15 white light-emitting LEDs, more preferably at least 30 white light-emitting LEDs, and more preferably at least about 45 white light-emitting LEDs or the like, such as by utilizing aspects of the video displays described in such as described in U.S. Pat. Nos. 7,195,381 and/or 7,370,983, and/or U.S. patent application Ser. No. 12/091,525, filed Apr. 25, 2008, now U.S. Pat. No. 7,855,755, which are hereby incorporated herein by reference in their entireties. During a reversing maneuver, the video display screen may be activated and backlit to display images captured by the rear backup camera of the vehicle. When the driver of the vehicle is normally operating the vehicle and driving the vehicle forward along a road, the video display screen may be deactivated, whereby (for applications where the video display screen is disposed in the interior rearview mirror assembly of the vehicle and behind a transflective mirror reflector of the mirror reflective element) the mirror reflective element provides a typical rearward field of view to the driver of the vehicle. With the vision system of the present invention, when the driver actuates a turn signal of the vehicle (such as a left turn signal in anticipation of a lane change to a lane to the left of the vehicle), the whole array of LEDs that backlight the video display screen (at the left, middle and right zones or regions of the display) may be activated or energized or illuminated. As can be seen with reference to FIG. 18, the liquid crystal pixels of the backlit liquid crystal display screen at the middle display zone or region (except where one or more icons or the like may be displayed) or right display zone or region are dark (i.e., non-light transmitting so that light emitted by the backlighting LEDs is substantially attenuated or blocked so as to not pass through or bleed through those particular addressed and "darkened" liquid crystal pixels) or otherwise not activated or operating to display images and/or information, and thus these zones or regions of the video display screen are not viewable through the transflective mirror reflector of the transflective mirror reflective element of the mirror assembly. Thus, when the driver of the equipped vehicle views the mirror and the video display screen, the middle and right zones or regions or areas of the video display area of the mirror are viewed as the normal mirror reflector (so the video display screen is substantially or wholly covert at those regions). In other words, the driver operating the vehicle sees the normal mirror reflector at the middle and right zones, while viewing the displayed images and/or icons and/or the like at the activated and displaying left zone or region of the video display screen (when the left zone or region operates to display such images and/or icons and/or the like, such as responsive to the driver actuating a turn signal or a detection of an object in the adjacent side lane or a lane departure warning system or the like).

Thus, the backlighting LEDs of the liquid crystal video display screen (comprising a plurality of individually addressable or controllable liquid crystal pixels that are viewable when backlit by respective LEDs or banks of LEDs or the like) may be all activated as a single bank or array of LEDs, whereby the pixels of the backlit liquid crystal display screen may be selectively darkened at the zones or regions where the display is not to be viewable by the driver of the vehicle, such that the driver of the vehicle only views captured images at the zone or portion that is to be viewed (such as the left zone or region in FIG. 18) while the other zones or regions of the video display screen are not viewable by the driver of the vehicle through the mirror reflector of the mirror reflective element and those areas of the mirror assembly are thus viewed as a typical mirror reflective element. Optionally, the video display screen may have the backlighting LEDs arranged or configured in separate banks of LEDs (such as a left bank or array of LEDs, a center bank or array of LEDs and a right bank or array of LEDs or the like), whereby the individual or separate banks or arrays of LEDs may be selectively individually activated to backlight a respective zone or region of the liquid crystal display screen. In applications where a separate bank or array of LEDs is used for each display zone or region, it is envisioned that an iconistic representation of the vehicle or an alert signal or warning sign may be displayed at the activated zone (such as at the left display zone in FIG. 18 instead of the middle display zone) so that the array of LEDs at the middle display zone and the array of LEDs at the right display zone may remain deactivated or de-energized or otherwise non-operating during the display process. Optionally, the backlighting LEDs and/or the liquid crystal pixels of the backlit display may be individually addressable or energizable to activate/backlight/display the appropriate zones or regions of the display while not activating or displaying the other zones or regions.

The video display screen device or module may comprise any suitable type of video screen and is operable to display images in response to an input or signal from a control or imaging system. For example, the video display screen may comprise a multi-pixel liquid crystal module (LCM) or liquid crystal video display (LCD), preferably a thin film transistor (TFT) multi-pixel liquid crystal video display (such as discussed below), or the video screen may comprise a multi-pixel organic electroluminescent video display or a multi-pixel light emitting diode (LED) video display, such as an organic light emitting diode (OLED) or inorganic light emitting video diode display or the like, or an electroluminescent (EL) video display or the like.

Video display screens used in interior video mirror assemblies typically have a display area typically greater than about 20 $cm^2$, and more preferably greater than about 30 $cm^2$, but typically are less than about 70 $cm^2$ or thereabouts. The video display screen, preferable and usable in a video mirror application, preferably provides a display screen or area that is greater than at least 2.4 inches diagonal, and more preferably greater that at least about 3.3 inches diagonal and more preferably greater than at least about 3.5 inches diagonal and less than or equal to about 4.7 inches diagonal. The video display screen may include QVA size (320×240 pixel) output pins or WQVA size (480×234 pixel) output pins, and may provide a resolution of at least about 75,000 pixels, more preferably at least about 85,000 pixels, and more preferably at least about 95,000 pixels or thereabouts (with the pixels comprising individually addressable liquid crystal pixels). The video display screen may provide a display screen or area of any suitable aspect ratio, such as an aspect ratio of about 4:3 or 15:9 or 16:9 or the like, without affecting the scope of the present invention. The industry standard that can be used includes 4:3 screen resolution provided by VGA (640×480), SVGA (800×600), XGA (1024×768) or SXGA (1280×1024), and includes 16:9 screen resolution provided by similar standards or WXGA (1366×768). Preferably, the video display screen is a high resolution video display comprising a high resolution reconfigurable thin film transistor (TFT) multipixel liquid crystal display screen having an addressable pixel density of at least about 2,000 pixels/cm$^2$ of addressable backlit video screen area, more preferably an addressable pixel density of at least about 2,500 pixels/cm$^2$ of addressable backlit video screen area, and more preferably an addressable pixel density of at least about 2,800 pixels/cm$^2$ of addressable backlit video screen area, and more preferably at least about 3,600 pixels/cm$^2$ of addressable backlit video screen area, and more preferably at least about 10,000 pixels/cm$^2$ of addressable backlit video screen area (such as, for example, about 1-4 Megapixels/cm$^2$ or about 20-35 Megapixels/cm$^2$ of addressable backlit video screen area). Preferably, the video display screen provides a contrast ratio preferably of at least about 250:1, more preferably at least about 350:1, more preferably at least about 650:1, and more preferably at least about 900:1 or 1,000:1 or thereabouts. The higher contrast ratio allows for enhanced viewability of the displayed cropped images while providing sufficient darkness at the non-video-displaying portion of the display screen so that the non-video-displaying portion of the screen is not readily viewable or discernible through the transflective mirror reflector to a person viewing the mirror reflective element when the mirror assembly is normally mounted in a vehicle and so that driver rear vision using the mirror reflector is enhanced or maximized.

Although the display screen may provide a large display area (such as a display area having a 3.3 inch or 3.5 inch diagonal dimension or thereabouts) in the likes of an about 16:9 aspect ratio), typically it is desired to restrict the size of the real-time video display during forward driving so as to not utilize the entire available display area (which may reduce the reflective area of the mirror reflective element when the display is activated to display video images). Thus, the video display screen may utilize only a portion (such as a left portion or a right portion) of the video display screen for displaying the video images in particular, and also any associated iconistic or computer-generated images. Typically, when the video display screen is activated, its backlighting (such as an array of LEDs or the like such as described in U.S. Pat. Nos. 7,195,381 and/or 7,370,983, and/or U.S. patent application Ser. No. 12/091,525, filed Apr. 25, 2008, now U.S. Pat. No. 7,855,755, which are hereby incorporated herein by reference in their entireties) is activated. Thus, the video processor may darken (i.e., render black or non-light emitting or substantially non-light emitting) the non-video-displaying portion by making dark or black the LCD pixels that are not displaying video images. Thus, a higher contrast ratio is desired to enhance the viewability of the displaying portion of the video display screen and to enhance the non-discernibility of the non-video displaying portion of the video display screen by a driver viewing the reflective element when the mirror assembly is normally mounted in a vehicle.

In a preferred embodiment, and such as for use in an interior rearview video mirror assembly (such as a video mirror utilizing aspects of the systems described in U.S. Pat. Nos. 6,690,268; 6,902,284; 7,184,190; 7,195,381; 7,255,451; 7,274,501; 7,338,177; 7,370,983; 7,490,007 and/or 7,540,620, and/or U.S. patent application Ser. No. 10/538,724, filed Jun. 13, 2005, which published on Mar. 9, 2006 as U.S. Patent Publication No. US 2006/0050018; Ser. No. 11/226,628, filed Sep. 14, 2005, which published on Mar. 23, 2006 as U.S. Patent Publication No. US 2006/0061008; Ser. No. 12/091,525, filed Apr. 25, 2008, now U.S. Pat. No. 7,855,755; Ser. No. 12/578,732, filed Oct. 14, 2009, now U.S. Pat. No. 9,487,144; Ser. No. 09/585,379, filed Jun. 1, 2000, abandoned, and/or Ser. No. 10/207,291, filed Jul. 29, 2002 and published Jan. 9, 2003 as U.S. Publication No. US-2003-0007261, and/or PCT Application No. PCT/US2010/25545, filed Feb. 26, 2010, which published on Sep. 2, 2010 as International Publication No. WO 2010/099416, which are all hereby incorporated herein by reference in their entireties), the video display screen may provide a resolution of about 480×RGB×272 dots, with a striped pixel arrangement. The active area of the display screen may be about 77.76 mm (W)×43.52 mm (H), with a pixel pitch of about 0.162 (W)×0.16 (H). The active area diagonal dimension may be about 3.51 inches or thereabouts, with a viewing direction at 12 o'clock. The interface to the video display screen may comprise a 24 bit parallel interface, and the video display screen may provide a 16.7 million color resolution. The display may comprise a thin film transistor (TFT) liquid crystal display (LCD), which is a normally white, transmissive type of display. The display screen may have a minimum of at least about 45 degrees viewing angle in all directions, more preferably at least about 50 degrees viewing angle in all directions, and more preferably at least about 55 degrees viewing angle in all directions, and preferably has a contrast ratio of at least about 1,000:1. The video display screen, when operated to display video images, preferably may have an intensity as viewed through the transflective mirror reflector (preferably a third surface transflective mirror reflector comprising at least one metallic transflective thin film such as described in U.S. Pat. Nos. 7,274,501; 7,255,451; 7,195,381; 7,184,190; 5,668,663; 5,724,187 and/or 6,690,268, which are all hereby incorporated herein by reference in their entireties) of the video mirror of at least about 1,500 candelas per square meter (cd/m$^2$) nominal. Optionally, the video display screen and mirror assembly may utilize aspects of the display systems described in U.S. provisional application Ser. No. 61/332,375, filed May 7, 2010, which is hereby incorporated herein by reference in its entirety.

Optionally, and desirably, when the video display is part of a video mirror assembly, a contrast ratio (such as measured in accordance with ANSI IT7.215-1992: Data Projection Equipment and Large Screen Data Displays—Test Methods and Performance Characteristics available from the American National Standards Association of Washington DC, USA, which is hereby incorporated herein by reference in its entirety) of at least about 500:1 is preferred, at least about 750:1 more preferred and at least about 1,250:1 most preferred. Dynamic contrast control (such as known in the display art and such as is disclosed by H. Chen et al. in "Locally pixel-compensated backlight dimming on LED-backlit LCD TV", JSID 15/12 (2007), pp. 981-988, which is hereby incorporated herein by reference in its entirety) may be used in displays and/or systems in accordance with the present invention. For example, contrast within the individual video image frames (or sequence of video frames) being displayed (simultaneous contrast) can be increased when the video screen backlighting is locally dimmed (such as by locally and selectively dimming backlighting provided by individual banks of backlighting light emitting diodes (LEDs) or local grouping of backlighting LEDs).

Thus, the system of the present invention utilizes the video display screen for both video display and for iconistic display and does so in a cognitively recognizable manner, such that the driver can readily associate the appearance of the icon on the right (or left) hand side or portion of the screen and the video display on the left (or right) hand side or portion of the video screen with a display of the left (or right) side rearward region captured by the rearward facing camera. Optionally, the iconistic display may be displayed over or at the video images displayed at the display screen (for example, the left side portion of the video display screen may include the video images and may have the iconistic display while the right side portion of the video display screen may not include any display information or the video display screen may display the left side region video images over substantially the entire display region of the display screen and may include the iconistic display at a portion thereof, such as at an upper right portion of the video display screen or the like for displayed images of the left side rearward area of the captured images).

Thus, the display system of the present invention utilizes a rearward facing camera of a backup assist system to display rearward video images of the blind zone area immediately rearward and to the sides of the vehicle during reversing maneuvers and to also display a sideward and rearward region of the captured images during forward driving situations. The sideward and rearward region that is displayed displays the area to the rear and side of the equipped region to the driver so that the driver can see if there is another vehicle approaching and/or overtaking the equipped vehicle in that side lane, and such display may be provided upon detection of an approaching or overtaking vehicle and/or upon actuation of a turn signal indicator by the driver of the equipped vehicle.

The system of the present invention thus provides a dual purpose reverse aid/blind spot detection camera mounted at or near a rear portion of the vehicle (such as at or near a rear bumper or license plate holder or rear stop light or center high mounted stop lamp or the like of the equipped vehicle, and such as utilizing aspects of the vision systems described in U.S. patent application Ser. No. 11/672,070, filed Feb. 7, 2007, now U.S. Pat. No. 8,698,894, which is hereby incorporated herein by reference in its entirety). Thus, in accordance with the present invention, the likes of a reverse camera display at a mirror that is present in the vehicle principally to display to the driver of the vehicle what is rearward of the vehicle when that driver is backing up, has extended utility so as to provide to that driver an awareness and/or alert of rearward approaching traffic so that the driver of the equipped vehicle can more safely execute lane change maneuvers when traveling in a forward direction. In accordance with the present invention, the very same rear backup video camera and video display already present in the vehicle delivers this added utility, and the side lane information is, preferably, provided to the driver via a combination of real time video images and computer generated overlays and/or icons and/or animation all displaying on the same video display that is part of the rear camera reverse aid system.

Thus, the present invention provides a dual function for a reverse aid backup camera system. The images captured by the rearward facing reverse aid camera may be displayed on the video display screen (such as at or in the rearview mirror of the vehicle or such as at or in an accessory module or windshield electronics module or center stack or overhead console or instrument panel or other areas of the vehicle). The backup blind zone implementation provides effective information display by utilizing a wide angle rearward facing camera, such as a camera having about a 185 degree or greater field of view or thereabouts. The side lane blind spot monitoring feature may be activated responsive to the driver of the vehicle actuating the right or left turn indicator or responsive to machine vision detection of a vehicle at or in or approaching a blind spot area at one or both sides of the equipped vehicle. Thus, the present invention provides a video image of the side lane blind spot area of the equipped vehicle to the driver before the driver turns or changes lanes.

Optionally, the video processor can superimpose a graphic overlay depicting actuation of the turn signals as part of the side lane blind spot monitoring feature to remind the driver that the turn signals have been actuated.

For example, when the driver activates either the right or left turn signal or indicator, the reverse aid camera may be activated and the video display screen may display images of the side lane blind spot area of the vehicle utilizing the reverse aid camera. The system may process the captured images and crop the images or display a portion of the images. For example, the system may display a left or right sideward portion depending on which direction the driver is attempting to turn or change lanes. The video screen may utilize only that side of the screen for displaying the video images, and the unused portion or portions of the video display screen (that does not display video images) may optionally show an icon or other information, such as, for example, a traditional icon that represents or indicates that a vehicle is present in the blind spot area at that side of the vehicle. Such "smart cropping" can be implemented to utilize different percentages of the video display area dependent on the customer or type of vehicle or the like. Optionally, the rearward facing camera may have a zoom capability that can be used with the blind spot feature (or the video processing may process the captured image data to enlarge the displayed images) in order to enlarge the blind spot area that is displayed on either a portion of the video display screen or across the entire video display screen. Alternatively, or additionally, electronic zooming can be provided via the video processor via algorithmic manipulation of the video images fed thereto from the rear video camera, and in addition, the multi-function video processor may be operable to electronically reduce image distortion via algorithmic means so as to reduce or eliminate any "fish-eye" distortion in the image being displayed.

The vision and display system thus comprises a single camera and a single display screen, while providing a dual function of a backup assist system and a blind spot detection system/lane change assist system. Although described as a single camera, clearly the camera or imaging sensor of the system of the present invention may involve more than one imager or imaging device that are grouped locally in a common imaging package, while remaining within the spirit and scope of the present invention. Optionally, for example, the rear camera may encompass a monocular vision camera or a stereo vision camera. While the camera may typically comprise a monocular camera with one imaging chip and associated lenses or lens optics, it is envisioned that the imager may comprise multiple sensing devices or arrays and associated lenses or lens optics that may be packaged together as an imaging unit or module, while remaining within the spirit and scope of the present invention.

Accordingly, in a preferred embodiment of the present invention, a reverse backup camera is provided at the rear of the vehicle (such as at a rear license plate or the like of the vehicle) and the video images captured by the rearward facing reverse backup camera are fed (such as via a twisted wire pair or wireless communication or vehicle network or bus) to an interior video mirror assembly (with the captured images or image data typically received at the video mirror assembly as a standard protocol video signal such as an NTSC signal or the like). The interior video mirror assembly comprises both the video display screen and the video processor and, preferably, the video processor comprises object detection machine vision image processing. In this manner, a combined rear backup aid/side blind spot monitoring system may be provided for a vehicle utilizing the same or common rear backup camera and interior video mirror combination already present on the vehicle for the camera-based rear backup system alone.

Typically, a forward driving event is distinct and different from a reverse driving event and is distinguished by the vehicle electronics from reversing, and thus the side viewing functionality of the present invention may be disabled during reversing maneuvers. However, during a reversing maneuver, the entire field of view (such as the rearward field of view 22 shown in FIG. 1) is displayable to the driver, and/or parts thereof are selectively displayable to the driver, in response to, for example, object detection by an image processor, an ultrasonic sensor, a time of flight infrared detector or the like. For example, and with reference to FIG. 20, the entire (or substantially entire) rearward field of view 22 of the camera 12 may be displayed at the video display screen 16 (using both or all of the display zones or regions of the video display screen) to assist the driver during a reversing maneuver of the equipped vehicle and, optionally, a graphic overlay 26 may be established at the displayed image to further enhance the driver's cognitive recognition and awareness of the displayed image information and to further assist the driver during the reversing maneuver. Optionally, a camera-based cross traffic feature can be provided whereby when a vehicle, vertically parked between adjacent parked vehicles (such as in the likes of a parking lot or the like), commences reversing out of the parking space, the rearward facing camera and video processor function to detect vehicles or objects to the sides of the equipped vehicle and the video display screen may alert the driver as to the presence of a detected sideward vehicle or object, such as by utilizing aspects of the systems described in PCT Application No. PCT/US2010/25545, filed Feb. 26, 2010 and published Sep. 2, 2010 as International Publication No. WO 2010/099416, which is hereby incorporated herein by reference in its entirety.

Optionally, aspects of the cropping and display of a portion of the captured images may apply during a reversing maneuver in a similar manner as discussed above. For example, during a reversing maneuver, if an object is detected (such as by machine vision processing of the captured images via an image processor such as described in U.S. Pat. Nos. 7,720,580 and/or 7,038,577, and/or U.S. patent application Ser. No. 11/239,980, filed Sep. 30, 2005, now U.S. Pat. No. 7,881,496, which are all hereby incorporated herein by reference in their entireties) at or toward one side of the vehicle, the video display screen may display that portion of the captured rearward image to enhance the driver's cognitive awareness of the presence of the detected object at or near the rear side of the equipped vehicle. Such a display may be provided in conjunction with an icon or the like to assist the driver in recognizing where the displayed object is located relative to the vehicle.

The vision and display system may display the image portions at the display zones or regions via any suitable manner. For example, the captured image data may be processed, such as by machine vision image processing or the like, or the video images may be processed or cropped or the like. Optionally, the image processing and/or cropping may occur in or at a video ECU or a DAS (Driver Assistance System) ECU, such as by utilizing aspects of the systems described in PCT Application No. PCT/US10/038477, filed Jun. 14, 2010 and published Dec. 16, 2010 as International Publication No. WO 2010/144900, and/or PCT Application No. PCT/US2010/025545, filed Feb. 26, 2010 and published Sep. 2, 2010 as International Publication No. WO 2010/099416, which are hereby incorporated herein by reference in their entireties. Such a DAS may be located at a Head Unit (as such are commonly known in the automotive art) of a vehicle, where typically other functions (such as infotainment functions and/or navigation functions and/or the like) are also handled. Optionally, the image/display processing may be handled in or at the rear camera itself, such as via digital signal processing (DSP) techniques or components incorporated in or included in the rear camera package or module itself.

Optionally, the vision and display system may include a forward facing camera or image sensor for detecting road signs ahead of the equipped vehicle, whereby the video display screen may be operable to display images or iconistic representations of detected signs to enhance the driver's cognitive awareness of the presence of such signs to enhance the drivers awareness of the driving situation or road condition or situation that the vehicle is approaching. For example, and with reference to FIGS. 22-25, a vehicular vision system 110 includes a rearward facing camera or imaging sensor 112 with a rearward field of view behind the vehicle, a forward facing camera or imaging sensor 114 with a forward field of view ahead of the vehicle (such as through a windshield of the vehicle and such as through a region of the windshield that is cleaned by a windshield wiper of the vehicle), a video display screen 116 disposed at an interior cabin of the vehicle and viewable by the driver of the vehicle, and a video processor 118 for processing image data captured by the cameras 112 and 114. The video display screen 116 is responsive to the video processor 118 (which may be operable to crop the video images, for machine vision objection detection, for electronic image distortion reduction and/or for graphic overlay generation) and is operable to display video images captured by the rearward facing camera 112 for viewing by the driver of the vehicle when the driver is normally operating the vehicle, such as in a similar manner as described above. The video display screen 116 is responsive to the video processor 118 to also display color images of signs detected ahead of the equipped vehicle as the equipped vehicle is traveling in a forward direction along a road.

For example, the video processor may process image data captured by the forward facing camera 114 and may detect the presence of typical road signs, such as a stop sign, a yield sign and/or the like. The video display screen may display the detected road sign (or an iconistic representation of the detected road sign type or a stored photograph or representation of the detected road sign type or the like) to enhance the driver's cognitive awareness of the presence of the road sign ahead of the equipped vehicle. Preferably, the sign displayed is in the color, shape and form—i.e., national or regional standard form—that the driver is used to seeing on the roads that driver travels on. Optionally, and desirably, the video display screen may display an iconistic representation or stored full-color image of a detected road sign responsive to detection of a road sign. Because many road signs are of uniform or standard design and construction in a given country (for example, all stop signs in the United States are red octagonal signs), the system may have images or iconistic representations the various types of signs stored in memory (such as signs of the types shown in FIG. 23), and the video display screen may display in full-color the image or iconistic representation or stored photograph or rendering of a detected sign type.

For example, if the video processor processes captured image data captured by the forward facing camera and determines that a pre-stop sign warning sign 130a indicating that the vehicle is approaching a stop sign ahead of the equipped vehicle, the video display screen may display an image or iconistic representation of the detected sign (such as shown in FIG. 24) to alert the driver as to the presence of the detected road sign. Likewise, if the video processor processes captured image data captured by the forward facing camera and determines that a stop sign 130b is ahead of the equipped vehicle, the video display screen may display an image or iconistic representation of the detected stop sign (such as shown in FIG. 25) to alert the driver as to the presence of the detected road sign.

Figure 23:
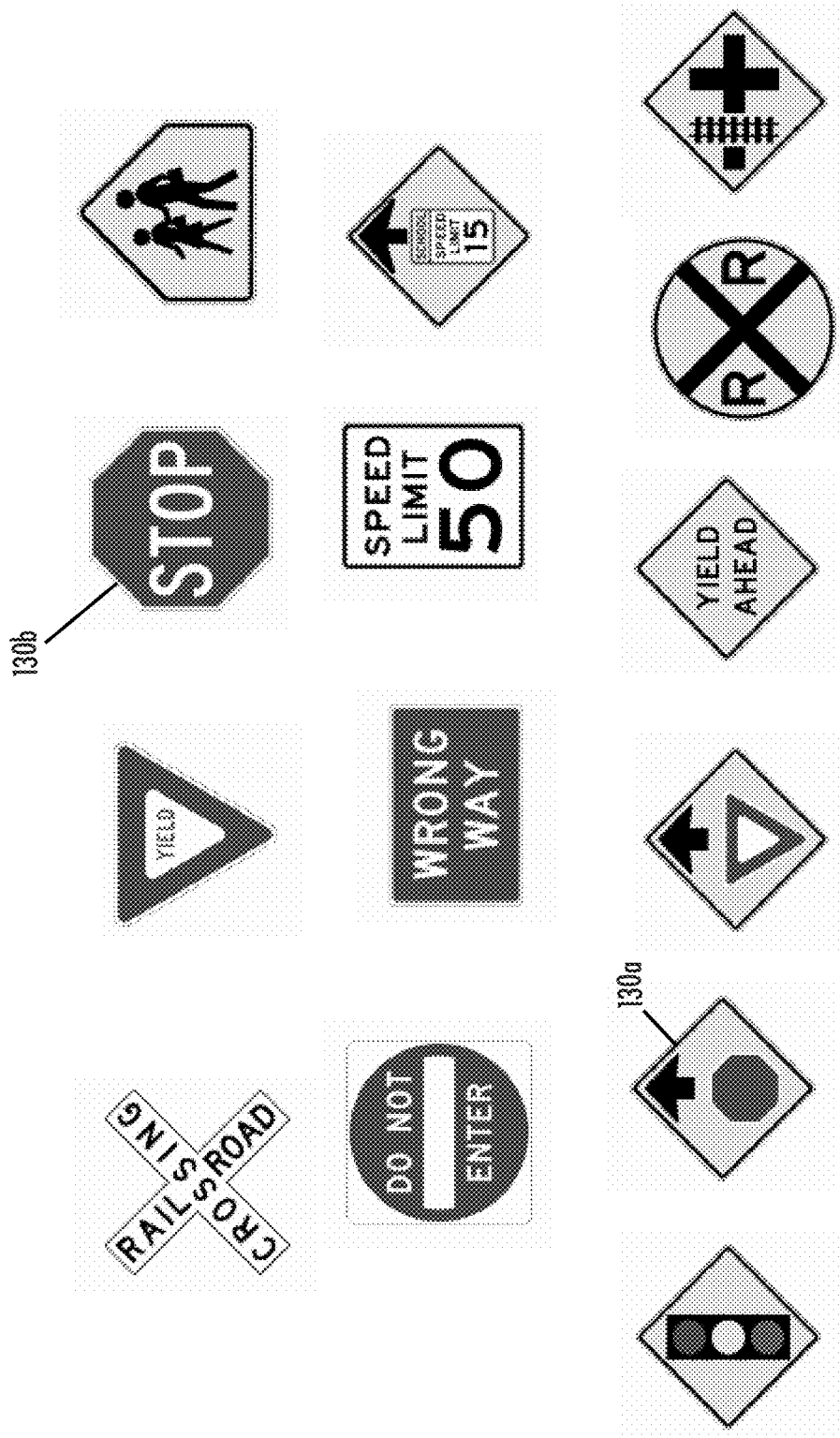
FIG. 23 is a iconistic representation of common road signs for the United States.

As shown in FIGS. 23 and 24, the video display screen may display the image of the detected sign at a relatively small portion or region of the display screen or display area (such as at or near an upper left corner of the video display screen), while the rest of the display screen may remain dark so that the mirror reflective element maintains its reflected rearward field of view to the driver of the vehicle over a substantial portion of the video display screen. Thus, the video display screen may provide an image or iconistic display of a detected sign type for viewing by the driver of the vehicle while the driver is normally operating the vehicle and without substantially affecting the driver's rearward field of view at the interior rearview mirror assembly. The vision and display system thus may process captured image data to detect a sign and to identify or recognize the type of sign (such as by utilizing aspects described in U.S. Pat. No. 7,526,103, and/or U.S. patent application Ser. No. 12/781,119, filed May 17, 2010, now U.S. Pat. No. 8,376,595, which are hereby incorporated herein by reference in their entireties), and may display a stored image of that type of sign at the video display screen to alert the driver as to the presence of the detected sign. After the vehicle has passed the sign, the display may cease displaying the detected sign (this can be sensed, for example, such as by machine vision recognition of the actual stop sign by the forward-facing camera and/or by the vehicle coming to a stop and/or from GPS data on location of stop signs and/or other signs).

Optionally, the detection of the sign or signs along the road on which the vehicle is traveling may be GPS-assisted. For example, a GPS or navigation system may be used in fusion with the machine vision system or may be used in isolation to detect or alert the driver as to the presence of the signs. For example, as the vehicle travels along a road, the global positioning system may determine when the vehicle is approaching a sign (such as by comparing the then current geographical location of the vehicle to a known or programmed or stored geographical location of known signs), and the system may display the sign (or image or iconistic representation thereof) to alert the driver as to the presence of the sign ahead of the vehicle.

In the illustrated embodiments, the interior rearview mirror assembly includes or houses the video display screen, which is disposed within the mirror casing and behind the reflective element. Optionally, the mirror reflective element may comprise a transflective mirror reflector such that the video display screen is operable to display information or images for viewing by the driver or other occupant or occupants of the vehicle through the transflective mirror reflector of the reflective element when the video display screen device is operated to display information and/or video images, and is substantially not viewable or discernible through the transflective mirror reflector of the reflective element when not operated to display information and/or video images, as discussed below. Optionally, the video display screen may be disposed elsewhere within the cabin of the vehicle, such as at or in an accessory module of the vehicle or windshield electronics module of the vehicle or an overhead console of the vehicle or the like, while remaining within the spirit and scope of the present invention.

The video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal video display (such as discussed below), or the screen may comprise a multi-pixel organic electroluminescent video display or a multi-pixel light emitting diode (LED) video display, such as an organic light emitting diode (OLED) or inorganic light emitting diode display or the like, or an electroluminescent (EL) video display, or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663 and/or 5,724,187, and/or U.S. patent application Ser. No. 10/538,724, filed Jun. 13, 2005, which published on Mar. 9, 2006 as U.S. Patent Publication No. US 2006/0050018; Ser. No. 11/226,628, filed Sep. 14, 2005, which published on Mar. 23, 2006 as U.S. Patent Publication No. US 2006/0061008; Ser. No. 12/091,525, filed Apr. 25, 2008, now U.S. Pat. No. 7,855,755; Ser. No. 12/578,732, filed Oct. 14, 2009, now U.S. Pat. No. 9,487,144; Ser. No. 09/585,379, filed Jun. 1, 2000, abandoned, and/or Ser. No. 10/207,291, filed Jul. 29, 2002 and published Jan. 9, 2003 as U.S. Publication No. US-2003-0007261, and/or PCT Application No. PCT/US2010/25545, filed Feb. 26, 2010, which published on Sep. 2, 2010 as International Publication No. WO 2010/099416, which are hereby incorporated herein by reference in their entireties.

The video display screen device may be in communication with or may receive an input or video signal (such as a NTSC video signal or the like) from a corresponding imaging sensor or camera or imaging system and may display the image or images provided by the input or signal on the video display screen. Alternately, a video signal may be conveyed to the mirror assembly or system as a digital signal. The video display screen device or an imaging or vision system of the vehicle may include a control, which may be in communication with the video display screen via a wireless communication link or via an electrical connector or wiring or cable or the like. Optionally, the video signals may be transmitted via a vehicle communication bus or the like, such as an Ethernet or the like of the vehicle.

Optionally, the rear backup video camera may comprise any suitable image capture device or camera, such as a video camera suitable for a low resolution display, such as a VGA standard camera (such as a video camera having around 0.3 Mega pixels resolution or the like). However, when the vision system includes a high resolution video display screen, it is preferred to use a high resolution video camera, such as a video camera having 1 Mega pixels or greater pixel resolution (and such as having an addressable pixel density of at least about 2,000 pixels/cm$^2$ of addressable backlit video screen area, preferably an addressable pixel density of at least about 2,500 pixels/cm$^2$ of addressable backlit video screen area, and more preferably an addressable pixel density of at least about 2,800 pixels/cm$^2$ or more of addressable backlit video screen area). Optionally, and preferably, the video feed from the video camera to the high resolution video display may be carried by a high baud rate or high video transmission rate communication link or data link, such as a LVDS or an Ethernet link between the high resolution video camera and the high resolution display screen and/or between the high resolution video camera and the likes of a DAS or surround view/multi-camera ECU (such as by utilizing aspects of PCT Application No. PCT/US2010/025545, filed Feb. 26, 2010, which published on Sep. 2, 2010 as International Publication No. WO 2010/099416, and/or PCT Application No. PCT/US10/038477, filed Jun. 14, 2010 and published Dec. 16, 2010 as International Publication No. WO 2010/144900, which are hereby incorporated herein by reference in their entireties).

The control is operable to control the video display screen in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897 and 5,796,094, and/or U.S. patent application Ser. No. 10/534,632, filed May 11, 2005, now U.S. Pat. No. 7,965,336, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the video display screen may be operable responsive to other cameras and/or navigation systems and/or the like, and may be operable at any time during operation of the vehicle. Thus, the video display screen may be operable during daytime and nighttime driving conditions and may be operable when the variable reflectivity reflective element is dimmed or darkened. Thus, the intensity of the display may be adjusted to account for a reduced transmissivity of the reflective element.

Optionally, the video processor or video decoder may receive video feeds from multiple cameras at the equipped vehicle (such as a rearward facing camera at the rear of the vehicle, one or more forward facing cameras at the front of the vehicle (such as at the front fender or bumper of the vehicle) and one or more sideward facing cameras at the sides of the vehicle, such as at the side exterior rearview mirror assemblies of the vehicle) and may process the video image data and seamlessly merge the image data or images in the multiple video feeds to generate, for display on a single video display screen, a surround view or top-view or panoramic view or "birds-eye" view of the area at and around the equipped vehicle, such as by utilizing aspects of the vision systems described in SAE Technical Paper 1999-01-0655, titled "Panoramic Electronic Rear Vision for Automotive Applications", published Mar. 1, 1999 by Rich Hicks, Ken Schofield, Paul Tarno and Mike Veiseh, and/or U.S. patent application Ser. No. 12/508,840, filed Jul. 24, 2009, and published Jan. 28, 2010 as U.S. Pat. Publication No. US 2010-0020170, and/or U.S. Pat. Nos. 7,592,928; 7,145,519; 7,161,616 and/or 5,670,935, which are hereby incorporated herein by reference in their entireties.

Optionally, the video processor may generate graphic overlays and/or indicia and/or visual aids to assist the driver's interpretation and use of the surround view or similar image displayed on the single video display (preferably this is a video mirror display such as described in U.S. Pat. Nos. 6,690,268; 6,902,284; 7,184,190; 7,195,381; 7,255,451; 7,274,501; 7,338,177; 7,370,983; 7,490,007 and/or 7,540,620, and/or U.S. patent application Ser. No. 10/538,724, filed Jun. 13, 2005, which published on Mar. 9, 2006 as U.S. Patent Publication No. US 2006/0050018; Ser. No. 12/091,525, filed Apr. 25, 2008, now U.S. Pat. No. 7,855,755, which are all hereby incorporated herein by reference in their entireties, or the single video display may be a center stack or center console display or the like, such as is commonly used in navigation/infotainment systems). Optionally, an image processor or image processing capability may be included in the video processor or video decoder chip, or may be provided as a separate chip such as via the likes of an EYEQ2™ chip available from MobilEye of Jerusalem, Israel. The image processor so provided may be operable for machine vision analysis of the multiple video feeds/merged composite image so as to perform functions such as vehicle detection in the vicinity of the equipped vehicle, pedestrian detection in the vicinity of the equipped vehicle and/or object detection in the vicinity of the equipped vehicle. In the likes of a birds-eye or top-view surround vision display system, the video decoder may generate an iconistic or cartoon-like representation of the equipped vehicle in a central dead space of the displayed image, with the top-view/birds-eye view merged video images displayed therearound so that the driver of the equipped vehicle can readily discern the side views from the front and rear views and the rear view from the front view. The video processor may receive the video feeds from the multiple cameras via any link or communication means, such as via a twisted wire cable carrying standard video analog formats (such as NTSC or PAL or the like), or may receive digital signals such as via an LVDS protocol or an Ethernet protocol or via a MOST fiber optical link or the like.

Optionally, and desirably, the intensity or brightness or contrast of the video display screen may be automatically adjusted in response to an ambient light sensor or glare detector, such as a sensor of the display screen device, or of the interior rearview mirror assembly or vehicle or of a console or module or the like, such as the types disclosed in U.S. Pat. Nos. 4,793,690 and/or 5,193,029, which are hereby incorporated herein by reference in their entireties. In applications where the display screen device is implemented with an electro-optic or electrochromic mirror reflective element assembly, the display screen device may be automatically adjusted in response to the ambient light sensor or glare detector associated with the electro-optic or electrochromic circuitry or system. The display intensity of the display screen may be adjusted in response to the photo sensor or light sensor, and may be increased during daytime lighting conditions and reduced at dusk or during nighttime lighting conditions. The intensity and/or contrast and/or brightness of the display may be substantially continuously adjusted or may be adjusted intermittently or in steps in response to the light sensor or sensors, such as by utilizing aspects of the displays described in U.S. Pat. Nos. 7,370,983; 5,416,313 and 5,285,060, and/or U.S. patent application Ser. No.

12/091,525, filed Apr. 25, 2008, now U.S. Pat. No. 7,855,755, which are hereby incorporated herein by reference in their entireties.

Optionally, the video display screen may be operable to adjust the intensity of the displayed images in response to a degree of dimming of the electro-optic (such as electrochromic) reflective element of the mirror assembly. The video display screen thus may be adjusted responsive to an output signal of the glare light sensor or an output of the mirror reflective element dimming circuitry or the like. For example, as the reflective element is dimmed or darkened (such as in response to a detection of glare light at the mirror assembly) to reduce glare to the driver of the vehicle, the video display screen may be automatically brightened. Desirably, the video display screen is brightened relative to the degree of dimming so that the displayed images remain at a substantially constant intensity as viewed by the driver of the vehicle, so that the increasing/decreasing intensity of the video display is not readily discernible to the driver of the vehicle. Such an automatic intensity adjustment function is particularly suitable for a video display screen that may be operable in response to various camera inputs and/or navigation system inputs and/or the like, and not only responsive to a rear vision camera (where the dimming controls are typically deactivated when the vehicle is shifted into a reverse gear).

In such an application, the mirror dimming control may still be inhibited when the vehicle is shifted into a reverse gear, but will be active during other driving conditions, and the video display screen will also be active during reverse and forward driving conditions. Thus, when the video decoder (that may be part of the video display device or module) determines that there is a valid video signal, the video decoder may communicate to the mirror microprocessor to activate the back light of the display module, and the mirror circuitry and/or display circuitry may adjust the intensity of the video display screen in response to a detected ambient lighting condition and a detected glare lighting condition (and/or in response to a degree of dimming of the reflective element as set by the mirror circuitry). As the mirror reflective element is dimmed or darkened, the video display screen may re-brighten the video display intensity based on the EC coloring or dimming percentage in front of the video display screen. Likewise, as the mirror reflective element is bleached or undimmed, the video mirror display screen may reduce its intensity accordingly.

Desirably, the video mirror display screen emits light that is bright enough to be readily viewable and discernible during high ambient lighting conditions, such as are typically encountered on a sunny day. Preferably, the video mirror display luminance (and especially for a TFT LCD display element showing video or full color video or still images) is greater than about 500 candelas per square meter ($cd/m^2$), more preferably greater than about 1,000 $cd/m^2$, and more preferably greater than about 1,500 $cd/m^2$ as viewed by the driver viewing the transflective mirror reflector of the transflective mirror reflective element that the video display is disposed behind and is emitting light therethrough. This is to help ensure that the driver can discern any video image being displayed against the sunlight streaming in through the rear window and incident at the display screen at the interior mirror assembly that will tend to wash-out the video image unless the video image is sufficiently bright. Optionally, and preferably, the display screen may utilize aspects of the display element described in U.S. patent application Ser. No. 12/091,525, filed Apr. 25, 2008, now U.S. Pat. No. 7,855,755, which is hereby incorporated herein by reference in its entirety.

Conventionally, a video system may include a decoder for receiving and decoding video signals from the cameras or image sensors, and the video system further includes a connection or communication of the signals to a microprocessor of the video display device. The likes of conventional prismatic video mirrors typically utilize a two board approach with two separate processors: one processor on the video display screen device or module (typically, the video display device is provided as a liquid crystal video screen device or module or LCM with integrated backlighting and various brightness enhancing means) and another processor on the printed circuit board or circuit element or mirror board or mirror PCB. The processor on the mirror PCB may be operable to control various functions, such as the video display dimming, the power supply to the video display device module, the human-machine interface (HMI) switch for turning the video display on/off, and to provide protection and regulated power supply to the video display module and back light.

Optionally, the present invention may provide a multi-feature or multi-function video decoder that includes a microprocessor built into the package and with "OSD" (On Screen Display) capability. Thus, the control circuitry on the mirror circuit element or PCB may be moved into the decoder and thus combine the display module circuit element or PCB decoder electronics with the mirror circuit element or PCB electronics. Such combined circuitry can eliminate the need for an additional processor on the mirror PCB and will combine all feature control into the decoder. This saves system cost, improves EMC, reduces the PCB size and gives enhanced or full control of the video mirror system to one processor.

Optionally, such a combined circuitry decoder may include additional enhancement to the existing decoder chip so that the decoder may also control the dimming of a variable reflectivity reflective element or electro-optic or electrochromic reflective element. This would eliminate the mirror EC PCB assembly and would combine all the mirror electronics on a single or common circuit element or PCB that would have the decoder control all the video and reflective element dimming features.

For example, a decoder, such as a Techwell 8817 decoder available from Techwell Inc. of San Jose, CA, or other suitable decoder, may be disposed at a video display screen and may receive standard video signals, such as NTSC signals or PAL signals or the like, from one or more cameras of the vehicle. The decoder may decode the NTSC signals and may digitize the signals and send the digital signal to the display screen or TFT LCD screen. The decoder provides on screen display (OSD) capabilities and may provide other signals or messages with the video feed to the video screen. Such a Techwell 8817 decoder provides a highly integrated low cost TFT flat panel display controller supporting digital panels (that may support a wide variety of digital single pixel active matrix TFT panels and may support 3, 4 and 6 bits per pixel format and the like). The decoder may integrate a SECAM/NTSC/PAL video decoder supporting composite video, CVBS and S-Video inputs, an 8-bit microprocessor control unit (MCU), a cold cathode fluorescent lamp (CCFL) controller and a backlighting LED controller. The decoder may integrate a high quality NTSC/PAL/SECAM 2D video decoder and a 2D de-interlacer/scaler. The decoder may support analog inputs including CVBS & S-Video signals, and may support digital panel up to SVGA resolution or the like, and may have an integrated 8-bit 8051 microprocessor control unit (MCU), a CCFL controller and a backlighting LED controller. The decoder may have built-in 8 color font based OSD with about 200 ROM and 75 RAM fonts, and may support multi-color fonts by combining three single color fonts. The decoder may include embedded image enhancement, such as programmable CTI, hue, brightness, saturation, contrast and sharpness control, black/white stretch, programmable favorite color enhancement—up to three colors (such as skin, grass and sky or the like), and programmable gamma correction table and/or the like.

Optionally, such a decoder (such as a Techwell 8817 Decoder or the like) may be implemented with a video screen for a prismatic video mirror application. For example, the decoder may have a microprocessor and/or other data processing resources, such as memory, converters (such as A/D converters and/or the like), and/or CAN/LIN controllers and/or the like, incorporated into the same integrated circuit chip or package and may include OSD capability too. Thus, as well as functioning as a decoder, the same chip or package can provide intelligence/data processing/control for another function/functions or accessory/accessories in the mirror assembly, such as automatic dimming control of an antiglare electrochromic rearview mirror and/or intensity control of display backlighting, such as responsive to a photosensor of the interior rearview mirror assembly. Current prismatic video mirrors may utilize a two board approach with two separate processors (one processor may be on the mirror PCB in order to control the video display dimming, power supply to the LCM or display screen, the HMI Switch for turning the video display ON/OFF and/or supply protection and regulated power supply to the LCM or video display screen and back light.

Figure 26:
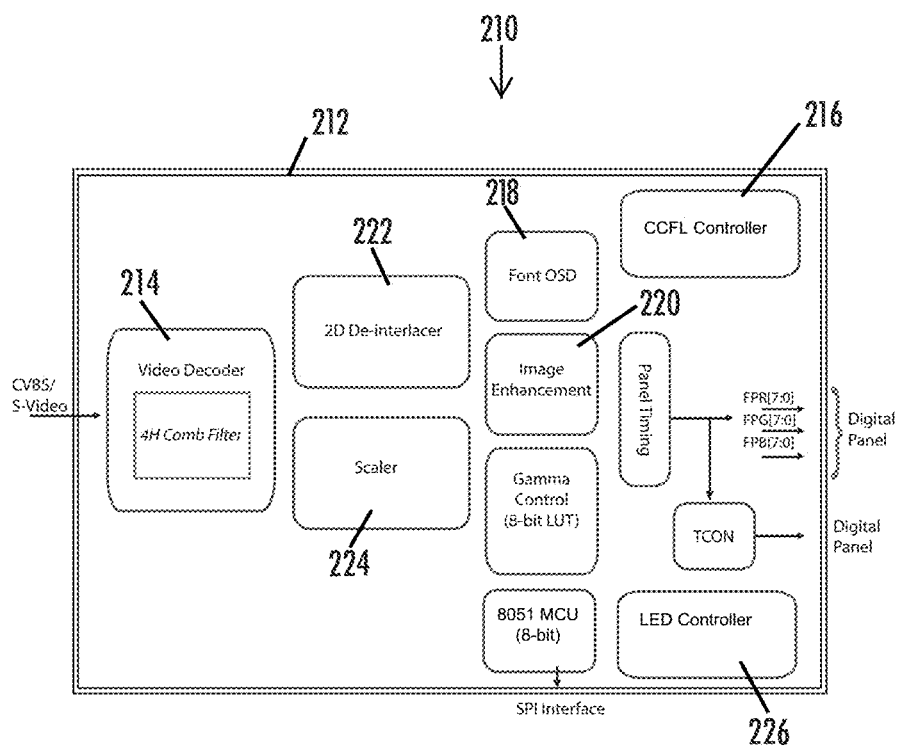
FIG. 26 is a block diagram of a video encoder suitable for use in the imaging and display system of the present invention.

For example, such a decoder 210, such as the Techwell 8817 Decoder, and with reference to FIG. 26, may include a board or substrate 212 with circuitry established thereon, including a video decoder 214 (that receives the standard video signal or NTSC signal, and that may provide advanced synchronization processing and may include two 10-bit ADCs and analog clamping circuit, built-in analog anti-aliasing filter, fully programmable static gain or automatic gain control for the Y or CVBS channel, programmable white peak control for the Y or CVBS channel, software selectable analog inputs, digital phase-locked loop (PLL) for both color and horizontal locking, automatic color control and color killer and the like), a built-in microcontroller (that may support external a serial peripheral interface (SPI) bus and/or an I²C master interface with a general purpose input/output (GPIO), and may support 2LED signal interface with GPIO, and may support a universal asynchronous receiver/transmitter (UART) interface with GPIO and may support IR or interrupt with GPIO), a CCFL controller 216 (such as a single channel CCFL controller based on push-pull architecture, with analog or digital brightness control and a low power standby mode), OSD circuitry 218 (such as built-in font OSD with 202 ROM and programmable 227 RAM fonts, with multi-window OSD support with color pallet and support for OSD overlay with alpha blending), image enhancement circuitry 220 (which may include a built-in 2D de-interlacing engine 222 and a high quality scalar 224, and may provide programmable hue, brightness, saturation, contrast, sharpness control with vertical peaking, programmable color transient improvement control, panorama/water-glass scaling, programmable Gamma correction tables, black/white stretch, programmable favorite color enhancement and the like), and an LED controller 226 (for controlling the backlighting LEDs of the TFT backlit video display, and with DC and pulse width modulation (PWM) dimming control and built-in open LED protection and 1 MHz fixed switching frequency and resistor-programmable LED current). The decoder may also include other circuitry as desired or appropriate depending on the particular application of the decoder and video display module. The decoder may support a two-wire serial bus interface for interfacing with a bus system or network of the vehicle.

Thus, the Techwell decoder may control many features of a video display screen, such as, for example, a 3.51 inch or thereabouts, 16:9 aspect ratio, video display screen of an interior video mirror. The Techwell decoder is a low cost highly integrated TFT flat panel controller for digital displays with an on board 8-bit 8051 microprocessor control unit (MCU) and On Screen Display capability built in to the decoder. The Techwell decoder application specific integrated circuit (ASIC) chip decodes the analog NTSC video signal and sets up the registers to control the digital panel. Preferably, an external microprocessor is not required or used because the on board 8-bit 8051 MCU is used to do the communication, computations, and input/output (I/O) control for the electrochromic mirror (EC) drive, video display backlighting control and optical sensing for the ambient and glare photo sensors. The 8-bit 8051 MCU is also used as the human machine interface (HMI) for any switches and the reverse inhibit signal as well as the EC indicator control. The backlighting control is an algorithm based thermal management system that reads at least two thermistors that are strategically placed close to the backlighting LEDs. The dimming curve utilizes multiple dimming steps (such as at least about 25 dimming steps, more preferably at least about 50 dimming steps, and more preferably at least about 100 dimming steps) and is responsive to the glare and ambient photo sensor inputs as well as responsive to the on board thermistors to control the heat management of the system. The Techwell decoder has On Screen Display (OSD) capability which allows for rudimentary graphics display or graphics overlay superimposed on moving video images from one or more cameras on the vehicle. Full alpha blending and multiple graphic window regions allows for reconfigurable high quality graphics to enhance and expand the number of ways that the display can be used.

The Techwell decoder thus provides TFT display control, including an analog video decoder, scalar and panel control. The backlighting control provides dimming control, backlighting on/off control, thermistor input for thermal management (such as 2 on the backlighting PCB, such as a circuit element or board or substrate with the backlighting LEDs disposed thereat). The electrochromic (EC) mirror drive control is operable to drive or control the EC mirror cell of an inside electrochromic mirror assembly and may drive or control the EC mirror cell or cells of one or two exterior electrochromic mirror assemblies of the vehicle. The I²C communication for optical sensing may utilize an ambient photo sensor and a glare photo sensor. The On Screen Display (OSD) capability of the decoder supports multi-color fonts, has multi window OSD support with color pallet, and supports OSD overlay with alpha blending. The input/output control has a reverse inhibit input, an electrochromic mirror on/off switch input and an electrochromic mirror indicator LED output. The software running on the decoder may accommodate an external memory, such as about 1 Meg of external memory (or more or less).

The present invention thus moves control circuitry, such as, for example, a microprocessor and allied circuitry associated with EC dimming of the mirror element, that is currently on the mirror printed circuit board or PCB into the decoder and combines the video display module or LCM PCB decoder electronics with at least a portion of the mirror PCB electronics into a single unitary integrated circuit or chip or package. Such combination and incorporation of the electronics onto a single decoder board limits or substantially precludes the need for an additional processor on the mirror PCB and combines all feature control into the decoder. The present invention thus reduces system cost, improves EMC, reduces PCB size and may provide full control of the video mirror system to one processor.

Optionally, the decoder of the present invention may be used in an electrochromic (EC) video mirror assembly. For example, the above described decoder may be carried over and with additional enhancement to the existing decoder chip could be a viable solution to also control the EC feature utilizing the decoder too. Such a configuration may limit or substantially preclude or eliminate the mirror EC PCB assembly and may combine all electronics on a single circuit element or board or PCB, whereby the decoder may control all the video and EC features.

Thus, the decoder of the present invention may be readily attached to or connected to a video display module or screen, such as at the rear of the display module. The decoder may be electrically connected to the wire or wires from the camera/cameras and to any other wires of the mirror assembly, whereby the decoder is ready for operation. The decoder thus provides video decoding functions and on screen display functions in a single decoder board. The NTSC (or other standard video input or signal) thus is received by the decoder and is decoded by the decoder, whereby the OSD of the decoder may generate the display signal to the video screen and may send the video display images by themselves or may mix the video signal/images with other display information, such as graphic overlays or textual information or iconistic display information or the like.

For example, the decoder may control the video display screen to display video images of a scene captured by one or more cameras of the vehicle, and may generate a graphic overlay that is electronically generated and superimposed on the video image by the decoder. Optionally, the decoder may function to display on the video display other messages or signals for viewing by the driver of the vehicle. For example, the decoder may function to display camera status information, EC dimming status information, toll information and toll payment card status information, blind spot detection or object detection information, directional heading information, fuel gauge status information, telephone call status information or other telematics system information, vehicle fluid level status information, seat belt status information, tire pressure information, directional heading and/or temperature information, and/or the like, such as by utilizing aspects of the display systems described in U.S. patent application Ser. No. 12/578,732, filed Oct. 14, 2009, now U.S. Pat. No. 9,487,144, and/or PCT Application No. PCT/US2010/25545, filed Feb. 26, 2010, which published on Sep. 2, 2010 as International Publication No. WO 2010/099416, which are hereby incorporated herein by reference in their entireties.

Typically, a backlit video screen utilized in an interior rearview mirror that utilizes a transflective reflector is provided as a package or module that typically has a 2.4 inch to 4.3 inch diagonal dimension (typically around 3.5 inches) and an aspect ratio of width to height of about 4:3 or about 15:9 or 16:9, and typically has an active area of around 72 mm wide and 53 mm high for a typical 3.5 inch diagonal screen with a 4:3 aspect ratio, with around 70,000-80,000 or thereabouts TFT (thin film transistor) RGB (red, green, blue) pixel resolution, or a typical 16:9 aspect ratio screen may have an active area of around 71 mm wide and 43 mm high, with around 96,000 or thereabouts TFT RGB pixel resolution. The video screen module or package has a circuit board and its control circuitry disposed at a rear of the package or module, such as by utilizing aspects of U.S. Pat. Nos. 7,004,593 and 7,370,983, which are hereby incorporated herein by reference in their entireties. Preferably, the circuitry required for operation of the display itself (including the video decoding and control of the backlighting and/or the like) and of the associated rearview mirror (such as electrochromic dimming and/or the like) is established on a printed circuit board or equivalent that attaches at the rear of the video display screen module or package and is roughly dimensioned to be the same as or close to the size and shape of the video display screen module or package.

Figure 27:
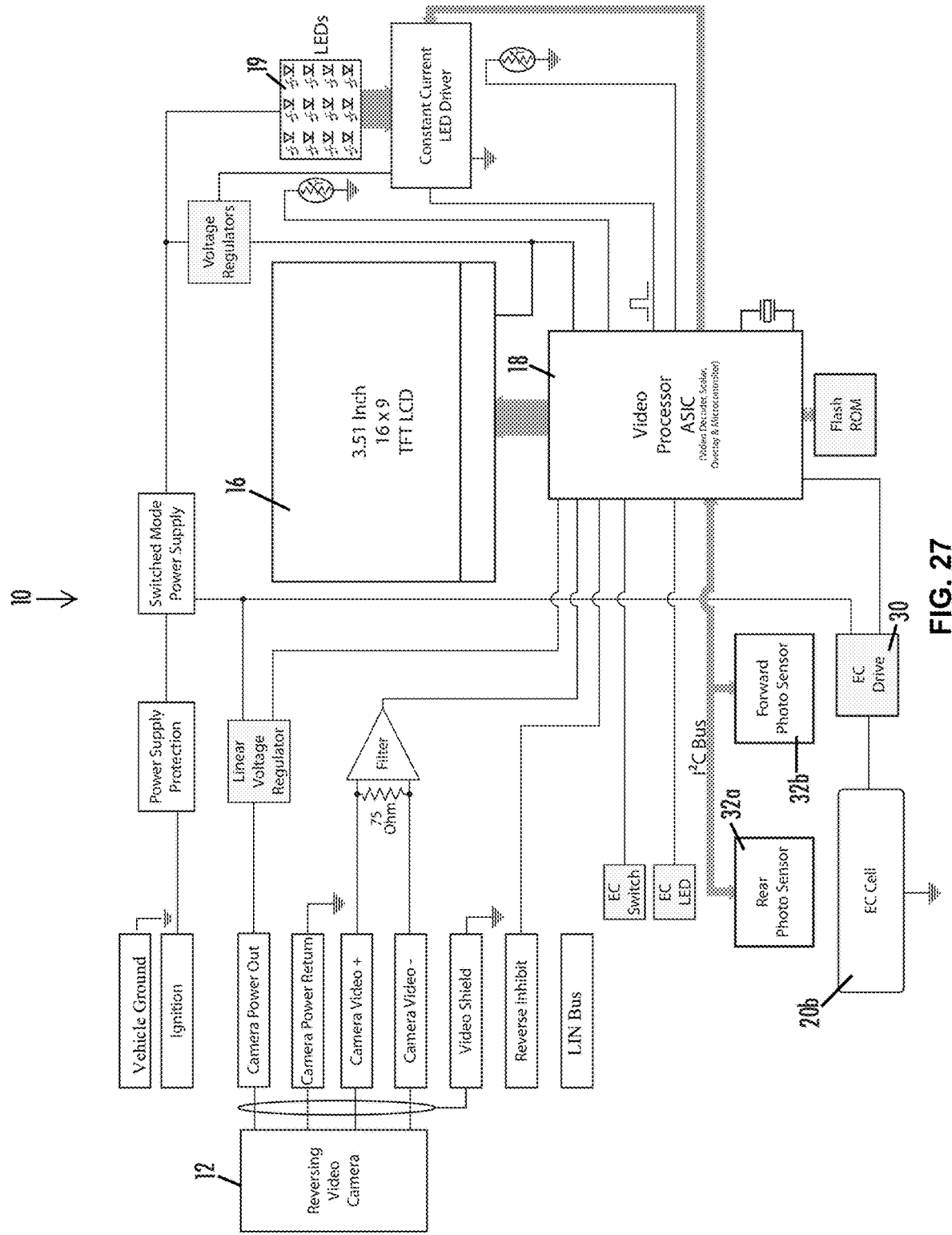
FIG. 27 is a block diagram of an imaging and display system in accordance with the present invention.
Figure 28:
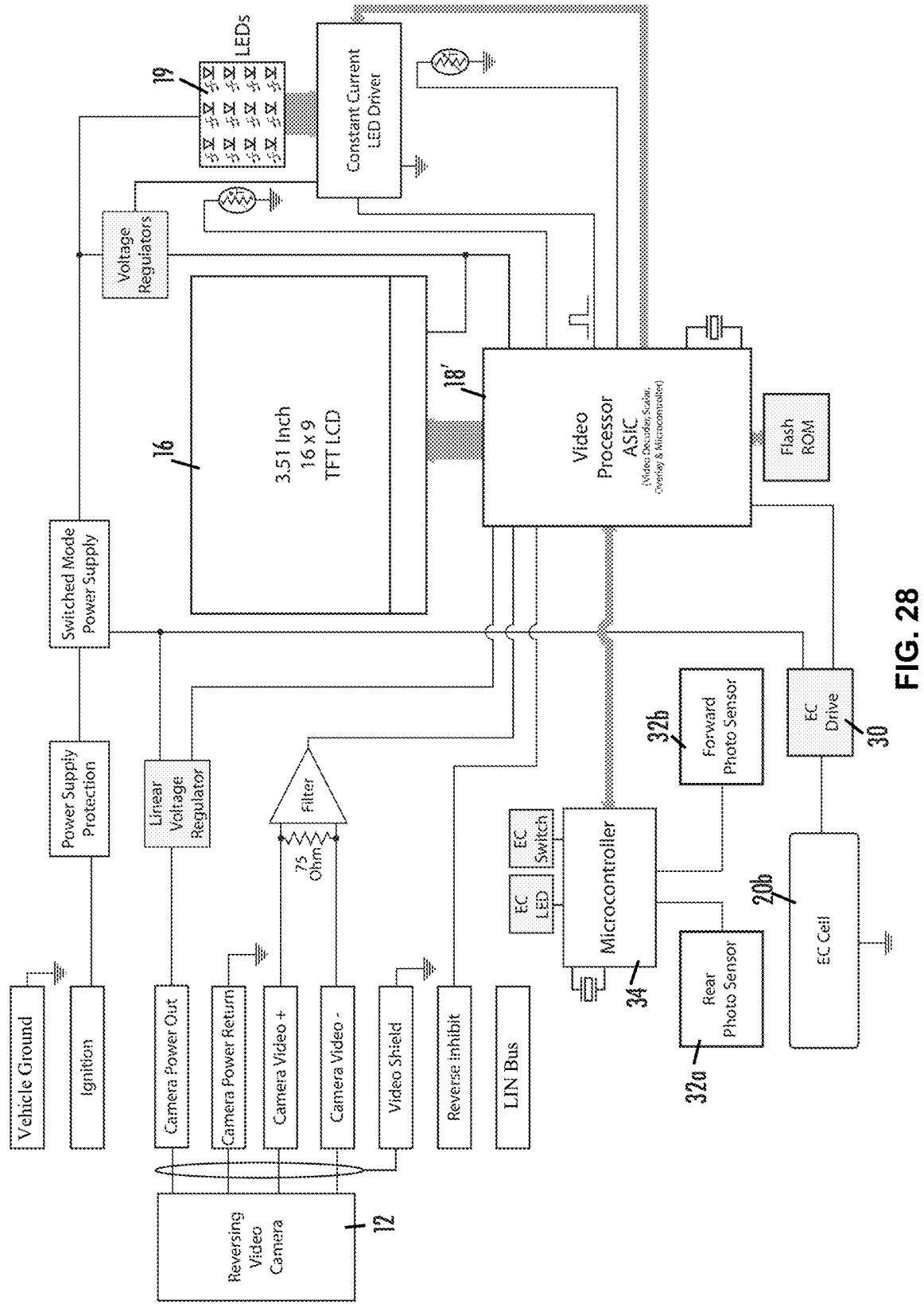
FIG. 28 is another block diagram of an imaging and display system in accordance with the present invention.

Thus, and with reference to FIG. 27, the vision and display system 10 of the present invention includes a rear or reversing video camera 12, a video processor 18 and a video display screen 16. The video display 16 may comprise a backlit TFT LCD video display screen, and may be backlit by a plurality of white light-emitting light emitting diodes or LEDs 19. The video processor 18 may comprise a video processor ASIC, and may include the video decoder, scalar, overlay and microcontroller and the like as discussed above. The video processor may control the dimming of the electrochromic mirror reflective element 20b of the interior rearview mirror assembly, such as via an EC drive 30 or the like, and such as in response to a forward photo sensor 32a and a rear photo sensor 32b (such as via an I²C bus or the like). Optionally, and with reference to FIG. 28, the video processor ASIC 18' may control the electrochromic mirror reflective element or cell 20b via the EC drive 30 responsive to a microcontroller 34, which may be responsive to the forward and rear photo sensors 32a, 32b, while remaining within the spirit and scope of the present invention. The video display screen and backlighting LEDs and video processor may all be part of or incorporated in a video module that may be disposed at or in the interior rearview mirror assembly of the vehicle equipped with the vision and display system, and the video module may communicate with or receive video signals from the rear camera 12 via a vehicle bus, such as a LIN bus or an Ethernet link or the like of the equipped vehicle.

Thus, the decoder may decode the video signal and may provide OSD capability and EC control capability, and may receive inputs from sensors (such as imaging sensors or photosensors or the like), and may receive switch inputs and may control various accessories in response to the user inputs or switch inputs. The decoder may share or access photo sensors to control the dimming of the display. The decoder thus provides a highly integrated TFT flat panel display controller at a reduced cost, and integrates a microprocessor in the single circuit element or board or chip. The decoder may provide UART capability, I²C capability, SPI capability and/or the like. Optionally, the decoder may include a transceiver or the like and the decoder may connect to or link to a LIN node of a network system of the vehicle.

As vehicle mechanical and electrical technology improves, the vehicle life cycles are increasing in duration while the life cycles of consumer product electronic devices are decreasing in duration. Thus, conflicts exist between the consumer's desire to have a vehicle that will last a long time and their desire to enjoy the latest consumer product features throughout the life cycle of their vehicle. The outputs of most, if not all, consumer electronics products are sensory in nature in that the outputs can be seen, heard and/or felt by the consumer, while their inputs are primarily touch and/or audible inputs. While the sensory systems of vehicles are mature, the content and interfacing aspects of products continue to improve. Thus, the vehicle may include an upgradeable interface device or system or feature that will allow the consumer to upgrade or replace the interface device to accommodate communication with new consumer products and/or the like. Optionally, and desirably, the upgradeable interface device may comprise an interior rearview mirror assembly, which may be coupled to the vehicle architecture and may be removable and replaceable and upgradable (in whole or in part) to provide enhanced and upgraded communication technology for use with consumer products in the vehicle.

Conventionally, interior rearview mirror assemblies are supplied to an automobile manufacturer as a complete interior rearview mirror assembly that may be replaced in whole due to warranty failure or the like, and typically the interior rearview mirror assembly is configured and intended for use over the lifetime of the vehicle without being upgraded or enhanced. In accordance with the present invention, components and/or circuitry (such as electronic components and/or antennae and/or the like) of the interior rearview mirror assembly may be replaced or upgraded, or the entire interior rearview mirror assembly may be replaced or upgraded, to provide enhanced/upgraded communication with the latest in wireless technology products that a consumer may purchase and use in the vehicle. Optionally, the upgradeable system of the present invention may utilize aspects of the mirror assemblies described in U.S. patent application Ser. No. 11/861,904, filed Sep. 26, 2007, now U.S. Pat. No. 7,937,667, and/or Ser. No. 10/538,724, filed Jun. 13, 2005, which published on Mar. 9, 2006 as U.S. Patent Publication No. US 2006/0050018, and/or U.S. Pat. Nos. 7,012,727; 6,902,284; 6,648,477; 6,428,172; 6,026,162 and/or 5,940,503, which are all hereby incorporated herein by reference in their entireties.

Typically, the interior rearview mirror assembly as installed in the vehicle as initially manufactured is the interior rearview mirror assembly utilized throughout the life of the vehicle, which may be a period of up to ten years or more. During that period, the vehicle manufacturer (such as, for example, Ford or Chrysler or General Motors) may have brought forward and/or developed new or upgraded mirror-based features that are not present in the particular interior rearview mirror assembly originally installed in the vehicle. However, the interior rearview mirror assembly of the present invention is designed and constructed to anticipate and/or accommodate such an event. In the inventive interior rearview mirror assembly, the owner may purchase a new or upgraded module or plug-in (such as from an aftermarket supplier or from the vehicle manufacturer) and may replace the existing module or feature (with an upgraded one) or may install the new module in the interior rearview mirror assembly (such as via a plug-in attachment or the like). Thus, the owner does not have to replace the entire interior rearview mirror assembly (the mirror casing, mirror mounting structure and the reflective element or cell of the interior rearview mirror assembly are likely not changing over the vehicle lifetime and would not require replacement), but may selectively and at-will add new or upgraded features without replacing the interior rearview mirror assembly.

Optionally, the interior rearview mirror assembly of the vehicle may be in communication with a display or video display (such as a display with touch and/or audio interfacing aspects and utilizing aspects of the displays discussed above), and the display may be in communication with other vehicle systems or accessories, such that the mirror assembly or portions thereof may be replaced to provide upgraded content and technology, such as for wireless connectivity (such as for example, baud rate, photocell and/or the like). For example, and with reference to FIG. 29, an interior rearview mirror system 310 includes an interior rearview mirror assembly 312, which is in communication with a disassociated display device 314 (such as a video display device operable to display video images), which in turn is in communication or connection with one or more other vehicle systems and/or accessories 316. The mirror assembly 312 may include wireless connectivity features for wireless communication with one or more vehicle accessories or systems and/or consumer accessories or systems. By replacing the mirror assembly 312 with a new or upgraded mirror assembly (such as an upgraded mirror assembly having enhanced or latest technology in wireless connectivity and the like), the electronics systems and/or accessories at or in the vehicle may be upgraded or added, while the mirror assembly and accessory systems of the vehicle may be adapted to communicate with such new features or technology.

In the illustrated embodiment, interior rearview mirror assembly 312 is detachably attached or mounted at an interior portion of a vehicle (such as via attachment of a mounting base to a windshield mounted mirror mounting button that is adhered to an in-cabin surface of the vehicle windshield), and is in communication (such as via a wireless or hardwired communication link 318) with display device 314. The communication between the mirror assembly content and the display device may be via hardwired connection and/or wireless communication. The display device is in communication with one or more vehicle systems or accessories 316 (such as via hardwired connection or wireless communication link 320). The display device 314 is disassociated from the mirror assembly and is not incorporated into the mirror assembly, and includes touch and/or audio interface aspects and interfaces with the interior rearview mirror assembly 312, which can provide the latest technology for wireless connectivity.

Thus, it is desirable to incorporate interfacing features in a replaceable and upgradeable mirror assembly (or in replaceable and upgradeable components and/or circuitry of a mirror assembly) so that, by replacing the interior rearview mirror assembly with an upgraded or newer mirror assembly (or by replacing the components and/or circuitry of the mirror assembly with upgraded or newer components and/or circuitry) having enhanced or the latest interface technology, the consumer may readily upgrade his or her vehicle to communicate with and interface with the latest in consumer product technology. The hard wired connection to the vehicle systems or accessories is mature technology and would not require upgrading to accommodate new consumer product technologies and the like. Thus, with an interior rearview mirror assembly of the present invention connected to a disassociated display device, the vehicle can be continually upgraded by changing the mirror assembly or components and/or circuitry thereof (with the new replacement mirror assembly or components/circuitry of the mirror assembly containing the latest technology in wireless connectivity). The upgraded mirror assemblies and/or components/circuitry thereof may be provided as aftermarket mirror assemblies or attachments or the like, and may be customized to provide the desired content and/or connectivity and/or appearance and/or functionality, such as desired by the consumer or owner of the vehicle.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010 and published Oct. 7, 2010 as International Publication No. WO 2010/114825, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005, which published on Mar. 23, 2006 as U.S. Patent Publication No. US 2006/0061008, and/or Ser. No. 10/538,724, filed Jun. 13, 2005, which published on Mar. 9, 2006 as U.S. Patent Publication No. US 2006/0050018, and/or PCT Application No. PCT/US03/29776, filed Sep. 9, 2003, and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036 and/or 7,274,501, and in PCT Application No. PCT/US03/29776, filed Sep. 9, 2003, and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic mirror assembly (such as an electrochromic mirror assembly or a liquid crystal mirror assembly). For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371 and 4,435,042, and PCT Application No. PCT/US2004/015424, filed May 18, 2004, and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177 and/or 7,255,451, and/or PCT Application No. PCT/US03/29776, filed Sep. 19, 2003, and published Apr. 1, 2004 as International Publication No. WO 2004/026633, and/or PCT Application No. PCT/US2004/015424, filed May 18, 2004, and published on Dec. 2, 2004, as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and 6,315,421 (the entire disclosures of which are hereby incorporated by reference herein), that can benefit from the present invention.

Optionally, the multi-pixel TFT reconfigurable video display screen and/or mirror may include user interface inputs, such as buttons or switches or touch or proximity sensors or the like, with which a user may adjust one or more characteristics of the imaging sensor and/or imaging system, such as via the principles described in U.S. patent application Ser. No. 12/091,525, filed Apr. 25, 2008, now U.S. Pat. No. 7,855,755, and/or Ser. No. 11/239,980, filed Sep. 30, 2005, now U.S. Pat. No. 7,881,496, and/or U.S. provisional applications, Ser. No. 60/614,644, filed Sep. 30, 2004; Ser. No. 60/618,686, filed Oct. 14, 2004, and Ser. No. 60/628,709, filed Nov. 17, 2004, which are hereby incorporated herein by reference in their entireties. Optionally, the images captured by the imaging sensor or camera may be processed by the control to extract information or data for different applications or systems, such as described in U.S. patent application Ser. No. 11/239,980, filed Sep. 30, 2005, now U.S. Pat. No. 7,881,496, and/or U.S. provisional application, Ser. No. 60/618,686, filed Oct. 14, 2004, which are hereby incorporated herein by reference in their entireties.

The control of the mirror assembly and/or the display screen may receive image data or the like from an imaging sensor or camera positioned elsewhere at or on or in the vehicle, such as at a forward or sideward portion of the vehicle with a forward or sideward exterior field of view, or such as at an interior portion (such as at or near or associated with the interior rearview mirror assembly or an accessory module or windshield electronics module or the like) of the vehicle with an interior field of view (such as into the vehicle cabin) or an exterior field of view (such as forwardly of and through the windshield of the vehicle). The signal from the camera or image data may be communicated to the control via various communication links or video transmission medium, such as wires or cables (such as a CAT-3 shielded twisted pair wire or a CAT-5 coaxial cable or the like) or a fiber optic cable or via wireless communication, such as IR signals or VHF or UHF signals or the like, or via a multiplex bus system of the vehicle or the like. For example, the connection or link between the imaging sensor or controls and the mirror assembly and/or display screen module may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA), or via wireless communications such as VHF or UHF signals, and/or the like, depending on the particular application of the mirror/display system and the vehicle.

The imaging sensor or camera may provide various image data signals, such as an NTSC signal or LVDS, Ethernet, PAL, analog RGB, component video, SECAM, S-video or the like. Optionally, the imaging system may be operable to selectively switch between, for example, PAL and NTSC, to adjust the imaging system and mirror/display system to accommodate European and U.S. applications.

The interior rearview mirror assembly may include a bezel portion and casing, such as described above, or the mirror assembly may comprise other types of casings or bezel portions or the like, such as described in U.S. Pat. Nos. 7,338,177; 7,249,860; 6,439,755; 4,826,289 and 6,501,387, and/or PCT Application No. PCT/US2004/015424, filed May 18, 2004, and published on Dec. 2, 2004, as International Publication No. WO 2004/103772, which are all hereby incorporated herein by reference in their entireties, without affecting the scope of the present invention. For example, the mirror assembly may comprise a flush or frameless or bezelless reflective element, such as the types described in U.S. Pat. Nos. 7,690,824; 7,626,749; 7,360,932; 7,274,501; 7,255,451 and/or 7,184,190, and/or in PCT Application No. PCT/US2004/015424, filed May 18, 2004, and published on Dec. 2, 2004, as International Publication No. WO 2004/103772; PCT Application No. PCT/US03/35381, filed Nov. 5, 2003, and published May 21, 2004 as International Publication No. WO 2004/042457, and/or PCT Application No. PCT/US2010/032017, filed Apr. 22, 2010 and published Oct. 28, 2010 as International Publication No. WO 2010/124064, and/or in U.S. patent application Ser. No. 11/226,628, filed Sep. 14, 2005, which published on Mar. 23, 2006 as U.S. Patent Publication No. US 2006/0061008, and/or Ser. No. 10/538,724, filed Jun. 13, 2005, which published on Mar. 9, 2006 as U.S. Patent Publication No. US 2006/0050018, which are all hereby incorporated herein by reference in their entireties.

Optionally, the mirror assembly may comprise a modular mirror construction, and may include back housing portions or the like, such as cap portions of the types described in PCT Application No. PCT/US2004/015424, filed May 18, 2004, and published on Dec. 2, 2004, as International Publication No. WO 2004/103772, which is hereby incorporated herein by reference in its entirety. The display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the mirror casing and/or reflective element, and/or the display screen casing and/or display screen may include customized or personalized viewable characteristics, such as color or symbols or indicia selected by the vehicle manufacturer or owner of the vehicle, such as the customization characteristics described in U.S. Pat. Nos. 7,255,451 and/or 7,626,749, and/or PCT Application No. PCT/US2004/015424, filed May 18, 2004, and published on Dec. 2, 2004, as International Publication No. WO 2004/103772, and/or U.S. patent application Ser. No. 11/243,783, filed Oct. 5, 2005, published Apr. 20, 2006 as U.S. Pat. Publication No. US 2006-0082192, which are hereby incorporated herein by reference in their entireties. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in U.S. Pat. No. 7,626,749 and/or PCT Application No. PCT/US2004/015424, filed May 18, 2004, and published on Dec. 2, 2004, as International Publication No. WO 2004/103772, and/or U.S. patent application Ser. No. 11/243,783, filed Oct. 5, 2005, published Apr. 20, 2006 as U.S. Pat. Publication No. US 2006-0082192, which are hereby incorporated herein by reference in their entireties. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,581,859; 7,338,177; 7,195,381; 6,690,298; 5,668,663 and/or 5,724,187, and/or in U.S. patent application Ser. No. 11/226,628, filed Sep. 14, 2005, which published on Mar. 23, 2006 as U.S. Patent Publication No. US 2006/0061008, and/or Ser. No. 12/091,525, filed Apr. 25, 2008, now U.S. Pat. No. 7,855,755, and/or in PCT Application No. PCT/US03/29776, filed Sep. 19, 2003, and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003, and published Apr. 1, 2004 as International Publication No. WO 2004/026633, and/or U.S. Pat. No. 7,338,177, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,824,281; 6,690,268; 6,672,744; 6,386,742 and 6,124,886, and/or PCT Application No. PCT/US03/03012, filed Jan. 31, 2003, and published Aug. 7, 2003 as International Publication No. WO 03/065084, and/or PCT Application No. PCT/US03/40611, filed Dec. 19, 2003, and published Jul. 15, 2004 as International Publication No. WO 2004/058540, and/or PCT Application No. PCT/US04/15424, filed May 18, 2004, and published on Dec. 2, 2004, as International Publication No. WO 2004/103772, which are hereby incorporated herein by reference in their entireties.

Optionally, the user inputs of the mirror assembly or display or module may comprise other types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 7,527,403 and/or 7,253,723, which are hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties. For example, the inputs may comprise a touch or proximity sensor of the types commercially available from TouchSensor Technologies, LLC of Wheaton, IL The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; 6,420,975; 6,477,464; 6,946,978; 7,308, 341; 7,167,796; 7,004,593 and/or 6,678,614, and/or PCT Application No. PCT/US03/40611, filed Dec. 19, 2003, and published Jul. 15, 2004 as International Publication No. WO 2004/058540, and/or PCT Application No. PCT/US03/308877, filed Oct. 1, 2003, and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, transmitters and/or receivers, such as a garage door opener or the like, a digital network, such as described in U.S. Pat. No. 5,798,575, a high/low headlamp controller, such as disclosed in U.S. Pat. Nos. 5,796, 094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820, 245; 5,673,994; 5,649,756; 5,178,448; 5,671,996; 4,646, 210; 4,733,336; 4,807,096; 6,042,253; 5,669,698; 7,195, 381; 6,971,775 and/or 7,249,860, microphones, such as disclosed in U.S. Pat. Nos. 6,243,003; 6,278,377; 6,420,975 and/or 7,657,052, and/or PCT Application No. PCT/US03/30877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,526,103; 7,400,435; 6,690,268 and/or 6,847,487, and/or U.S. patent application Ser. No. 11/239,980, filed Sep. 30, 2005, now U.S. Pat. No. 7,881,496, provisional application Ser. No. 60/618,686, filed Oct. 14, 2004, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or U.S. provisional application, Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442 and/or 5,632,092, an alert system and/or components or elements thereof (such as described in PCT Application No. PCT/US2010/25545, filed Feb. 26, 2010, which published on Sep. 2, 2010 as International Publication No. WO 2010/

099416, which is hereby incorporated herein by reference in its entirety), and/or any other accessory or circuitry or the like (with all of the above-referenced patents and PCT and U.S. patent applications being commonly assigned, and with the disclosures of the referenced patents and patent applications being hereby incorporated herein by reference in their entireties).

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular vision system comprising:
a video display screen operable for displaying video images;
wherein said video display screen is disposed in an interior electrochromic rearview mirror assembly of a vehicle equipped with said vehicular vision system;
wherein said video display screen is disposed behind a transflective mirror reflector of a transflective electrochromic mirror reflective element of said interior electrochromic rearview mirror assembly;
wherein video images displayed at said video display screen are viewable by a driver of the equipped vehicle when the driver is driving the equipped vehicle;
wherein, when said video display screen is not operating to display video images, presence of said video display screen behind the transflective mirror reflector of the transflective electrochromic mirror reflective element is covert;
wherein, when said video display screen is not operating to display video images, mirror reflectance functionality is available to the driver at a region of the transflective mirror reflector of the transflective electrochromic mirror reflective element of said interior electrochromic rearview mirror assembly that the video display screen is disposed behind;
wherein said video display screen comprises a left display region at a left portion of said video display screen and a right display region at a right portion of said video display screen;
wherein said video display screen comprises a middle display region at a middle portion of said video display screen;
wherein said middle display region spans between said left display region and said right display region;
a rearward-viewing color video camera disposed at the equipped vehicle;
said rearward-viewing color video camera comprising a CMOS imaging array sensor;
wherein said interior electrochromic rearview mirror assembly comprises a video processor operable to process image data captured by said rearward-viewing color video camera;
wherein captured image data is provided by said rearward-viewing color video camera as digital signals; and
wherein, during forward travel of the equipped vehicle, and responsive to processing of image data at said video processor, said video display screen is operable to (i) display at said left display region video images derived, at least in part, from image data captured by the rearward-viewing color video camera in order to display a scene occurring in a left side lane at a left side of the equipped vehicle where another vehicle may overtake the equipped vehicle, (ii) display at said right display region video images derived, at least in part, from image data captured by the rearward-viewing color video camera in order to display a scene occurring in a right side lane at a right side of the equipped vehicle where another vehicle may overtake the equipped vehicle and (iii) display at said middle display region video images derived, at least in part, from image data captured by the rearward-viewing color video camera in order to display a scene occurring rearward of the equipped vehicle in the lane the equipped vehicle is travelling in.

2. The vehicular vision system of claim 1, wherein, during forward travel of the equipped vehicle, and when said video display screen displays the scene occurring at the left side lane at said left display region of said video display screen, said video display screen displays an icon to enhance the driver's cognitive awareness of the displayed scene.

3. The vehicular vision system of claim 1, wherein said video display screen comprises a thin film transistor liquid crystal screen.

4. The vehicular vision system of claim 3, wherein said thin film transistor liquid crystal screen is backlit by at least one white light-emitting light emitting diode.

5. The vehicular vision system of claim 4, wherein said thin film transistor liquid crystal screen is backlit with a backlighting intensity of at least 30,000 candelas/square meter.

6. The vehicular vision system of claim 5, wherein, when said video display screen is operating to display video images, said video display screen provides a contrast ratio of greater than 350:1.

7. The vehicular vision system of claim 1, wherein said video display screen is operable to display video images having an intensity of at least 1,000 candelas per square meter as viewed by the driver through the transflective mirror reflector of the transflective electrochromic mirror reflective element of said interior electrochromic rearview mirror assembly.

8. The vehicular vision system of claim 1, wherein the image data provided by said rearward-viewing color video camera as digital signals is carried over a communication bus of the equipped vehicle.

9. The vehicular vision system of claim 1, comprising dynamic contrast control of said video display screen, and wherein said dynamic contrast control is operable to increase contrast within individual video image frames.

10. The vehicular vision system of claim 1, wherein said video processor is operable to at least one selected from the group consisting of (a) provide on screen display capability, (b) provide video decoding, (c) at least partially control dimming of the transflective electrochromic mirror reflective element and (d) at least partially control display intensity of said video display screen.

11. The vehicular vision system of claim 1, wherein said video display screen comprises an organic light emitting diode (OLED) video display screen.

12. The vehicular vision system of claim 1, wherein captured image data is provided by said rearward-viewing color video camera via an Ethernet link.

13. The vehicular vision system of claim 1, wherein the image data is provided by said rearward-viewing color video camera as digital signals over a cable.

14. The vehicular vision system of claim 13, wherein said cable comprises a coaxial cable.

15. The vehicular vision system of claim 14, wherein said coaxial cable comprises a CAT-5 coaxial cable.

16. The vehicular vision system of claim 13, wherein said cable comprises a shielded twisted pair wire.

17. The vehicular vision system of claim 1, wherein said shielded twisted wire pair comprises a CAT-3 twisted pair wire.

18. The vehicular vision system of claim 1, wherein said interior electrochromic rearview mirror assembly comprises auto dimming circuitry operable to electrically adjust reflectivity of the transflective electrochromic mirror reflective element, and wherein said auto dimming circuitry and said video processor share common electronic circuitry.

19. A vehicular vision system comprising:
a video display screen operable for displaying video images;
wherein said video display screen is disposed in an interior rearview mirror assembly of a vehicle equipped with said vehicular vision system;
wherein said video display screen is disposed behind a transflective mirror reflector of a transflective mirror reflective element of said interior rearview mirror assembly;
wherein video images displayed at said video display screen are viewable by a driver of the equipped vehicle when the driver is driving the equipped vehicle;
wherein, when said video display screen is not operating to display video images, presence of said video display screen behind the transflective mirror reflector of the transflective mirror reflective element is covert;
wherein, when said video display screen is not operating to display video images, mirror reflectance functionality is available to the driver at a region of the transflective mirror reflector of the transflective mirror reflective element of said interior rearview mirror assembly that the video display screen is disposed behind;
wherein said video display screen comprises a left display region at a left portion of said video display screen and a right display region at a right portion of said video display screen;
wherein said video display screen comprises a middle display region at a middle portion of said video display screen;
wherein said middle display region spans between said left display region and said right display region;
a rearward-viewing color video camera disposed at the equipped vehicle;
said rearward-viewing color video camera comprising a CMOS imaging array sensor;
wherein said interior rearview mirror assembly comprises a video processor operable to process image data captured by said rearward-viewing color video camera;
wherein captured image data is provided by said rearward-viewing color video camera as digital signals over a cable; and
wherein, during forward travel of the equipped vehicle, and responsive to processing of image data at said video processor, said video display screen is operable to (i) display at said left display region video images derived, at least in part, from image data captured by the rearward-viewing color video camera in order to display a scene occurring in a left side lane at a left side of the equipped vehicle where another vehicle may overtake the equipped vehicle, (ii) display at said right display region video images derived, at least in part, from image data captured by the rearward-viewing color video camera in order to display a scene occurring in a right side lane at a right side of the equipped vehicle where another vehicle may overtake the equipped vehicle and (iii) display at said middle display region video images derived, at least in part, from image data captured by the rearward-viewing color video camera in order to display a scene occurring rearward of the equipped vehicle in the lane the equipped vehicle is travelling in.

20. The vehicular vision system of claim 19, wherein said video display screen comprises a thin film transistor liquid crystal screen, and wherein said thin film transistor liquid crystal screen is backlit by at least one white light-emitting light emitting diode.

21. The vehicular vision system of claim 20, wherein said thin film transistor liquid crystal screen is backlit with a backlighting intensity of at least 30,000 candelas/square meter.

22. The vehicular vision system of claim 20, wherein, when said video display screen is operating to display video images, said video display screen provides a contrast ratio of greater than 350:1.

23. The vehicular vision system of claim 19, wherein said video display screen is operable to display video images having an intensity of at least 1,000 candelas per square meter as viewed by the driver through the transflective mirror reflector of the transflective mirror reflective element of said interior rearview mirror assembly.

24. The vehicular vision system of claim 19, wherein, during forward travel of the equipped vehicle, and when said video display screen displays the scene occurring at the left side lane at said left display region of said video display screen, said video display screen displays an icon to enhance the driver's cognitive awareness of the displayed scene.

25. The vehicular vision system of claim 19, comprising dynamic contrast control of said video display screen, and wherein said dynamic contrast control is operable to increase contrast within individual video image frames.

26. The vehicular vision system of claim 19, wherein said video processor is operable to at least one selected from the group consisting of (a) provide on screen display capability, (b) provide video decoding and (c) at least partially control display intensity of said video display screen.

27. The vehicular vision system of claim 19, wherein said video display screen comprises an organic light emitting diode (OLED) video display screen.

28. The vehicular vision system of claim 19, wherein captured image data is provided by said rearward-viewing color video camera via an Ethernet link.

29. The vehicular vision system of claim 19, wherein said cable comprises a coaxial cable.

30. The vehicular vision system of claim 29, wherein said coaxial cable comprises a CAT-5 coaxial cable.

31. The vehicular vision system of claim 19, wherein said cable comprises a shielded twisted pair wire.

32. The vehicular vision system of claim 31, wherein said shielded twisted wire pair comprises a CAT-3 twisted pair wire.

33. The vehicular vision system of claim 19, wherein said interior rearview mirror assembly comprises an interior electrochromic rearview mirror assembly, and wherein said interior electrochromic rearview mirror assembly comprises auto dimming circuitry operable to electrically adjust reflectivity of the transflective mirror reflective element, and wherein said auto dimming circuitry and said video processor share common electronic circuitry.

34. The vehicular vision system of claim 19, wherein said interior rearview mirror assembly comprises an interior prismatic rearview mirror assembly.

35. A vehicular vision system comprising:
    a video display screen operable for displaying video images;
    wherein said video display screen is disposed in an interior electrochromic rearview mirror assembly of a vehicle equipped with said vehicular vision system;
    wherein said video display screen is disposed behind a transflective mirror reflector of a transflective electrochromic mirror reflective element of said interior electrochromic rearview mirror assembly;
    wherein said video display screen comprises a thin film transistor liquid crystal screen;
    wherein said thin film transistor liquid crystal screen is backlit by at least one white light-emitting light emitting diode;
    wherein said interior electrochromic rearview mirror assembly comprises auto dimming circuitry operable to electrically adjust reflectivity of the transflective electrochromic mirror reflective element, and wherein said auto dimming circuitry and said video processor share common electronic circuitry;
    wherein video images displayed at said video display screen are viewable by a driver of the equipped vehicle when the driver is driving the equipped vehicle;
    wherein, when said video display screen is not operating to display video images, presence of said video display screen behind the transflective mirror reflector of the transflective electrochromic mirror reflective element is covert;
    wherein, when said video display screen is not operating to display video images, mirror reflectance functionality is available to the driver at a region of the transflective mirror reflector of the transflective electrochromic mirror reflective element of said interior electrochromic rearview mirror assembly that the video display screen is disposed behind;
    wherein said video display screen comprises a left display region at a left portion of said video display screen and a right display region at a right portion of said video display screen;
    wherein said video display screen comprises a middle display region at a middle portion of said video display screen;
    wherein said middle display region spans between said left display region and said right display region;
    a rearward-viewing color video camera disposed at the equipped vehicle;
    said rearward-viewing color video camera comprising a CMOS imaging array sensor;
    wherein said interior electrochromic rearview mirror assembly comprises a video processor operable to process image data captured by said rearward-viewing color video camera;
    wherein captured image data is provided by said rearward-viewing color video camera as digital signals; and
    wherein, during forward travel of the equipped vehicle, and responsive to processing of image data at said video processor, said video display screen is operable to (i) display at said left display region video images derived, at least in part, from image data captured by the rearward-viewing color video camera in order to display a scene occurring in a left side lane at a left side of the equipped vehicle where another vehicle may overtake the equipped vehicle, (ii) display at said right display region video images derived, at least in part, from image data captured by the rearward-viewing color video camera in order to display a scene occurring in a right side lane at a right side of the equipped vehicle where another vehicle may overtake the equipped vehicle and (iii) display at said middle display region video images derived, at least in part, from image data captured by the rearward-viewing color video camera in order to display a scene occurring rearward of the equipped vehicle in the lane the equipped vehicle is travelling in.

36. The vehicular vision system of claim 35, wherein said thin film transistor liquid crystal screen is backlit with a backlighting intensity of at least 30,000 candelas/square meter.

37. The vehicular vision system of claim 35, wherein, when said video display screen is operating to display video images, said video display screen provides a contrast ratio of greater than 350:1.

38. The vehicular vision system of claim 35, wherein said video display screen is operable to display video images having an intensity of at least 1,000 candelas per square meter as viewed by the driver through the transflective mirror reflector of the transflective electrochromic mirror reflective element of said interior electrochromic rearview mirror assembly.

39. The vehicular vision system of claim 35, wherein, during forward travel of the equipped vehicle, and when said video display screen displays the scene occurring at the left side lane at said left display region of said video display screen, said video display screen displays an icon to enhance the driver's cognitive awareness of the displayed scene.

40. The vehicular vision system of claim 35, wherein said video processor is operable to at least one selected from the group consisting of (a) provide on screen display capability, (b) provide video decoding and (c) at least partially control display intensity of said video display screen.

41. The vehicular vision system of claim 35, wherein captured image data is provided by said rearward-viewing color video camera via an Ethernet link.

42. The vehicular vision system of claim 35, wherein captured image data is provided by said rearward-viewing color video camera as digital signals over a cable, and wherein said cable comprises a coaxial cable.

43. The vehicular vision system of claim 42, wherein said coaxial cable comprises a CAT-5 coaxial cable.

44. The vehicular vision system of claim 35, wherein captured image data is provided by said rearward-viewing color video camera as digital signals over a cable, and wherein said cable comprises a shielded twisted pair wire.

45. The vehicular vision system of claim 44, wherein said shielded twisted wire pair comprises a CAT-3 twisted pair wire.

* * * * *